US011582330B2

United States Patent
Park et al.

(10) Patent No.: US 11,582,330 B2
(45) Date of Patent: Feb. 14, 2023

(54) WIRELESS DEVICE CAPABILITY INFORMATION

(71) Applicant: Comcast Cable Communications, LLC, Philadelphia, PA (US)

(72) Inventors: Kyungmin Park, Herndon, VA (US); Esmael Hejazi Dinan, McLean, VA (US); Weihua Qiao, Herndon, VA (US); Peyman Talebi Fard, Sterling, VA (US); Alireza Babaei, Fairfax, VA (US); Hyoungsuk Jeon, Centreville, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 305 days.

(21) Appl. No.: 17/107,132

(22) Filed: Nov. 30, 2020

(65) Prior Publication Data

US 2021/0084121 A1 Mar. 18, 2021

Related U.S. Application Data

(63) Continuation of application No. 16/165,613, filed on Oct. 19, 2018, now Pat. No. 10,855,814.

(Continued)

(51) Int. Cl.
*H04L 69/04* (2022.01)
*H04W 40/24* (2009.01)
(Continued)

(52) U.S. Cl.
CPC .............. *H04L 69/04* (2013.01); *H04L 69/22* (2013.01); *H04W 8/08* (2013.01);
(Continued)

(58) Field of Classification Search
CPC ......... H04L 69/04; H04L 69/22; H04L 5/001; H04L 5/0023; H04L 69/321;
(Continued)

(56) References Cited

U.S. PATENT DOCUMENTS 10,251,147 B2 4/2019 Park et al.
10,264,506 B2 4/2019 Faccin et al.
(Continued)

FOREIGN PATENT DOCUMENTS

EP 3094155 A1 11/2016
EP 3337284 A1 6/2018
(Continued)

OTHER PUBLICATIONS

Mar. 21, 2019—EP Extended Search Report—EP 18201708.7.
(Continued)

*Primary Examiner* — Brian T O Connor
(74) *Attorney, Agent, or Firm* — Banner & Witcoff, Ltd.

(57) ABSTRACT

Systems, apparatuses, and methods are described for wireless communications. A base station and wireless device may communicate capability information associated with a wireless device. The capability information may include information indicating support for an Ethernet type packet data unit session or header parameter compression. An Ethernet type packet data unit session may be instantiated based on the capability information.

36 Claims, 38 Drawing Sheets

Related U.S. Application Data

(60) Provisional application No. 62/574,954, filed on Oct. 20, 2017, provisional application No. 62/575,127, filed on Oct. 20, 2017.

(51) Int. Cl.

| | | |
|---|---|---|
| *H04L 69/22* | (2022.01) | |
| *H04W 76/27* | (2018.01) | |
| *H04W 76/15* | (2018.01) | |
| *H04W 8/08* | (2009.01) | |
| *H04W 36/00* | (2009.01) | |
| *H04W 36/08* | (2009.01) | |
| *H04W 72/04* | (2009.01) | |
| *H04W 74/08* | (2009.01) | |
| *H04L 5/00* | (2006.01) | |
| *H04W 80/02* | (2009.01) | |
| *H04W 80/08* | (2009.01) | |

(52) U.S. Cl.
CPC ... *H04W 36/0033* (2013.01); *H04W 36/0088* (2013.01); *H04W 36/08* (2013.01); *H04W 40/24* (2013.01); *H04W 72/0446* (2013.01); *H04W 72/0453* (2013.01); *H04W 74/0833* (2013.01); *H04W 76/15* (2018.02); *H04W 76/27* (2018.02); *H04L 5/001* (2013.01); *H04W 80/02* (2013.01); *H04W 80/08* (2013.01)

(58) Field of Classification Search
CPC . H04L 67/1097; H04L 67/125; H04L 67/141; H04L 69/324; H04W 8/08; H04W 36/0033; H04W 36/0088; H04W 36/08; H04W 40/24; H04W 72/0446; H04W 72/0453; H04W 74/0833; H04W 76/15; H04W 76/27; H04W 80/02; H04W 80/08; H04W 8/24; H04W 28/06; H04W 80/10
See application file for complete search history.

(56) References Cited

U.S. PATENT DOCUMENTS

| | | | |
|---|---|---|---|
| 10,271,333 B2 | 4/2019 | Cui et al. | |
| 10,356,678 B2 | 7/2019 | Guo et al. | |
| 10,812,629 B2* | 10/2020 | Park | H04L 69/04 |
| 10,855,814 B2* | 12/2020 | Park | H04W 72/0446 |
| 11,006,316 B2* | 5/2021 | Qiao | H04L 69/04 |
| 2014/0204927 A1 | 7/2014 | Horn et al. | |
| 2014/0219267 A1 | 8/2014 | Eyuboglu et al. | |
| 2014/0355516 A1 | 12/2014 | Baudoin et al. | |
| 2017/0289019 A1 | 10/2017 | Faccin et al. | |
| 2017/0318510 A1 | 11/2017 | Guo et al. | |
| 2018/0115928 A1 | 4/2018 | Kim et al. | |
| 2018/0262905 A1 | 9/2018 | Dhanapal et al. | |
| 2018/0270782 A1 | 9/2018 | Park et al. | |
| 2018/0270888 A1 | 9/2018 | Faccin | |
| 2018/0332523 A1 | 11/2018 | Faccin et al. | |
| 2019/0116520 A1 | 4/2019 | Chaponniere et al. | |
| 2019/0116521 A1 | 4/2019 | Qiao et al. | |
| 2019/0150219 A1 | 5/2019 | Wang et al. | |
| 2019/0166647 A1 | 5/2019 | Velev et al. | |
| 2019/0182895 A1 | 6/2019 | Di Girolamo et al. | |
| 2019/0200264 A1 | 6/2019 | Kim et al. | |
| 2019/0261159 A1 | 8/2019 | Wang et al. | |
| 2019/0313473 A1 | 10/2019 | Kim et al. | |
| 2019/0335366 A1 | 10/2019 | Jin et al. | |
| 2019/0342927 A1 | 11/2019 | Ohseki et al. | |
| 2019/0364496 A1 | 11/2019 | Jin | |
| 2019/0364541 A1 | 11/2019 | Ryu | |
| 2019/0380104 A1 | 12/2019 | Vrzic et al. | |
| 2020/0029380 A1 | 1/2020 | Kawasaki et al. | |
| 2020/0037386 A1 | 1/2020 | Park et al. | |
| 2020/0170067 A1 | 5/2020 | Kawasaki et al. | |

FOREIGN PATENT DOCUMENTS

| | | |
|---|---|---|
| EP | 3425993 A1 | 1/2019 |
| WO | 2014011008 A1 | 1/2014 |
| WO | 2014094287 A1 | 6/2014 |
| WO | 2017030420 A1 | 2/2017 |
| WO | 2017171514 A1 | 10/2017 |
| WO | 2018006017 A1 | 1/2018 |
| WO | 2018130968 A1 | 7/2018 |

OTHER PUBLICATIONS

C1-174177 3GPP TSG-CT Wg1 Meeting #106, Kochi, India, Oct. 23-27, 2017, Source: LG Electronics, Ericsson, Title: Corrections on PDU session type and PDU type.
R3-161353 3GPP TSG RAN WG3 Meeting #92, Nanjing, China, May 23-27, 2016, Source: Nokia, Alcatel-Lucent Shanghai Bell, Title: Proposal for RAN-CN Functional Split.
S2-177144 3GPP SA WG2 Meeting #123, Ljubljana, Slovenia, Oct. 23-27, 2017, Source: Huawei, HiSilicon, Title: Clarification on Ethernet PDU session.
C1-173155 3GPP TSG-CT WG1 Meeting #105, Krakow, Poland, Aug. 21-25, 2017, Source: Nokia, Alcatel-Lucent Shanghai Bell, Title: Pseudo-CR on support of 5GSM PDU session types.
3GPP TS 36.323 V14.3.1 (Jun. 2017), Technical Specification, 3rd Generation Partnership Project; Technical Specification Group Radio Access Network; Evolved Universal Terrestrial Radio Access (E-UTRA); Packet Data Convergence Protocol (PDCP) specification (Release 14).
3GPP TS 36.331 V14.3.0 (Jun. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TS 38.300 V1.0.1 (Oct. 2017), Technical Specification, 3rd Generation Partnership Project; Technical Specification Group Radio Access Network; NR; NR and NG-RAN Overall Description; Stage 2 (Release 15).
3GPP TS 38.323 V0.3.0 (Aug. 2017), Technical Specification, 3rd Generation Partnership Project; Technical Specification Group Radio Access Network; NR; Packet Data Convergence Protocol (PDCP) specification (Release 15).
Cisco, Next-Generation Enterprise WAN: Cisco ISRs with 4G LTE Deployment Guide, May 2014.
Effnet Platform, Effnet EthHC™, 2017.
Wikipedia, "Ethernet frame", last edited Sep. 24, 2017.
Wikipedia, "EtherType", last edited Aug. 10, 2017.
Wikipedia, "IEEE 802.1Q", last edited Aug. 7, 2017.
S2-177974 3GPP SA WG2 Meeting #123, Ljubljana, Slovenia, Oct. 23-27, 2017, Source: Huawei, HiSilicon, Title: Classification on Ethernet PDU session.
S2-178029 3GPP SA WG2 Meeting #123, Ljubljana, Slovenia, Oct. 23-27, 2017, Source: Nokia, Nokia Shanghai Bell, Title: Corrections and Improvements for Ethernet PDU Session Type.
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).

(56) References Cited

OTHER PUBLICATIONS

3GPP TS 36.331 V14.4.0 (Sep. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).
S2-184514 3GPP TSG-SA WG2 Meeting #127, Sanya, China, Apr. 16-20, 2018, Source: Qualcomm Incorporated, Spreadtrum Communications, Ericsson, Title: Consolidation of UE Network Capabilities.
S2-183522 3GPP TSG-SA WG2 Meeting #127, Sanya, China, Apr. 16-20, 2018, Source: Qualcomm Incorporated, Title: Consolidation of UE Network Capabilities.
R1-1719301 3GPP TSG RAN WG1 Meeting #91, Reno, USA, Source: MCC Support, Title: Final Report of 3GPP TSG RAN WG1 #90bis v1.0.0 (Prague, Czech Republic, Oct. 9-13, 2017).
R1-1717057 3GPP TSG RAN WG1 Meeting #90bis, Prague, Czech Republic, Oct. 9-13, 2017, Source: Huawei, HiSilicon, Title: On initial active bandwidth part.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717905 3GPP TSG RAN WG1 Meeting #90bis, Prague, Czech Republic, Oct. 9-13, 2017, Source: Huawei, HiSilicon, Title: Bandwidth part activation and adaptation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT Docomo, Inc., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-1718901 3GPP TSG RAN WG1 Meeting 90bis, Prague, Czech Republic, Oct. 9-13, 2017, Source: MediaTek Inc., Title: Summary of Bandwidth Part Operation.
R2-1710091 3GPP TSG RAN WG2 Meeting #99bis, Prague, Czech Republic, Oct. 9-13, 2017, Source: Samsung, Title: Random Access in RRC Connected: Bandwidth Part Aspects.
R2-1710125 3GPP TSG RAN WG2 Meeting #99bis, Prague, Czech Republic, Oct. 9-13, 2017, Source: OPPO, Title: Impact of BWP on CA.
R2-1710126 3GPP TSG RAN WG2 Meeting #99bis, Prague, Czech Republic, Oct. 9-13, 2017, Source: OPPO, Title: Timer based BWP switching.
R2-1710217 3GPP TSG RAN WG2 Meeting #99bis, Prague, Czech Republic, Oct. 9-13, 2017, Source: Huawei, HiSilicon, Title: User plane impacts for Bandwidth Parts.
R2-1710274 3GPP TSG RAN WG2 Meeting #99bis, Prague, Czech Republic, Oct. 9-13, 2017, Source: CATT, Title: Modeling Bandwidth Parts in MAC.
R2-1710275 3GPP TSG RAN WG2 Meeting #99bis, Prague, Czech Republic, Oct. 9-13, 2017, Source: CATT, Title: BWP model.
R2-1710457 3GPP TSG RAN WG2 Meeting #99bis, Prague, Czech Republic, Oct. 9-13, 2017, Source: Huawei, HiSilicon, Title: Control plane impacts for Bandwidth Parts.
R2-1710592 3GPP TSG RAN WG2 Meeting #99bis, Prague, Czech Republic, Oct. 9-13, 2017, Source: Intel Corporation, Title: Overall impact in RAN2 for BWP.
Jun. 9, 2022—EP Search Report—EP App. No. 22158164.8.
R1-1710864 3GPP TSG RAN WG2 Meeting #99bis, Prague, Czech Republic, Oct. 9-13, 2017, Source: Mediatek Inc., Title: Basic Framework for Bandwidth Part Operation.
R2-1710965 3GPP TSG RAN WG2 Meeting #99bis, Prague, Czech Republic, Oct. 9-13, 2017, Source: vivo, Title: Discussion on bandwidth part operation.
R2-1711065 3GPP TSG RAN WG2 Meeting #99bis, Prague, Czech Republic, Oct. 9-13, 2017, Source: Nokia, Nokia Shanghai Bell, Title: Cell and BWP relation.
R2-1711187 3GPP TSG RAN WG2 Meeting #99bis, Prague, Czech Republic, Oct. 9-13, 2017, Source: Samsung, Title: Framework to support bandwidth parts in NR.
R2-1711188 3GPP TSG RAN WG2 Meeting #99bis, Prague, Czech Republic, Oct. 9-13, 2017, Source: Samsung, Title: Signaling to suppod bandwidth part.
R2-1711189 3GPP TSG RAN WG2 Meeting #99bis, Prague, Czech Republic, Oct. 9-13, 2017, Source: Samsung, Title: Activation/deactivation of bandwidth parts in NR.
R2-1711388 3GPP TSG RAN WG2 Meeting #99bis, Prague, Czech Republic, Oct. 9-13, 2017, Source: LG Electronics Inc., Title: RRC Procedures for BWP Configuration.
R2-1711595 3GPP TSG RAN WG2 Meeting #99bis, Prague, Czech Republic, Oct. 9-13, 2017, Source: Samsung, Title: The impact of bandwidth part on RAN2: Overview and Issues.
R2-1711607 3GPP TSG RAN WG2 Meeting #99bis, Prague, Czech Republic, Oct. 9-13, 2017, Source: Samsung, Title: Scenarios of Measurement Gap Considering Bandwidth Part.
R2-1711640 3GPP TSG RAN WG2 Meeting #99bis, Prague, Czech Republic, Oct. 9-13, 2017, Source: ZTE Corporation, Sane Chips, Title: Initial discussion on the impacts of BWP on RAN2.
R2-1712101 3GPP TSG RAN WG2 Meeting #100, Reno, USA, Nov. 27-Dec. 1, 2017, Source: ETSI MCC, Title: Report of 3GPP TSG Ran2 #99bis Meeting in Prague.
3GPP TS 23.501 V15.2.0 (Jun. 2018); Technical Specification; 3rd Generation Partnership Project; Technical Specification Group Services and System Aspects; System Architecture for the 5G System; Stage 2 (Release 15).
Jun. 17, 2020—European Office Action—EP 18201708.7.

* cited by examiner

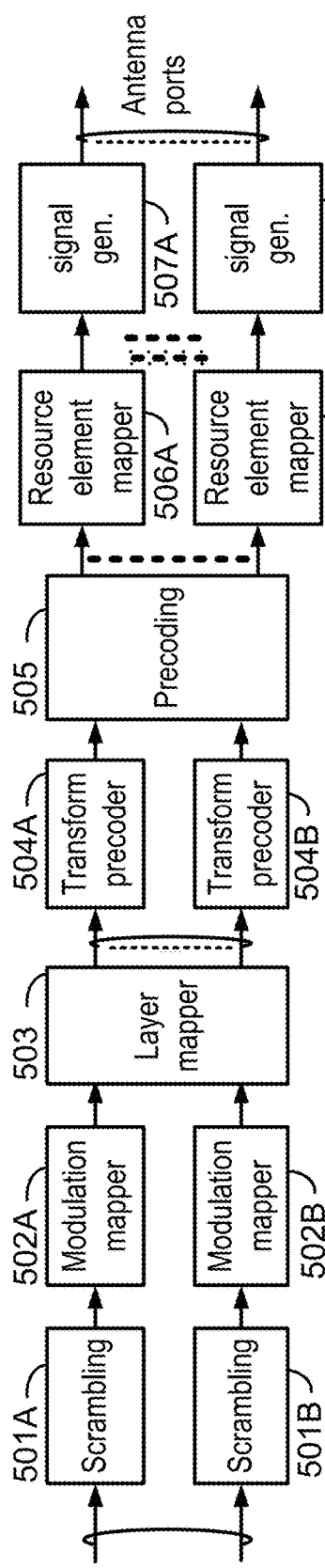
FIG. 5A Example uplink physical channel
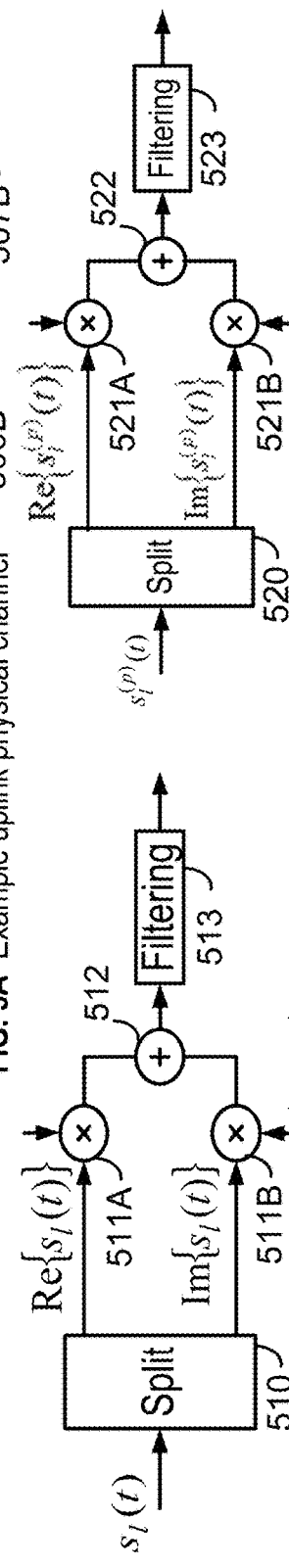
FIG. 5B Example uplink modulation
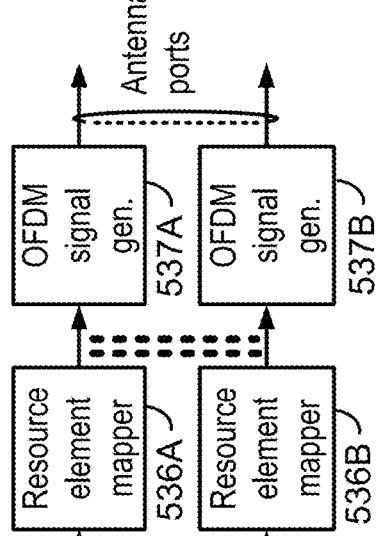
FIG. 5D Example downlink modulation
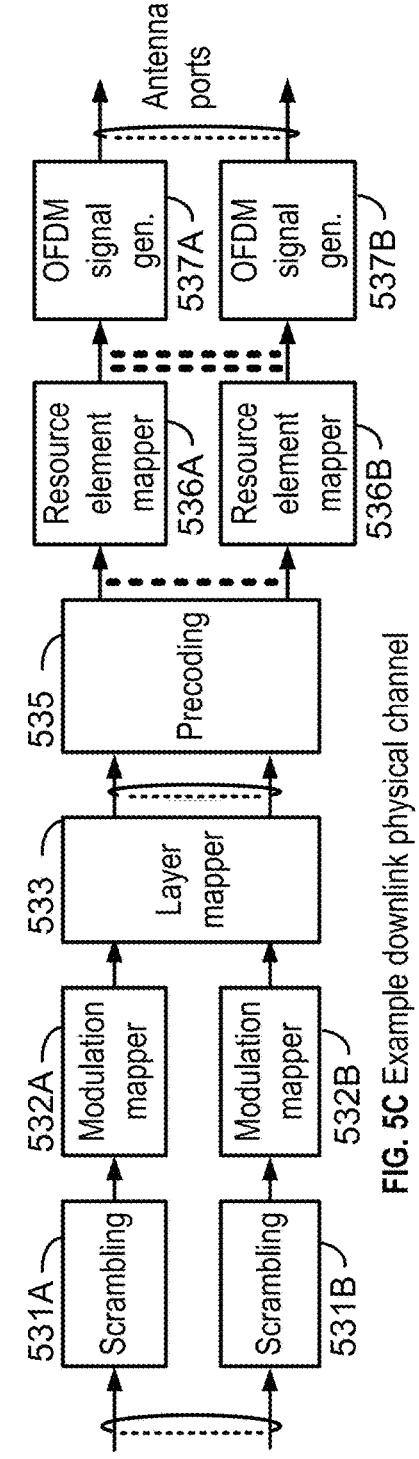
FIG. 5C Example downlink physical channel

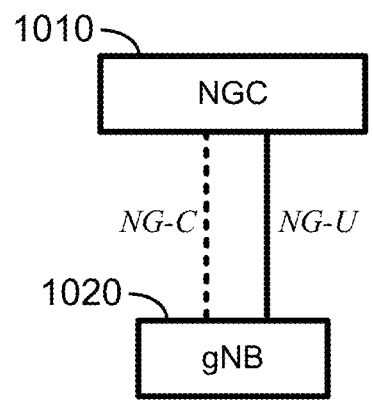
FIG. 10A gNB connected to NGC
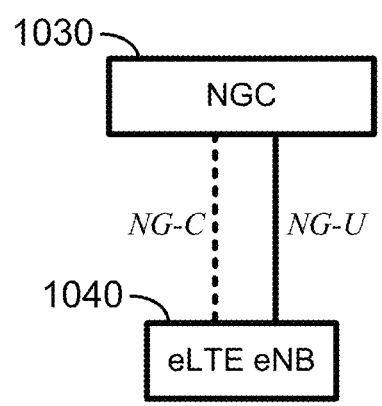
FIG. 10B eLTE eNB connected to NGC

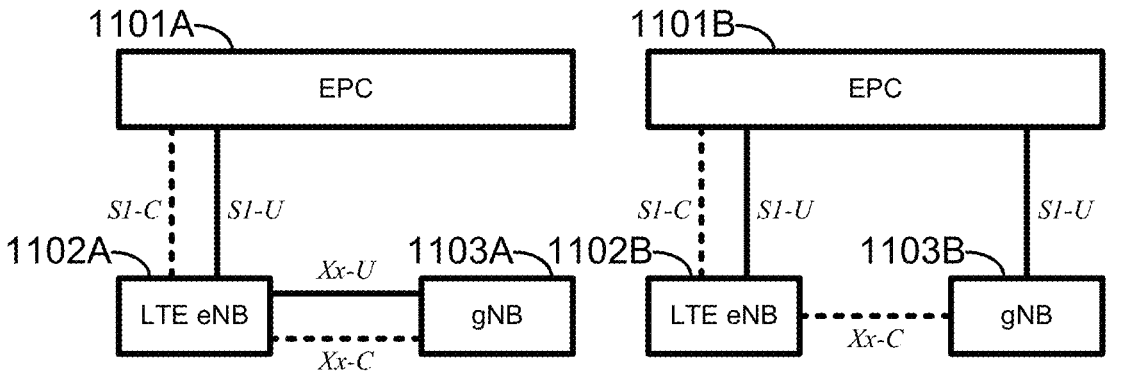

FIG. 11A  LTE eNB connected to EPC with non-standalone gNB.
gNB user plane connected to EPC via LTE eNB.

FIG. 11B  LTE eNB connected to EPC with non-standalone gNB.
gNB user plane connected to EPC directly.

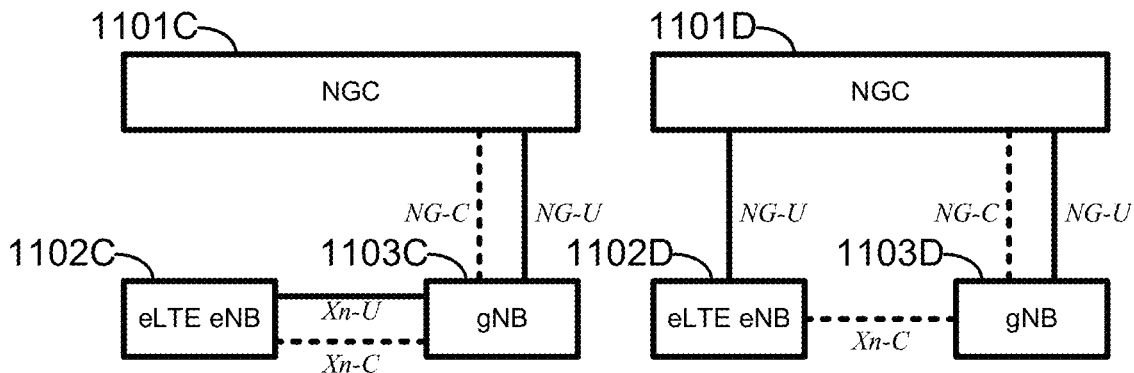

FIG. 11C  gNB connected to NGC with non-standalone eLTE eNB.
eLTE eNB user plane connected to NGC via gNB.

FIG. 11D  gNB connected to NGC with non-standalone eLTE eNB.
eLTE eNB user plane connected to NGC directly.

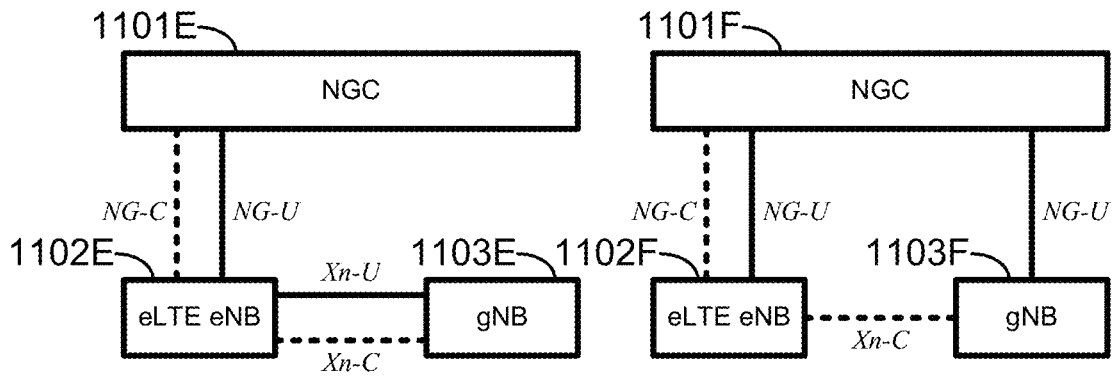

FIG. 11E  eLTE eNB connected to NGC with non-standalone gNB.
gNB user plane connected to NGC via eLTE eNB.

FIG. 11F  eLTE eNB connected to NGC with non-standalone gNB.
gNB user plane connected to NGC directly.

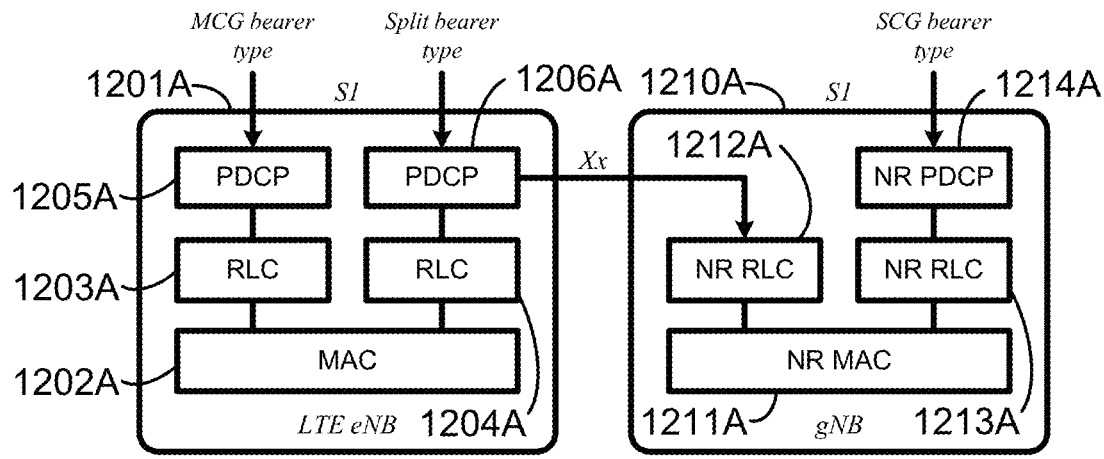
FIG. 12A Radio protocol architecture for split bearer and SCG bearer. LTE eNB connected to EPC with non-standalone gNB.
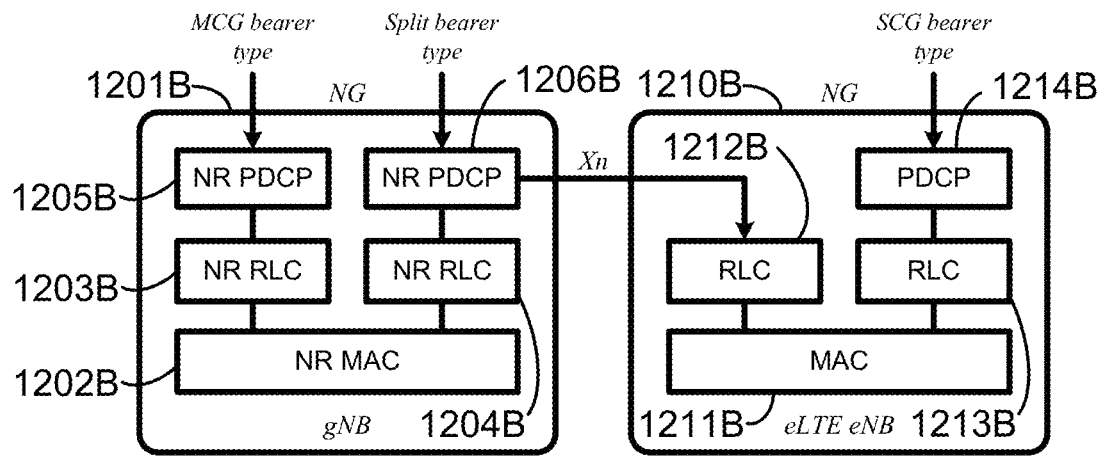
FIG. 12B Radio protocol architecture for split bearer and SCG bearer. gNB connected to NGC with non-standalone eLTE eNB.
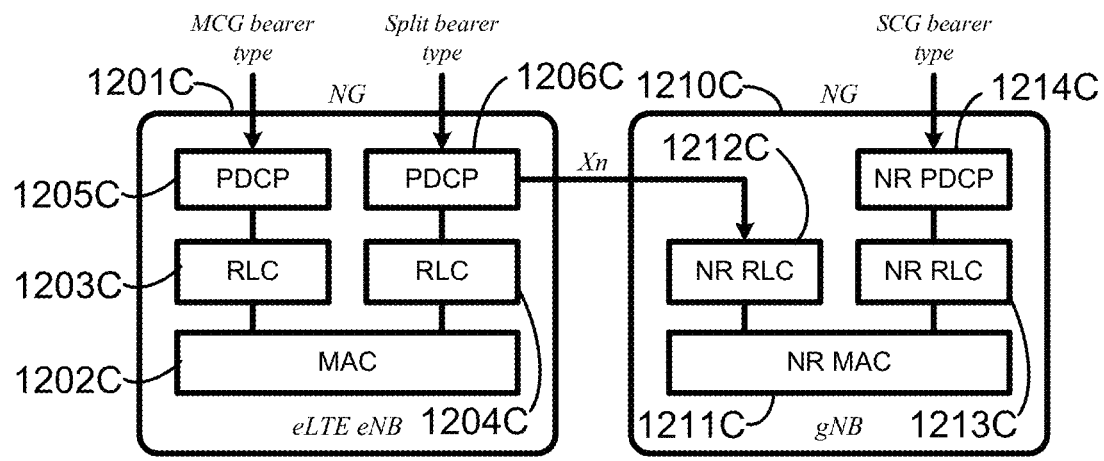
FIG. 12C Radio protocol architecture for split bearer and SCG bearer. eLTE eNB connected to NGC with non-standalone gNB.

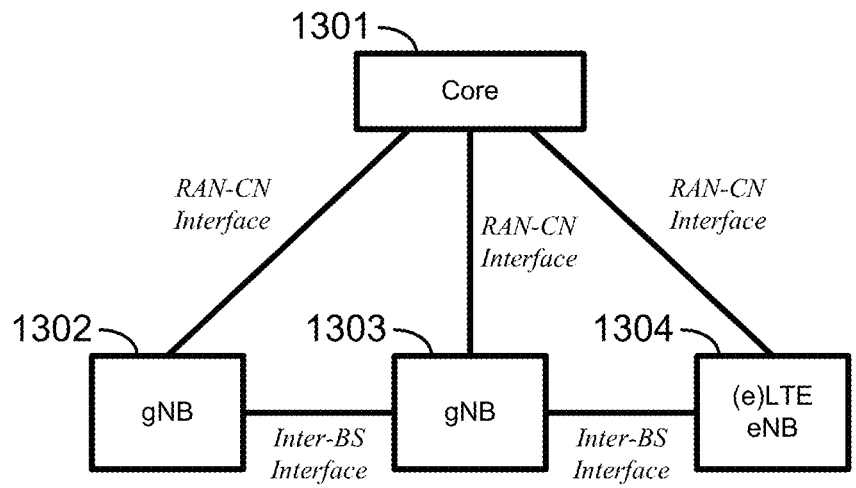
FIG. 13A Non-centralized deployment
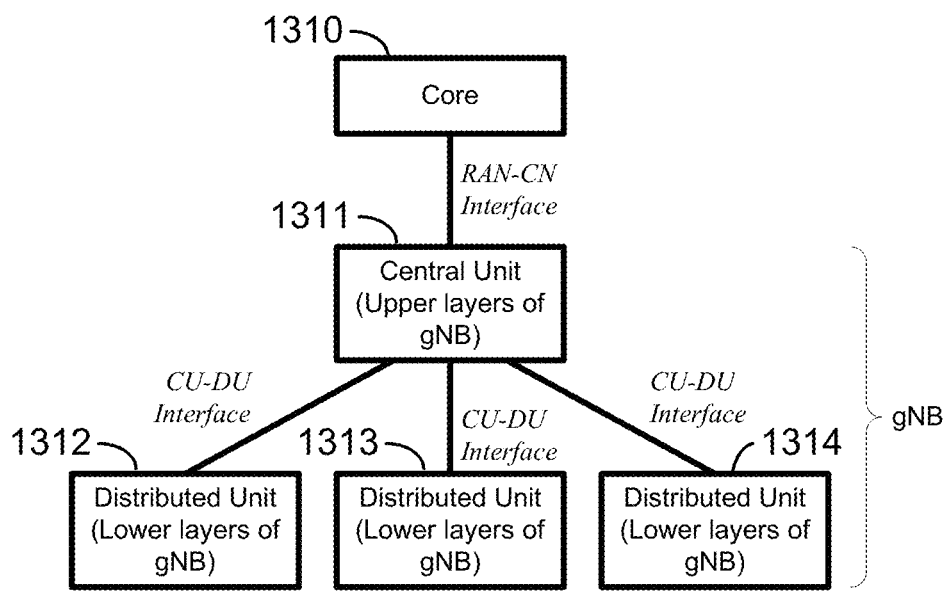
FIG. 13B Centralized deployment

| Layer | Preamble | Start of frame delimiter | MAC destination | MAC source | 802.1Q tag (optional) | Ethertype (Ethernet II) or length (IEEE 802.3) | Payload | Frame check sequence (32-bit CRC) | Interpacket gap |
|---|---|---|---|---|---|---|---|---|---|
| | 7 octets | 1 octet | 6 octets | 6 octets | (4 octets) | 2 octets | 46-1500 octets | 4 octets | 12 octets |
| Layer 2 Ethernet frame | | | ← 64-1522 octets → | | | | | | |
| Layer 1 Ethernet packet & IPG | | | | ← 64-1522 octets → | | | | | ← 12 octets → |

802.3 Ethernet packet and frame structure

FIG. 22

WIRELESS DEVICE CAPABILITY INFORMATION

CROSS-REFERENCE TO RELATED APPLICATIONS

This application claims priority to and is a continuation of U.S. application Ser. No. 16/165,613, filed Oct. 19, 2018, which claims the benefit of U.S. Provisional Application No. 62/574,954, titled "Non-Access Stratum Capability Information" and filed on Oct. 20, 2017, as well as U.S. Provisional Application No. 62/575,127, titled "Radio Resource Control Capability Information" and filed on Oct. 20, 2017. The disclosures of these applications are hereby incorporated by reference in their entirety and for all purposes.

BACKGROUND

In wireless communications, packets may be transmitted in a multitude of ways. Packet transmission techniques may go unused if systems for supporting those techniques are not implemented. A wireless communications system may not be able to provide Ethernet over wireless communications for a wireless device due to the system lacking information about the wireless device. As a result, difficulties may arise for a wireless device to obtain desired services using Ethernet over wireless communications.

SUMMARY

The following summary presents a simplified summary of certain features. The summary is not an extensive overview and is not intended to identify key or critical elements.

Systems, apparatuses, and methods are described for communications associated with Ethernet type packet data unit sessions. A base station may transmit, to a wireless device, a request for capability information, which may include a capability of the wireless device conducting an Ethernet type packet data unit session. The wireless device may transmit, to the base station, the capability information. The base station may transmit the capability information to an access and mobility management function. Based on the capability information, the base station and/or the access and mobility management function may determine to instantiate an Ethernet type packet data unit session between the wireless device and the base station. The base station may facilitate a handover of the wireless device to a target base station. The Ethernet type packet data unit session may utilize compressed headers based on instructions from the base station and/or the access and mobility management function.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

FIG. 22 shows an example of an Ethernet packet and frame structure.

DETAILED DESCRIPTION

Figure 1:
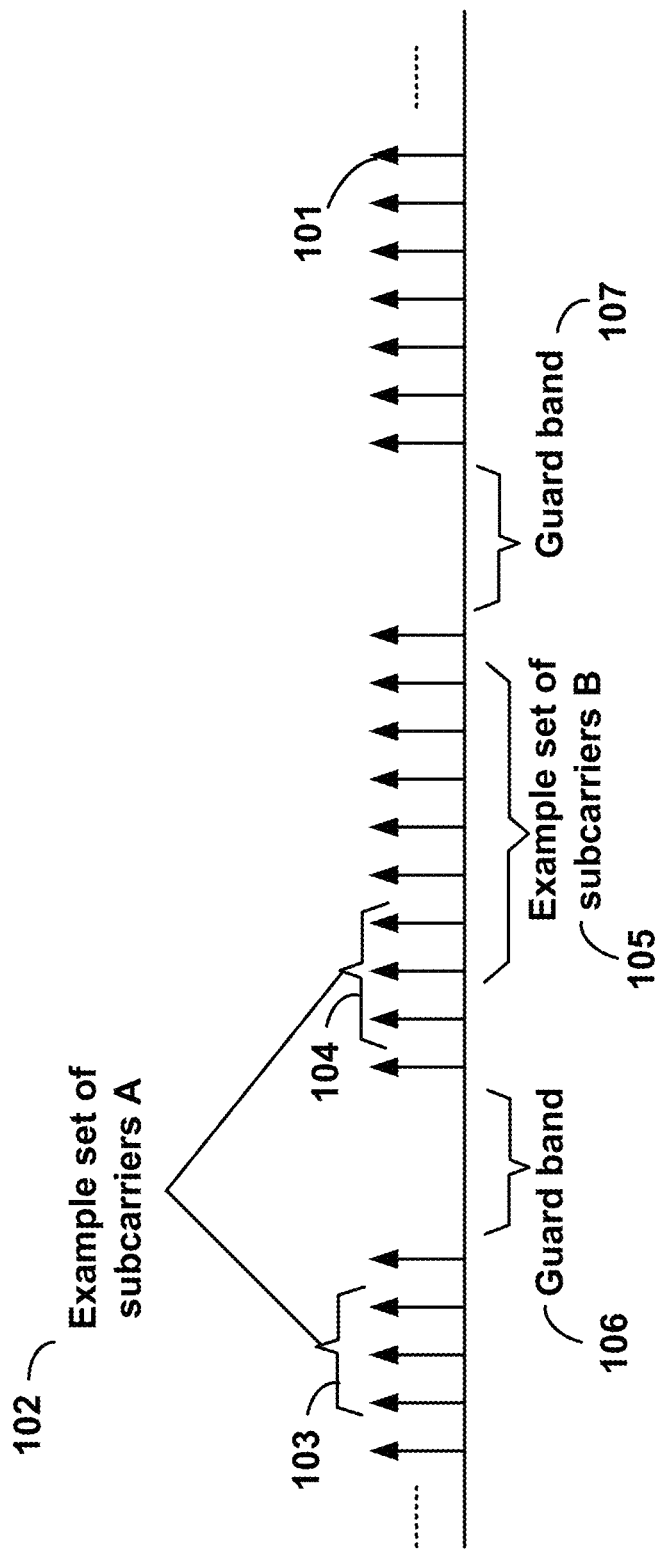
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples of enhanced features and functionalities in networks, such as 5G networks, or other systems are provided. The technology disclosed herein may be employed in the technical field of networks, such as 5G systems, and Ethernet type PDU sessions for communication systems. More particularly, the technology disclosed herein may relate to for Ethernet PDU type sessions in communication systems such as 5GC, 5G, or other systems. The communication systems may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Examples may enable operation of carrier aggregation and may be employed in the technical field of multicarrier communication systems. Examples may relate to beam management procedures with a discontinuous reception configuration in multicarrier communication systems. Although one or more of the above types of devices may be referenced herein (e.g., UE, wireless device, computing device, etc.), it should be understood that any device herein may comprise any one or more of the above types of devices or similar devices.

The following acronyms are used throughout the present disclosure, provided below for convenience although other acronyms may be introduced in the detailed description:

3GPP 3rd Generation Partnership Project
5G 5th generation wireless systems
5GC 5G core network
ACK Acknowledgement
5GS 5G system
5QI 5G QoS indicator
AF application function
AMF access and mobility management function
AN access network
ARP allocation and retention priority
ASIC application-specific integrated circuit
AUSF authentication server function
BPSK binary phase shift keying
CA carrier aggregation
CC component carrier
CDMA code division multiple access
CN Core Network
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DN data network
DN-AAA data network authentication authorization and accounting
DNN data network name
DU distributed unit
eLTE enhanced LTE
eMBB enhanced mobile broadband
eNB evolved Node B
EPC evolved packet core
ESP encapsulating security protocol
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
IETF Internet Engineering Task Force
IP Internet protocol
L2 layer 2 (data link layer)
L3 layer 3 (network layer)
LADN local area data network
LI lawful intercept
LTE long term evolution
MAC media access control
MCG master cell group
MeNB master evolved node B
MIB master information block
MICO mobile initiated connection only
MME mobility management entity
mMTC massive machine type communications
N3IWF non-3GPP interworking function
NACK negative acknowledgement
NAS non-access stratum
NEF network exposure function
NF network function
NG-RAN NR radio access network
NG CP next generation control plane core
NGC next generation core
NG-C NG-control plane
NG-RAN NR radio access network
NG-U NG-user plane
NR MAC new radio MAC
NR PDCP new radio PDCP
NR PHY new radio physical
NR RLC new radio RLC
NR RRC new radio RRC
NR new radio
NRF network repository function
NSSAI network slice selection assistance information
OFDM orthogonal frequency division multiplexing
PCC primary component carrier
PCF policy control function
PCell primary cell
PDCCH physical downlink control channel
PDCP packet data convergence protocol
PDU packet data unit
PEI permanent equipment identifier
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QFI QoS flow identity
QoS quality of service
QPSK quadrature phase shift keying
RA random access RACH random access channel
RAN radio access network
RAP random access preamble
RAR random access response
RAT radio access technology
RB resource blocks
RBG resource block groups
RFC request for comments
RLC radio link control
RM registration management
ROHC robust header compression
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SMF session management function
SN sequence number
S-NSSAI single network slice selection assistance information
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UDM unified data management
UE user equipment
UL uplink
UPF user plane function
UPGW user plane gateway
URLLC ultra-reliable low-latency communications
VHDL VHSIC hardware description language
VPLMN visited public land mobile network
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, etc. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, etc. An example radio transmission method may implement QAM using BPSK, QPSK, 16-QAM, 64-QAM, 256-QAM, etc. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
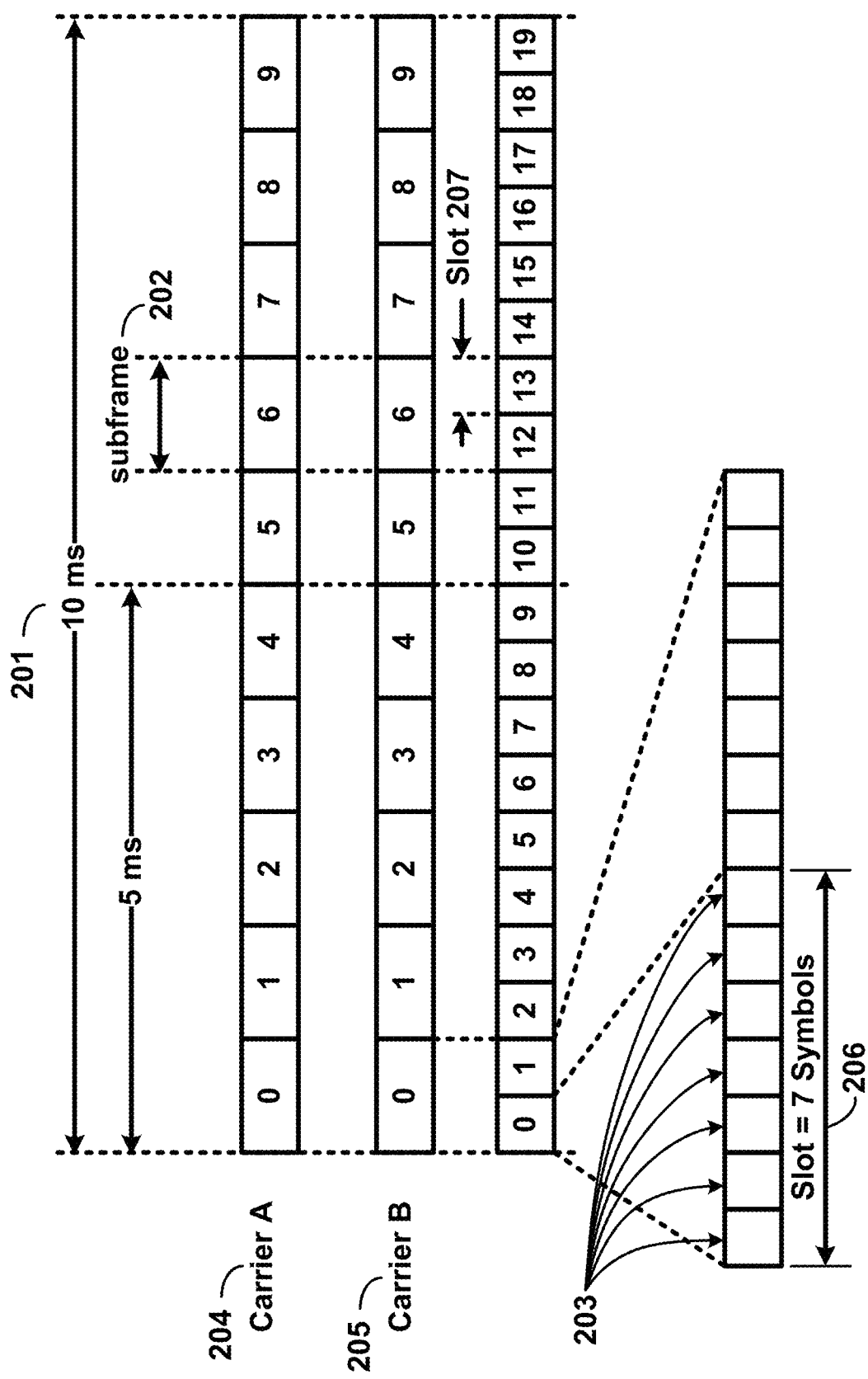
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
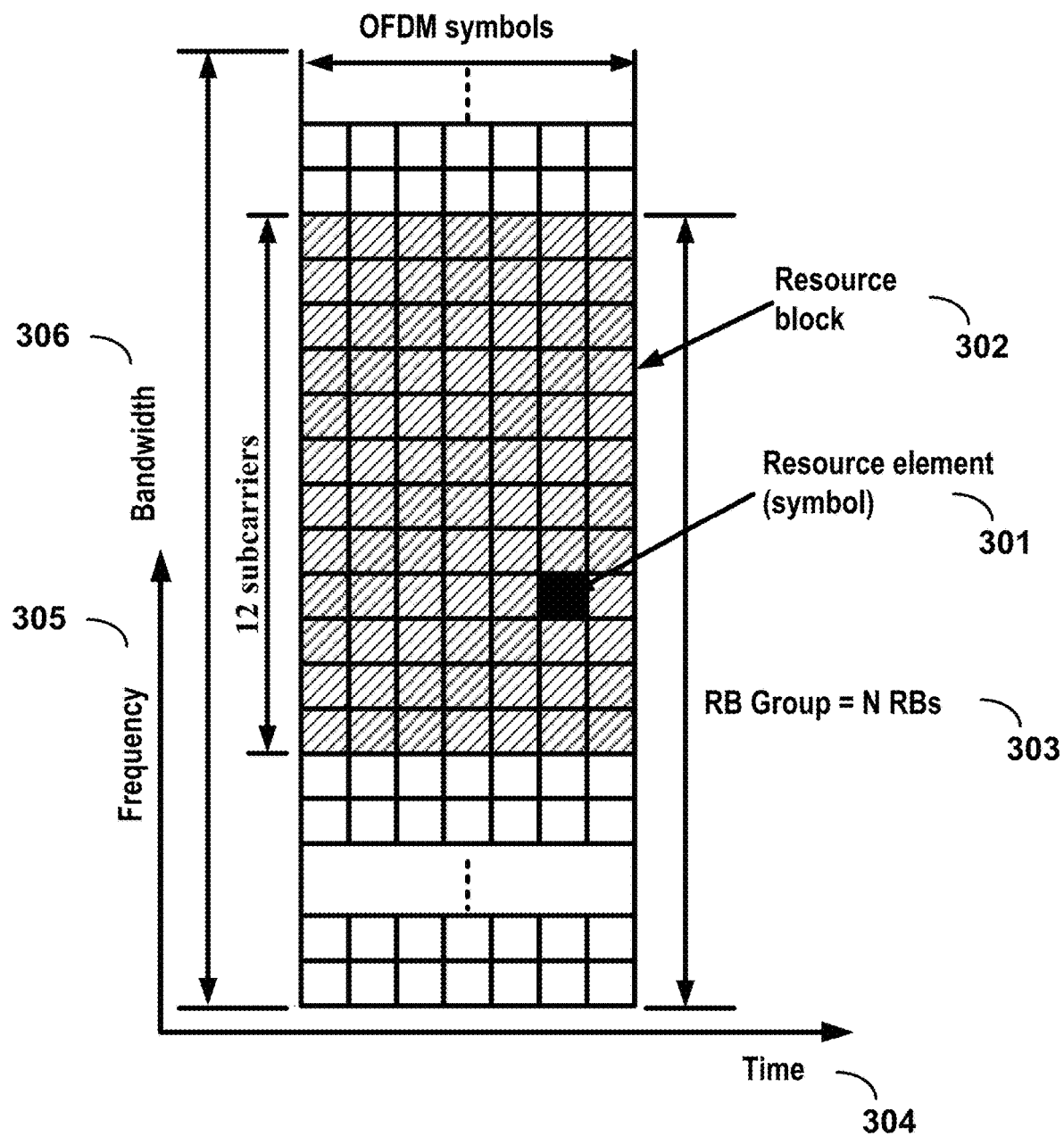
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
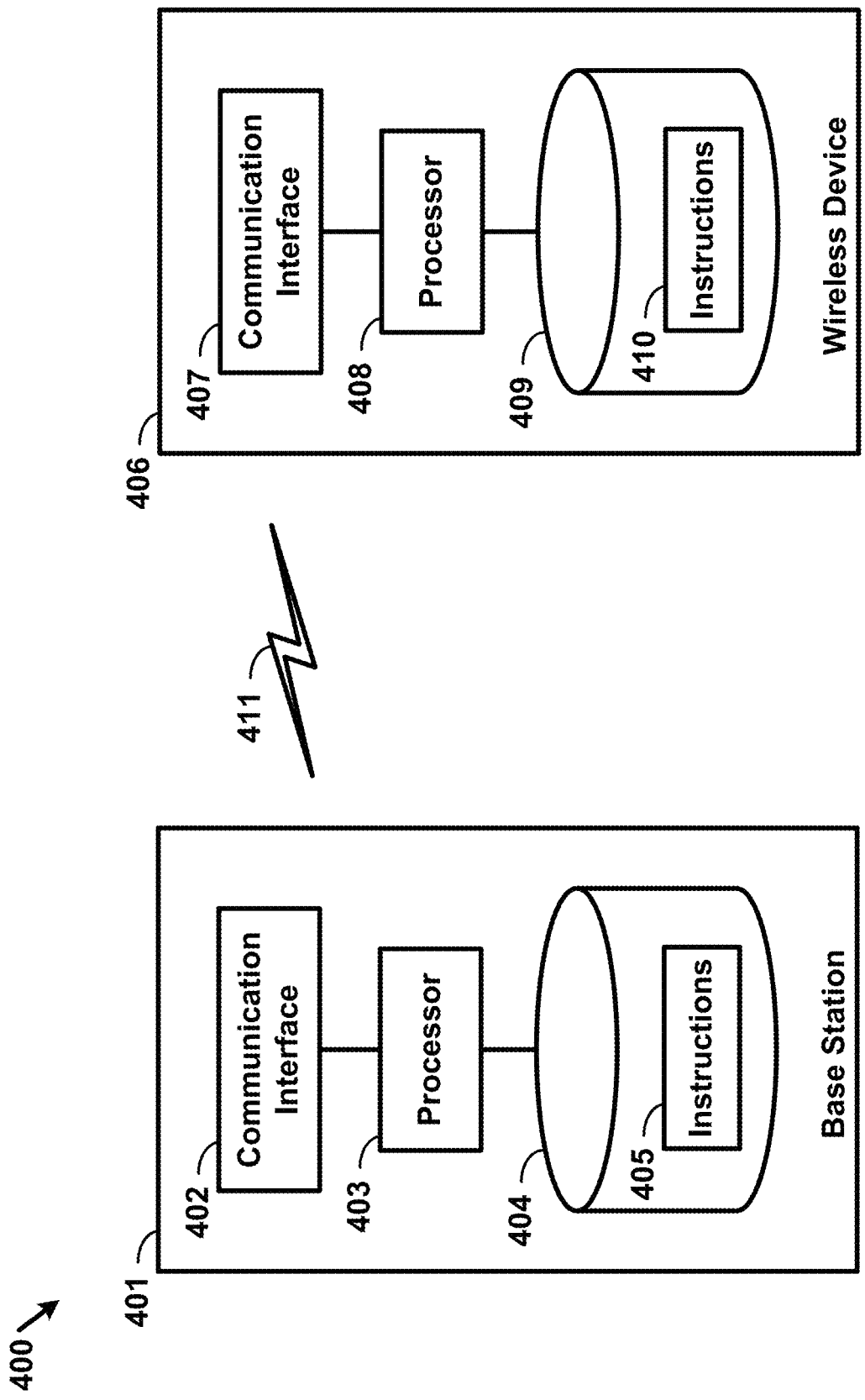
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, etc. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, etc.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g.

packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, etc. A software interface may include code stored in a memory device to implement protocol(s), protocol layers, communication drivers, device drivers, combinations thereof, etc. A firmware interface may include a combination of embedded hardware and code stored in and/or in communication with a memory device to implement connections, electronic device operations, protocol(s), protocol layers, communication drivers, device drivers, hardware operations, combinations thereof, etc.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, etc. may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, etc. Example criteria may be based, at least in part, on for example, traffic load, initial system set up, packet sizes, traffic characteristics, a combination of the above, etc. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, etc. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example of an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; etc.

FIG. 5B shows an example for performing modulation and up-conversion to the carrier frequency of the complex-valued DFTS-OFDM/SC-FDMA baseband signal, e.g., for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; etc.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
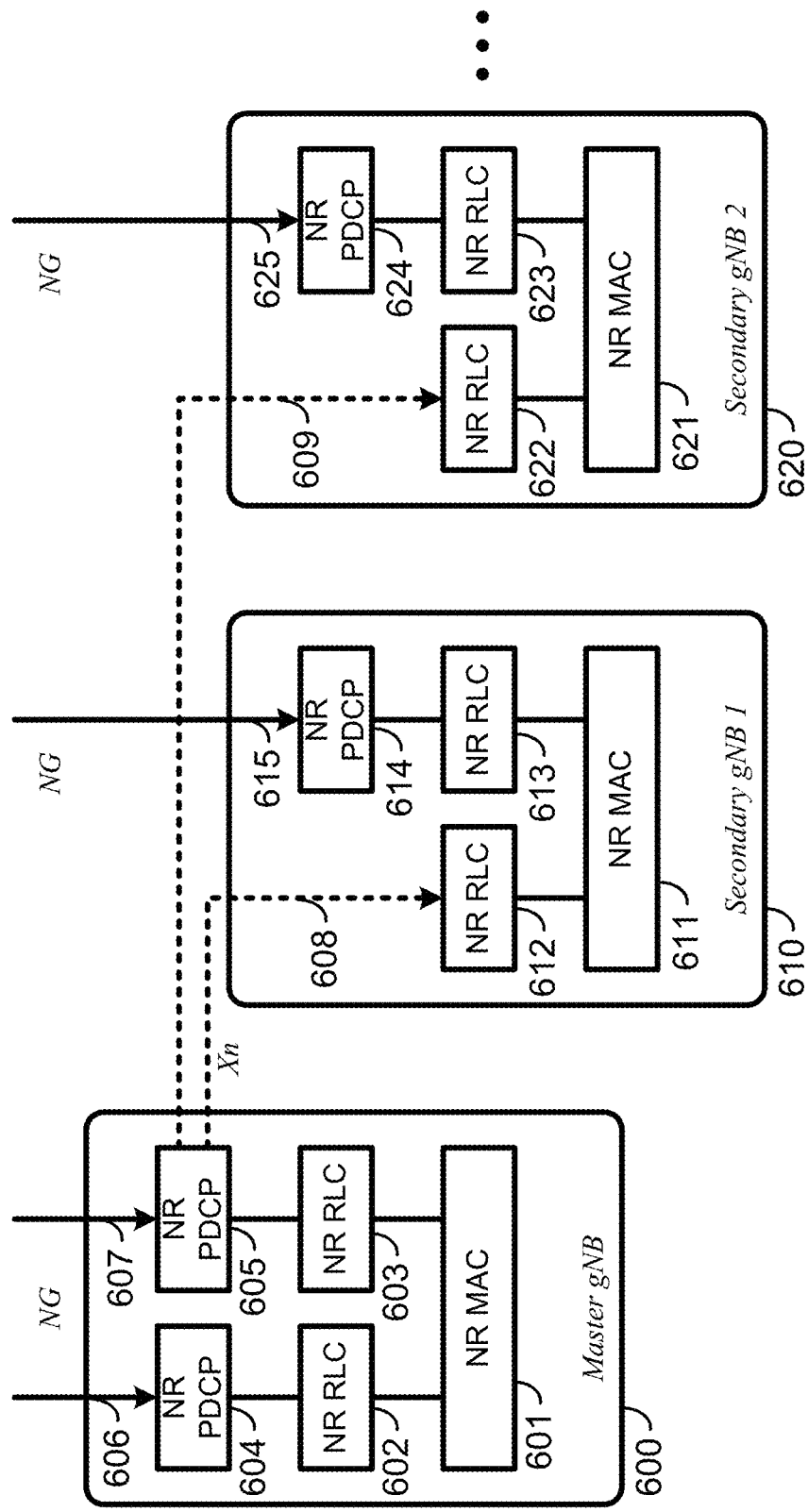
FIG. 6 shows an example protocol structure with multi-connectivity.
Figure 7:
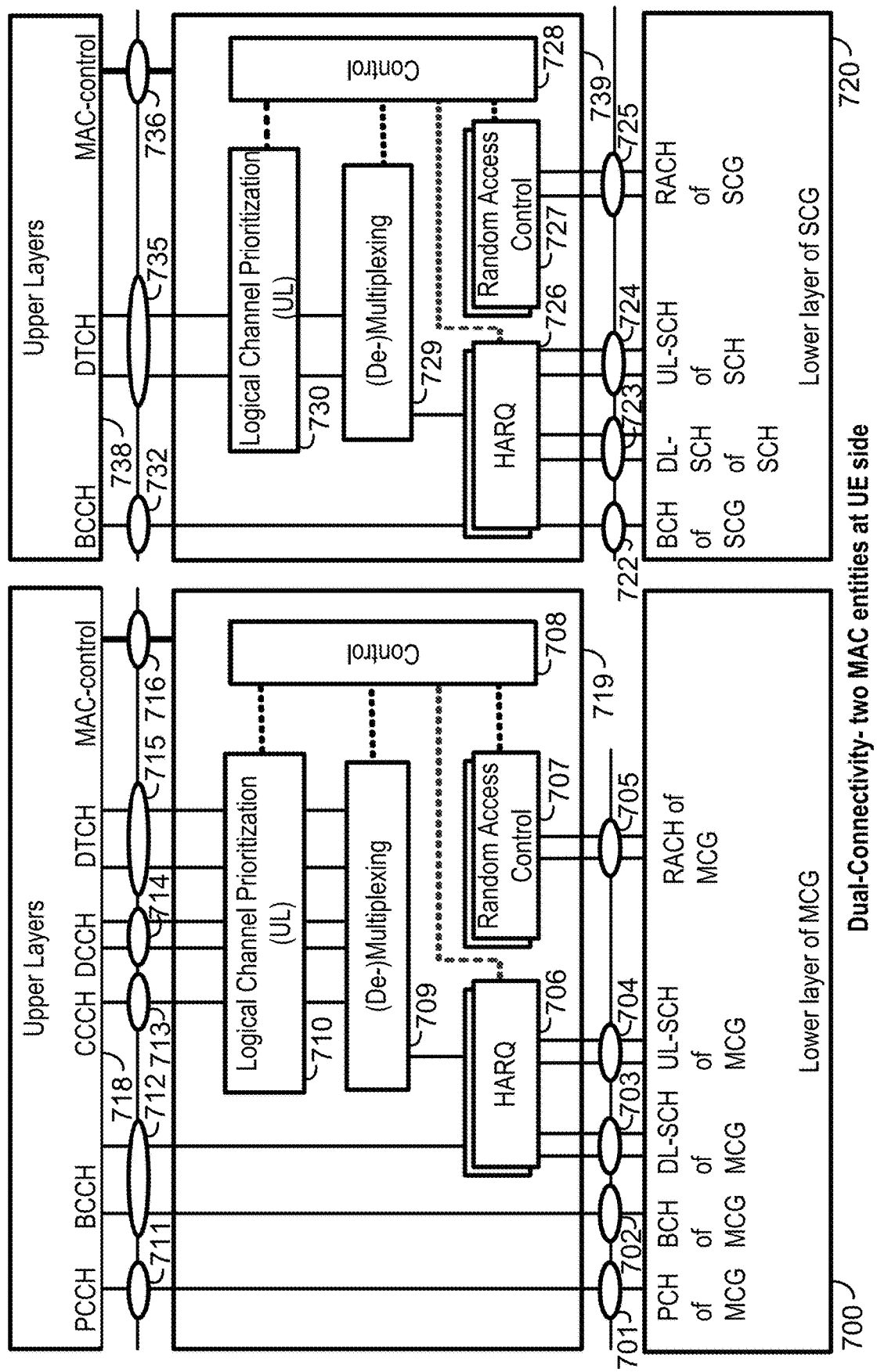
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the wireless device side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as an MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
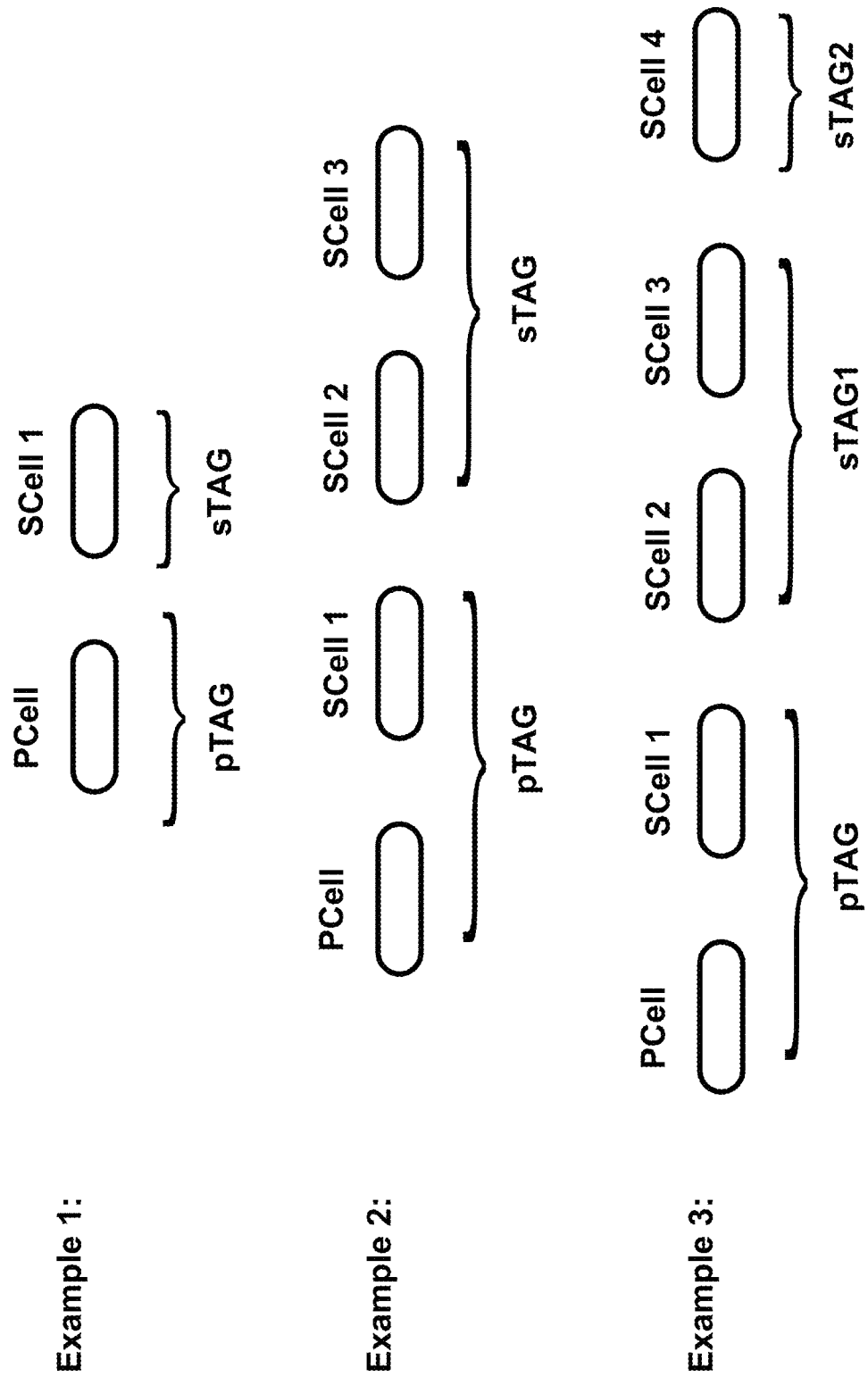
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
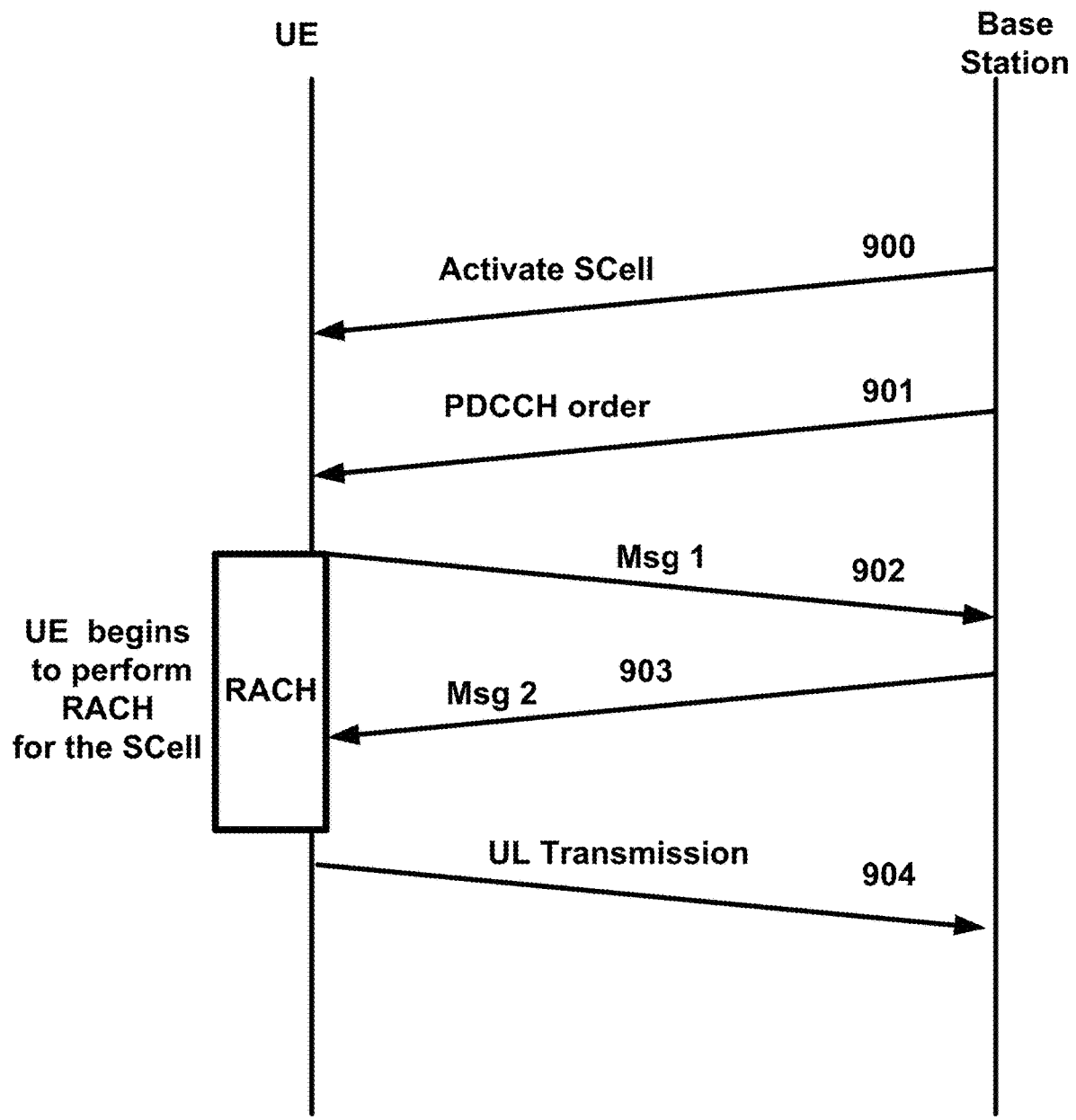
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, e.g., after the activation command 900. The wireless device may begin to perform a RACH process for the SCell, which may be initiated, e.g., after receiving the PDDCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers. An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
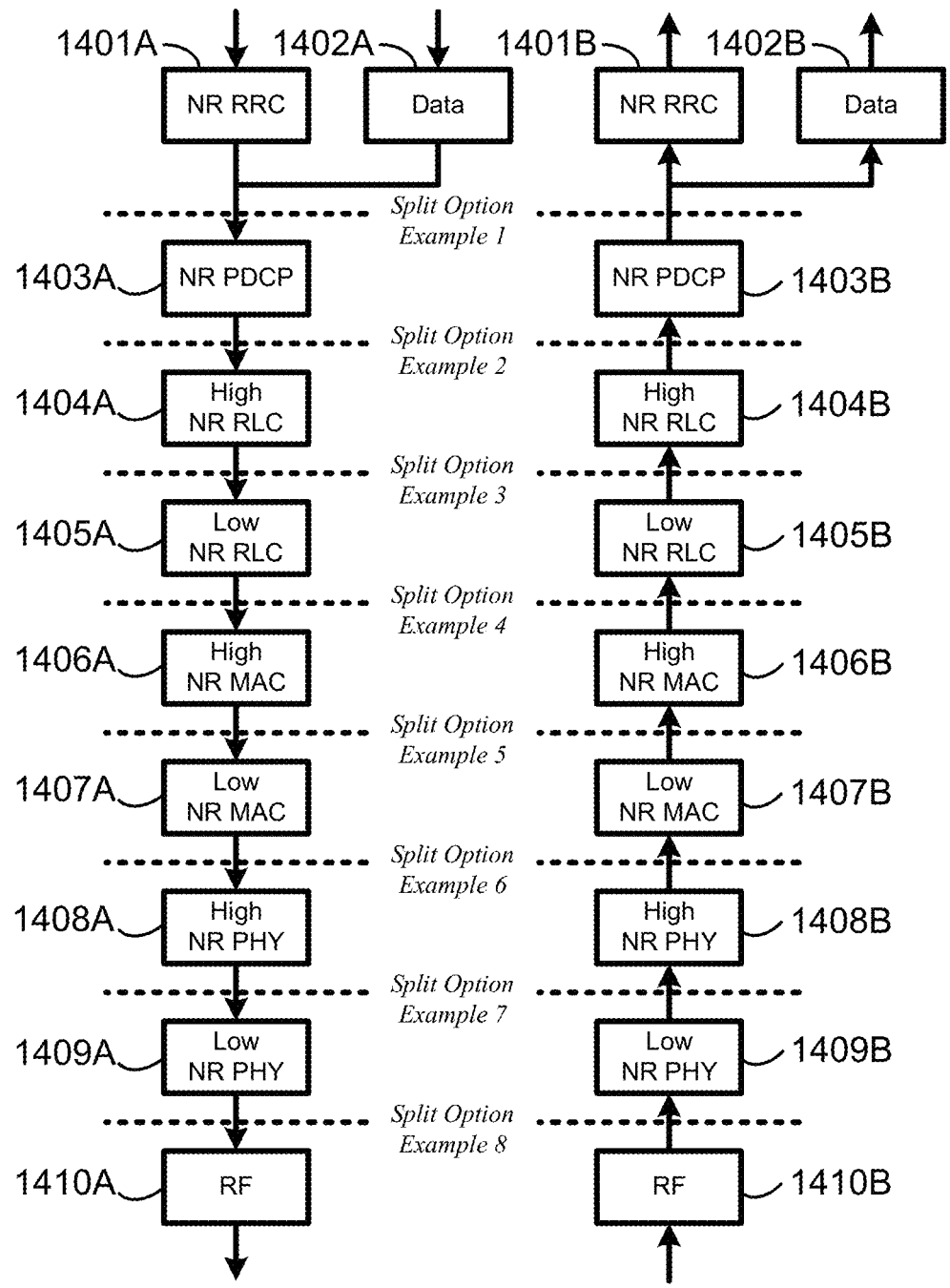
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

Figure 15:
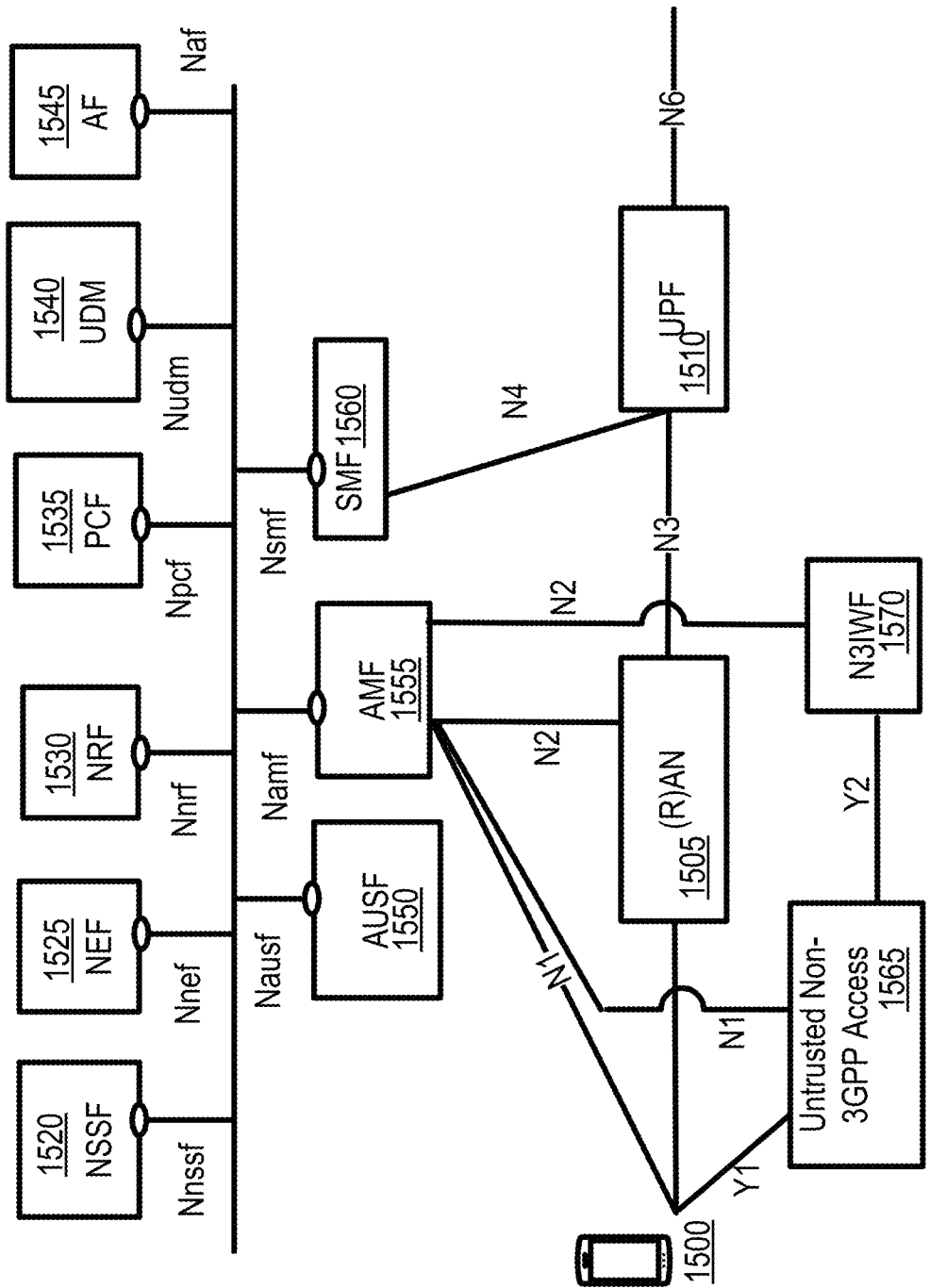
FIG. 15 shows an example 5G system architecture.
Figure 16:
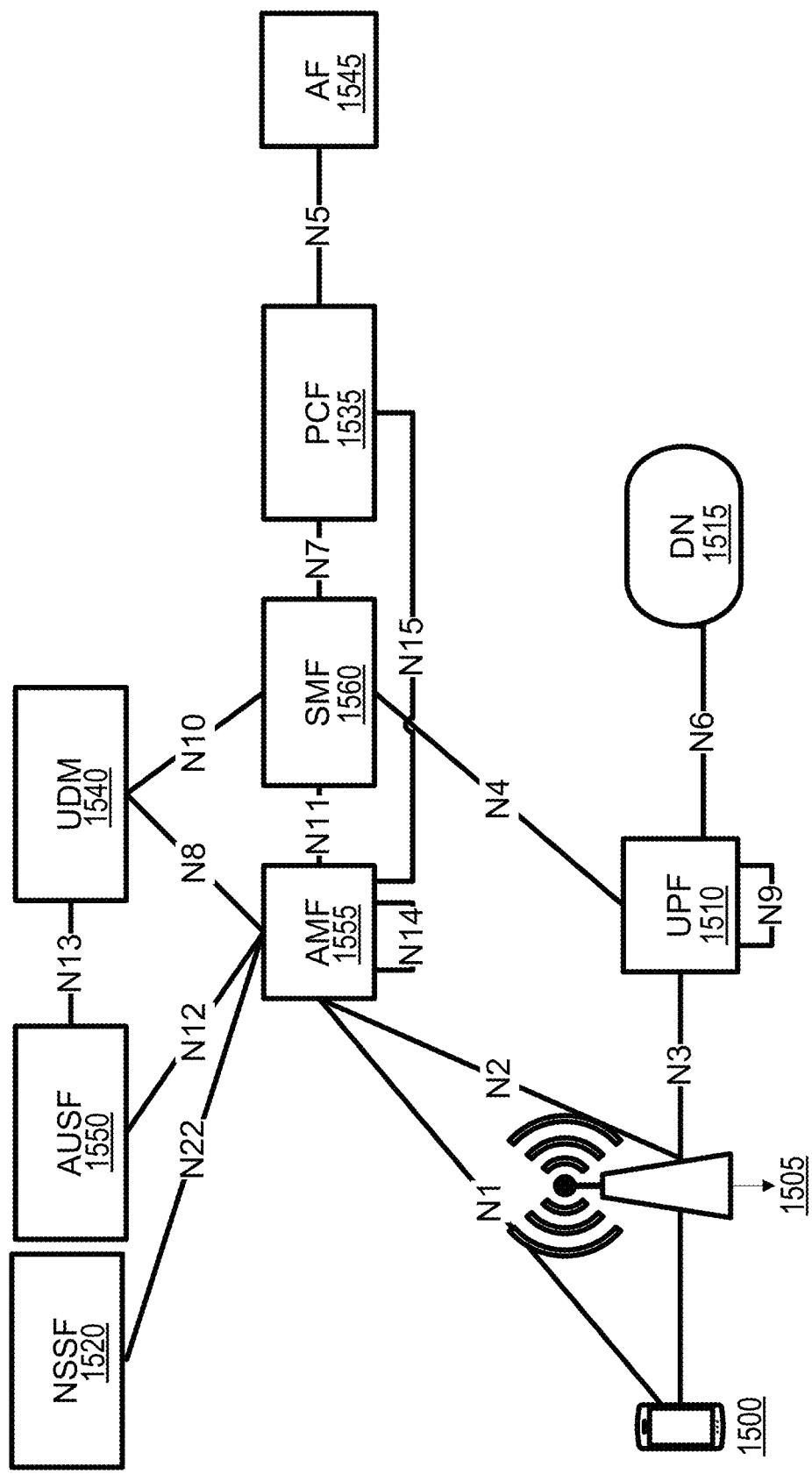
FIG. 16 shows an example 5G system architecture.

FIG. 15 and FIG. 16 show examples of 5G system architecture. A 5G access network may comprise an access network connecting to a 5GC. An access network may comprise an AN 1505 (e.g., NG-RAN such as in FIG. 15, or any access node such as in FIG. 16) and/or non-3GPP AN 1565 which may be an untrusted AN. An example 5GC may connect to one or more 5G access networks (e.g., a 5G AN) and/or NG-RANs. The 5GC may comprise functional elements or network functions as in example FIG. 15 and example FIG. 16, where interfaces may be employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

The access and mobility management function AMF 1555 may comprise one or more of the following functionalities: termination of (R)AN CP interface (N2), termination of NAS (N1), NAS ciphering and integrity protection, registration management, connection management, reachability management, mobility management, lawful intercept (e.g., fAMF events and interface to LI system), transport for session management, SM messages between a wireless device 1500 and an SMF 1560, transparent proxy for routing SM messages, access authentication, access authorization, transport for short message service (SMS) messages between a wireless device 1500 and an SMS function (SMSF), security anchor function (SEA) interaction with the AUSF 1550 and the wireless device 1500, receiving an intermediate key established as a result of the wireless device 1500 authentication process, security context management (SCM), and/or receiving a key from the SEA to derive access network specific keys. A variety of these functionalities may be supported in a single instance of an AMF 1555 and/or in multiple instances of AMF 1555 as appropriate.

The AMF 1555 may support non-3GPP access networks via an N2 interface with N3IWF 1570, NAS signaling with the wireless device 1500 over N3IWF 1570, authentication of wireless devices connected over N3IWF 1570, management of mobility, authentication, and separate security context state(s) of the wireless device 1500 connected via non-3GPP access 1565 or connected via 3GPP access 1505 and non-3GPP accesses 1565 simultaneously, support of a coordinated RM context valid over 3GPP access 1505 and non-3GPP access 1565, and/or support of context management (CM) management contexts for the wireless device 1500 for connectivity over non-3GPP access. Some functionalities described above may be supported in an instance of a network slice. An AMF 1555 region may comprise of one or multiple AMF 1555 sets. And AMF 1555 set may comprise one or more AMFs 1555 that may serve a given area and/or network slice(s). Multiple AMF 1555 sets may be per AMF 1555 region and/or per network slice(s). Application identifiers may be mapped to one or more specific application traffic detection rules. A configured NSSAI may be a NSSAI that has been provisioned in the wireless device 1500. DN 1515 access identifier (DNAI), for a DNN, may be an identifier of a user plane access to a DN 1515. Initial registration may be related to a wireless device 1500 registration in a RM-DEREGISTERED state. N2AP wireless device 1500 association may be a logical per wireless device 1500 association between a 5G AN node and an AMF 1555. The wireless device 1500 may comprise a N2AP wireless device-TNLA-binding, which may be a binding between a N2AP wireless device 1500 association and a specific transport network layer (TNL) association for a given wireless device 1500.

The session management function (SMF) 1560 may comprise one or more of the following functionalities: session management (e.g., session establishment, modify and/or release that may comprise a tunnel maintained between the UPF 1510 and the AN 1505 node), wireless device IP address allocation and management (comprising optional authorization), selection and/or control of user plane function(s), configuration of traffic steering at a UPF 1510 to route traffic to its proper destination, termination of interfaces towards policy control functions, control part of policy enforcement and/or QoS, lawful intercept (e.g., for SM events and interface to an LI system), termination of SM parts of NAS messages, downlink data notification, initiation of AN specific SM information, sent via an AMF 1555 over an N2 to (R)AN 1505, determination of SSC mode of a session, roaming functionality, handling local enforcement to apply QoS SLAs (e.g., for a VPLMN), charging data collection and charging interface (e.g., for a VPLMN), lawful intercept (e.g., in a VPLMN for SM events and interface to LI system), and/or support for interaction with external DN 1515 for transport of signaling for PDU session authorization/authentication by external DN 1515. One or more of these functionalities may be supported in a single instance of a SMF 1560. One or more of the functionalities described above may be supported in an instance of a network slice.

The user plane function (UPF) 1510 may comprise one or more of the following functionalities: anchor point for Intra-/Inter-RAT mobility (if applicable), external PDU session point of interconnect to DN 1515, packet routing and/or forwarding, packet inspection and/or a user plane part of policy rule enforcement, lawful intercept (e.g., UP collection), traffic usage reporting, uplink classifier to support routing traffic flows to a data network, branching point to support multi-homed PDU session(s), QoS handling for a user plane, uplink traffic verification (e.g., SDF to QoS flow mapping), transport level packet marking in the uplink and/or downlink, downlink packet buffering, and/or downlink data notification triggering. One or more of these functionalities may be supported in a single instance of a UPF 1510. One or more of functionalities described above may be supported in an instance of a network slice. User plane function(s) (e.g., UPF(s)) 1510 may handle the user plane path of PDU sessions. A UPF 1510 that provides the interface to a data network supports the functionality of a PDU session anchor.

IP address management may comprise allocation and release of the wireless device IP address as well as renewal of the allocated IP address. The wireless device 1500 may set the requested PDU type during the PDU session establishment procedure based on its IP stack capabilities and configuration. The SMF 1560 may select PDU type of a PDU session as follows: if the SMF 1560 receives a request with PDU type set to IP, the SMF 1560 may select either PDU type IPv4 or IPv6 based on DNN configuration and/or operator policies. The SMF 1560 may also provide a cause value to the wireless device 1500 to indicate whether the other IP version (e.g., IPv6 if IPv4 is selected and vice versa) may be supported on the DNN. If the other IP versions are supported, wireless device 1500 may request another PDU session to the same DNN for the other IP version. If the SMF 1560 receives a request for PDU type IPv4 or IPv6 and the requested IP version may be supported by the DNN, the SMF 1560 selects the requested PDU type. The 5GC elements and wireless device 1500 support the following mechanisms: during PDU session establishment procedure, the SMF 1560 may send the IP address to the wireless device 1500 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 1540 or based on the configuration on a per-subscriber, per-DNN basis.

The policy control function PCF 1535 may support unified policy framework to govern network behavior, provide policy rules to control plane function(s) to enforce them, and/or implement a front end to access subscription information relevant for policy decisions in a user data repository (UDR). The unified data management UDM 1540 may comprise an application front end (FE) that comprises the UDM-FE that may be in charge of processing credentials, location management, and/or subscription management. The PCF 1535 may be in charge of policy control and the user data repository (UDR) that stores data required for functionalities provided by UDM-FE, plus policy profiles required by the PCF 1535. The data stored in the UDR may comprise at least user subscription data, comprising at least subscription identifiers, security credentials, access and mobility related subscription data, session related subscription data, and/or policy data.

The network exposure function NEF 1525 may provide a means to securely expose the services and capabilities provided by the 3GPP network functions, translate between information exchanged with the AF 1545 and information exchanged with the internal network functions, and/or receive information from other network functions.

The NF repository function NRF 1530 may support a service discovery function that receives NF discovery requests from a NF instance, provides the information of the discovered NF instances to the NF instance, and/or maintains the information of available NF instances and their supported services.

The network slice selection function (NSSF) 1520 may support selecting the set of network slice instances serving the wireless device 1500, determining the provided NSSAI, determining the AMF 1555 set to be employed to serve the wireless device 1500, and/or, based on configuration, determining a list of candidate AMF(s) 1555, possibly by querying the NRF 1530.

The functionality of non-3GPP interworking function N3IWF 1570 for non-3GPP access 1565 may comprise at least one or more of the following: supporting of IPsec tunnel establishment with the wireless device, terminating the IKEv2/IPsec protocols with the wireless device 1500 over NWu, relaying over N2 the information needed to authenticate the wireless device 1500 and authorize its access to the 5GC, terminating of N2 and N3 interfaces to 5GC for control-plane and user-plane respectively, relaying uplink and downlink control-plane NAS (N1) signaling between the wireless device 1500 and AMF 1555, handling of N2 signaling from SMF 1560 (which may be relayed by AMF 155) related to PDU sessions and QoS, establishing of IPsec security association (IPsec SA) to support PDU session traffic, relaying uplink and downlink user-plane packets between the wireless device 1500 and UPF 1510, enforcing QoS corresponding to N3 packet marking, considering QoS requirements associated to such marking received over N2, N3 user-plane packet marking in the uplink, local mobility anchor within untrusted non-3GPP access networks 1565 using MOBIKE, and/or supporting AMF 1555 selection.

The application function AF 1545 may interact with the 3GPP core network to provide a variety of services. Based on operator deployment, AF 1545 may be trusted by the operator to interact directly with relevant network functions. Application functions not provided by the operator to access directly the network functions may use the external exposure framework (via the NEF 125) to interact with relevant network functions.

The control plane interface between the (R)AN 1505 and the 5GC may support connection of multiple different kinds of ANs, such as 3GPP (R)AN 1505 and/or N3IWF 1570, to the 5GC via a unique control plane protocol. A single N2 AP protocol may be employed for both the 3GPP access 1505 and non-3GPP access 1565 and/or for decoupling between AMF 1555 and other functions such as SMF 1560 that may need to control the services supported by AN(s) (e.g. control of the UP resources in the AN 1505 for a PDU session). The 5GC may be able to provide policy information from the PCF 1535 to the wireless device 1500. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 1500 via non-3GPP access networks 1565. As shown in example FIG. 19, the registration management, RM may be employed to register or de-register a wireless device 1500 with the network, and establish the user context in the network. Connection management may be employed to establish and release the signaling connection between the wireless device 1500 and the AMF 1555.

A wireless device 1500 may need to register with the network to receive services that require registration. The wireless device 1500 may update its registration with the network, e.g., periodically, after the wireless device is registered, to remain reachable (e.g., periodic registration update), on mobility (e.g. mobility registration update), and/or to update its capabilities or re-negotiate protocol parameters. An initial registration procedure, such as in the examples shown in FIG. 22A and FIG. 22B, may involve execution of network access control functions (e.g., user authentication and access authorization based on subscription profiles in UDM 1540). As result of the registration procedure, the identity of the serving AMF 1555 may be registered in UDM 1540. The registration management (RM) procedures may be applicable over both 3GPP access 1505 and non-3GPP access 1565.

Figure 17:
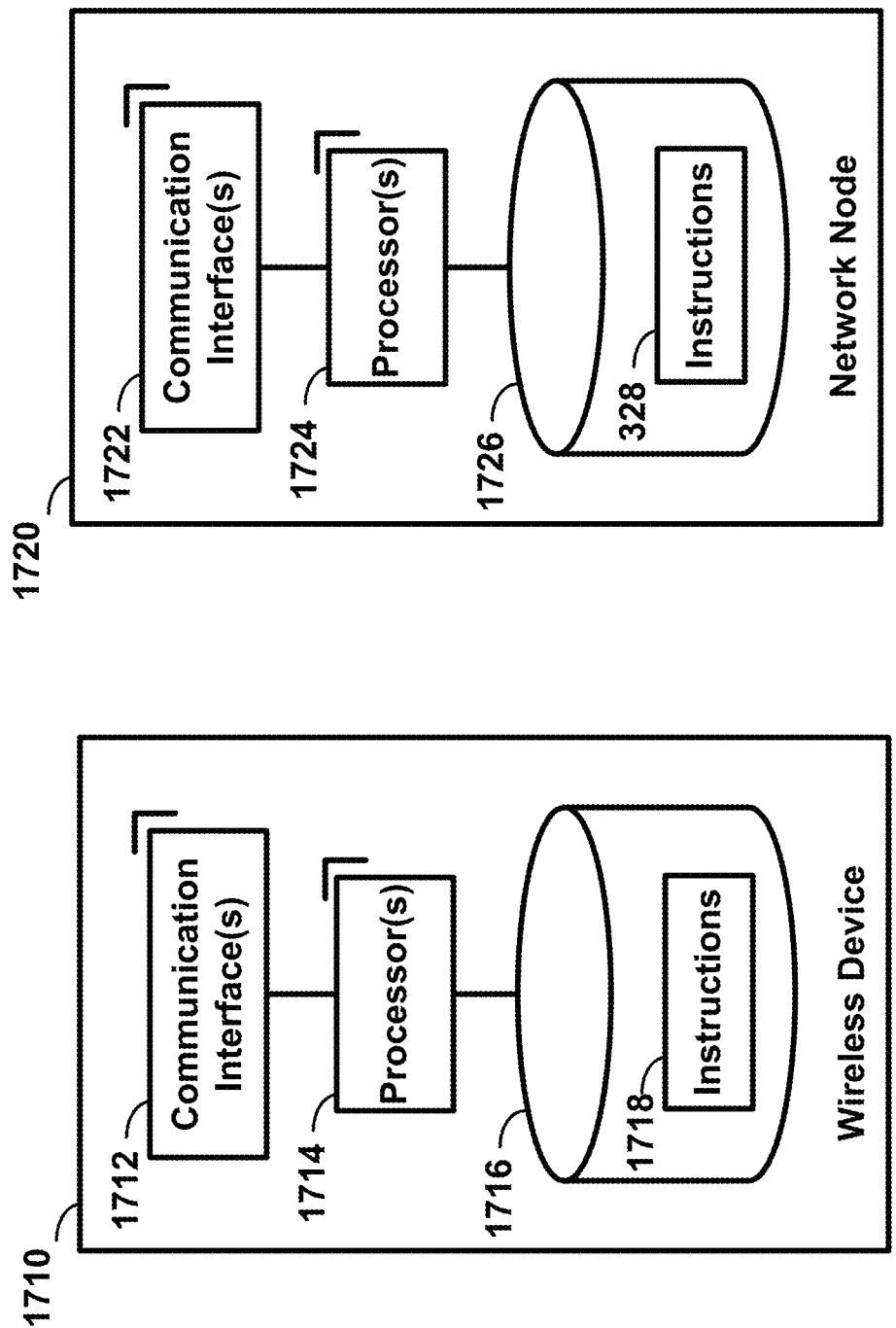
FIG. 17 shows an example of a wireless device and a network node.

FIG. 17 shows hardware elements of a network node 1720 (e.g., a base station) and a wireless device 1710. A communication network may include at least one network node 1720 and at least one wireless device 1710. The network node 1720 may include one or more communication interface 1722, one or more processors 1724, and one or more sets of program code instructions 1728 stored in non-transitory memory 1726 and executable by the one or more processors 1724. The wireless device 1710 may include one or more communication interface 1712, one or more processors 1714, and one or more sets of program code instructions 1718 stored in non-transitory memory 1716 and executable by the one or more processors 1714. A communication interface 1722 in the network node 1720 may be configured to engage in communication with a communication interface 1712 in the wireless device 1710, such as via a communication path that includes at least one wireless link. The wireless link may be a bi-directional link. The communication interface 1712 in the wireless device 1710 may also be configured to engage in communication with the communication interface 1722 in the network node 1720. The network node 1720 and the wireless device 1710 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, etc. Examples for radio technology implemented in the communication interfaces 1712, 1722 and the wireless link are shown in FIG. 17, FIGS. 18A, and 18B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals. Any reference to one or more of these terms/devices also considers use of any other term/device mentioned above.

The communications network may comprise Radio Access Network (RAN) architecture. The RAN architecture may comprise one or more RAN nodes that may be a next generation Node B (gNB) (e.g., 1720) providing New Radio (NR) user plane and control plane protocol terminations towards a first wireless device (e.g. 1710). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. The network node 1720 may comprise one or more of a gNB, ng-eNB, etc.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multihomed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between 3$^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, etc. A software interface may include code stored in a memory device to implement protocol(s), protocol layers, communication drivers, device drivers, combinations thereof, etc. A firmware interface may include a combination of embedded hardware and code stored in and/or in communication with a memory device to implement connections, electronic device operations, protocol(s), protocol layers, communication drivers, device drivers, hardware operations, combinations thereof, etc.

Figure 18:
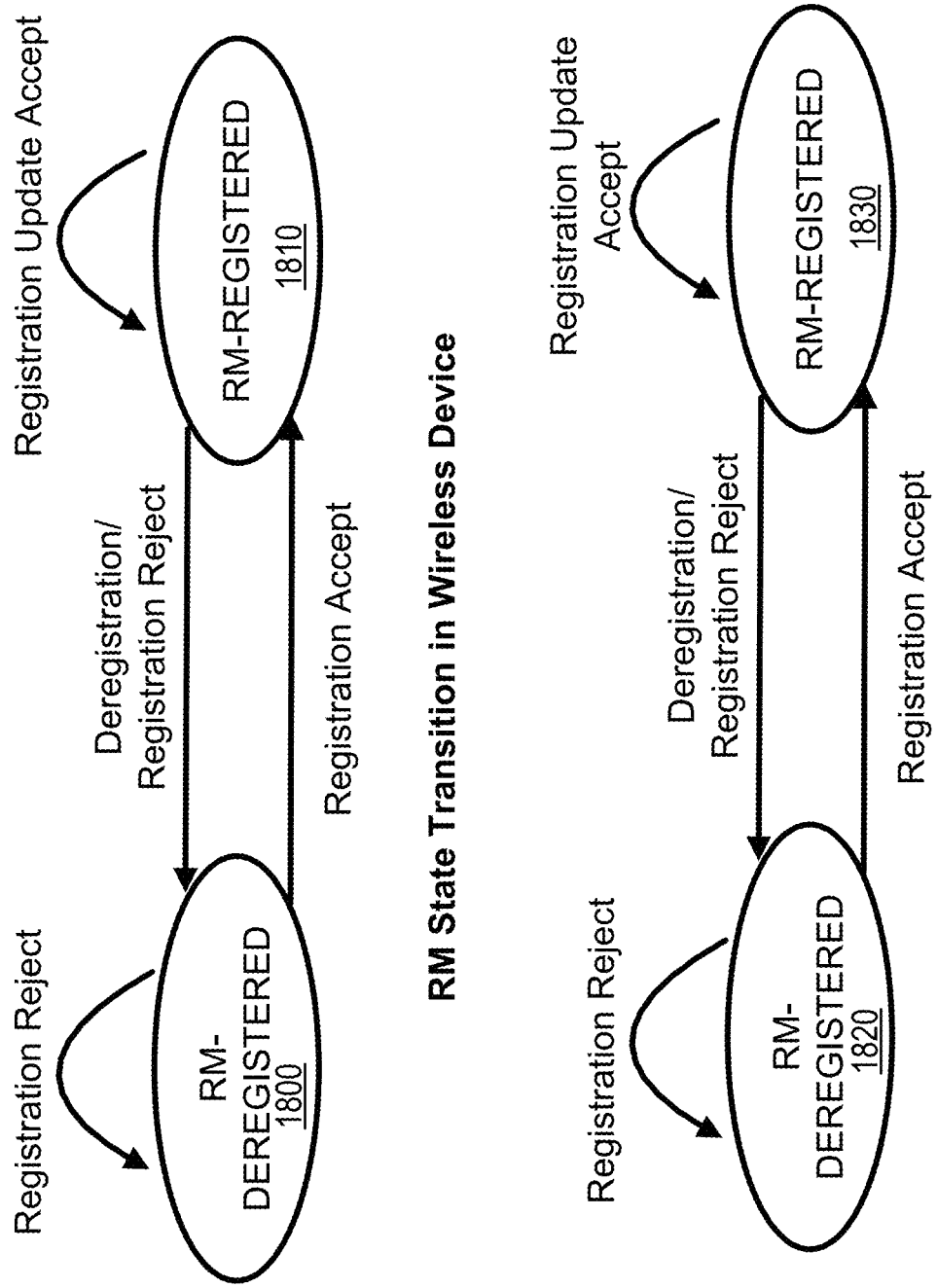
FIG. 18 shows examples of registration management state models for a wireless device and an access and mobility management function (AMF).

FIG. 18 depicts examples of the RM states of a wireless device, such as the wireless device 1500, as observed by the wireless device 1500 and AMF 1555. The top half of FIG. 18 shows RM state transition in the wireless device. Two RM states may be used in a wireless device 1500 (and possibly in the AMF 1555) that may reflect the registration status of the wireless device 1500 in the selected PLMN. The registration status of the wireless device 1500 in the selected PLMN may be RM-DEREGISTERED 1800 or RM-REGISTERED 1810. In the RM DEREGISTERED state 1800, the wireless device 1500 may not be registered with a network. The wireless device 1500 context in AMF 1555 may not hold valid location or routing information for the wireless device 1500 so the wireless device 1500 may be not reachable by the AMF 1555. Some wireless device context may still be stored in the wireless device 1500 and the AMF 1555. In the RM REGISTERED state 1810, the wireless device 1500 may be registered with the network. In the RM-REGISTERED 1810 state, the wireless device 1500 may receive services that require registration with the network.

The bottom half of FIG. 18 shows RM state transitions in the AMF 1555. Two RM states may be used in the AMF 1555 for the wireless device 1500 that reflect the registration status of the wireless device 1500 in the selected PLMN. The two RM states that may be used in the AMF 1555 for the wireless device 1500 in the selected PLMN may be RM-DEREGISTERED 1820 or RM-REGISTERED 1830. The state of RM-DEREGISTERED 1800 in the wireless device 1500 may correspond to the state of RM-DEREGISTERED 1820 in the AMF 1555. The state of RM-REGISTERED 1810 in the wireless device 1500 may correspond to the state of RM-REGISTERED 1830 in the AMF 1555.

Figure 19:
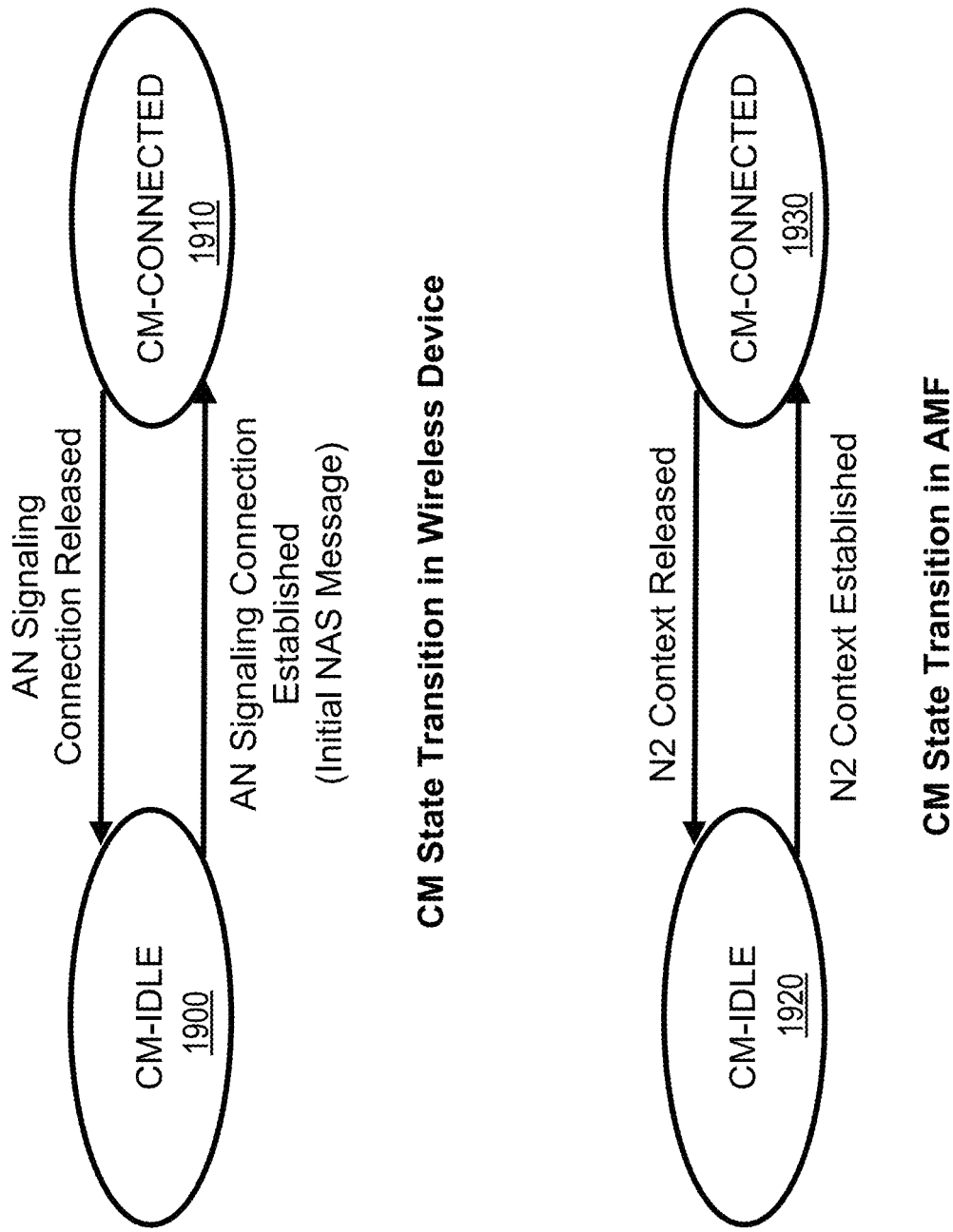
FIG. 19 shows examples of connection management state models for a wireless device and an AMF.

FIG. 19 depicts examples of CM state transitions as observed by the wireless device 1500 and AMF 1555. Connection management CM may comprise the functions of establishing and releasing a signaling connection between a wireless device 1500 and the AMF 1555 over N1. This signaling connection may be used to provide NAS signaling exchange between the wireless device 1500 and a core network. The signaling connection may comprise both the AN signaling connection between the wireless device 1500 and/or the (R)AN 1505 (e.g., RRC connection over 3GPP access) and the N2 connection for this wireless device 1500 between the AN and the AMF 1555. The top half of FIG. 19 shows CM state transitions in the wireless device 1500. Two CM states may be used for the NAS signaling connectivity of the wireless device 1500 with the AMF 1555: CM-IDLE 1900 and CM-CONNECTED 1910. A wireless device 1500 in CM-IDLE 1900 state may be in RM-REGISTERED 1810 state that may have no NAS signaling connection established with the AMF 1555 over N1. The wireless device 1500 may perform cell selection, cell reselection, and PLMN selection. A wireless device 1500 in CM-CONNECTED 1910 state may have a NAS signaling connection with the AMF 1555 over N1. RRC inactive state may apply to NG-RAN (e.g., it applies to NR and E-UTRA connected to 5G CN). The AMF 1555 may provide (e.g., based on network configuration) assistance information to the NG (R)AN 1505, for example, to assist the NG (R)AN's 1505 decision as to whether the wireless device 1500 may be sent to RRC inactive state. If a wireless device 1500 may be CM-CONNECTED 1910 with RRC inactive state, the wireless device 1500 may resume the RRC connection (e.g., due to uplink data pending), may execute a mobile initiated signaling procedure (e.g., as a response to (R)AN 1505 paging), and/or notify the network that it has left the (R)AN 1505 notification area. NAS signaling connection management may comprise the functions of establishing and releasing a NAS signaling connection. NAS signaling connection establishment function may be provided by the wireless device 1500 and the AMF 1555 to establish a NAS signaling connection for a wireless device 1500 in CM-IDLE 1900 state. The procedure of releasing a NAS signaling connection may be initiated by the 5G (R)AN 1505 node or the AMF 1555.

The bottom half of FIG. 19 shows CM state transitions in the AMF 1555. Two CM states may be used for a wireless device 1500 at the AMF 1855: CM-IDLE 1920 and CM-CONNECTED 1930. The state of CM-IDLE 1900 in the wireless device 1500 may correspond to the state of CM-IDLE 620 in the AMF 1555. The state of CM-CONNECTED 1910 in the wireless device 1500 may correspond to the state of CM-CONNECTED 1930 in the AMF 1555. Reachability management of the wireless device 1500 may detect whether a wireless device 1500 may be reachable and/or provide the wireless device location (e.g., the access node in communication with the wireless device) for the network to reach the wireless device 1500. This may be done by paging wireless device 1500 and wireless device location tracking. The wireless device location tracking may comprise both wireless device registration area tracking and wireless device reachability tracking. Such functionalities may be either located at a 5GC (e.g., for a CM-IDLE 1920 state) or an NG-RAN 1505 (e.g., for a CM-CONNECTED 1930 state).

The wireless device 1500 and the AMF 1555 may negotiate wireless device 1500 reachability characteristics in CM-IDLE 1900 and/or 1920 states during registration and registration update procedures. A variety of wireless device reachability categories may be negotiated between a wireless device 1500 and an AMF 1555 for CM-IDLE 1900 and/or 1920 states, such as wireless device 1500 reachability providing mobile device terminated data. The wireless device 1500 may be CM-IDLE 1900 mode and mobile initiated connection only (MICO) mode. The 5GC may support a PDU connectivity service that provides exchange of PDUs between a wireless device 1500 and a data network identified by a DNN. The PDU connectivity service may be supported via PDU sessions that may be established, for example, after request from the wireless device 1500.

A PDU session may support one or more PDU session types. PDU sessions may be established (e.g., after wireless device 1500 request), modified (e.g. after wireless device 1500 and 5GC request) and released (e.g., after wireless device 1500 and 5GC request) using NAS SM signaling exchanged over N1 between the wireless device 1500 and the SMF 1560. The 5GC may be able to trigger a specific application in the wireless device 1500 (e.g., after a request from an application server). If receiving that trigger message, the wireless device 1500 may pass it to the identified application in the wireless device 1500. The identified application in the wireless device 1500 may establish a PDU session to a specific DNN.

Figure 20:
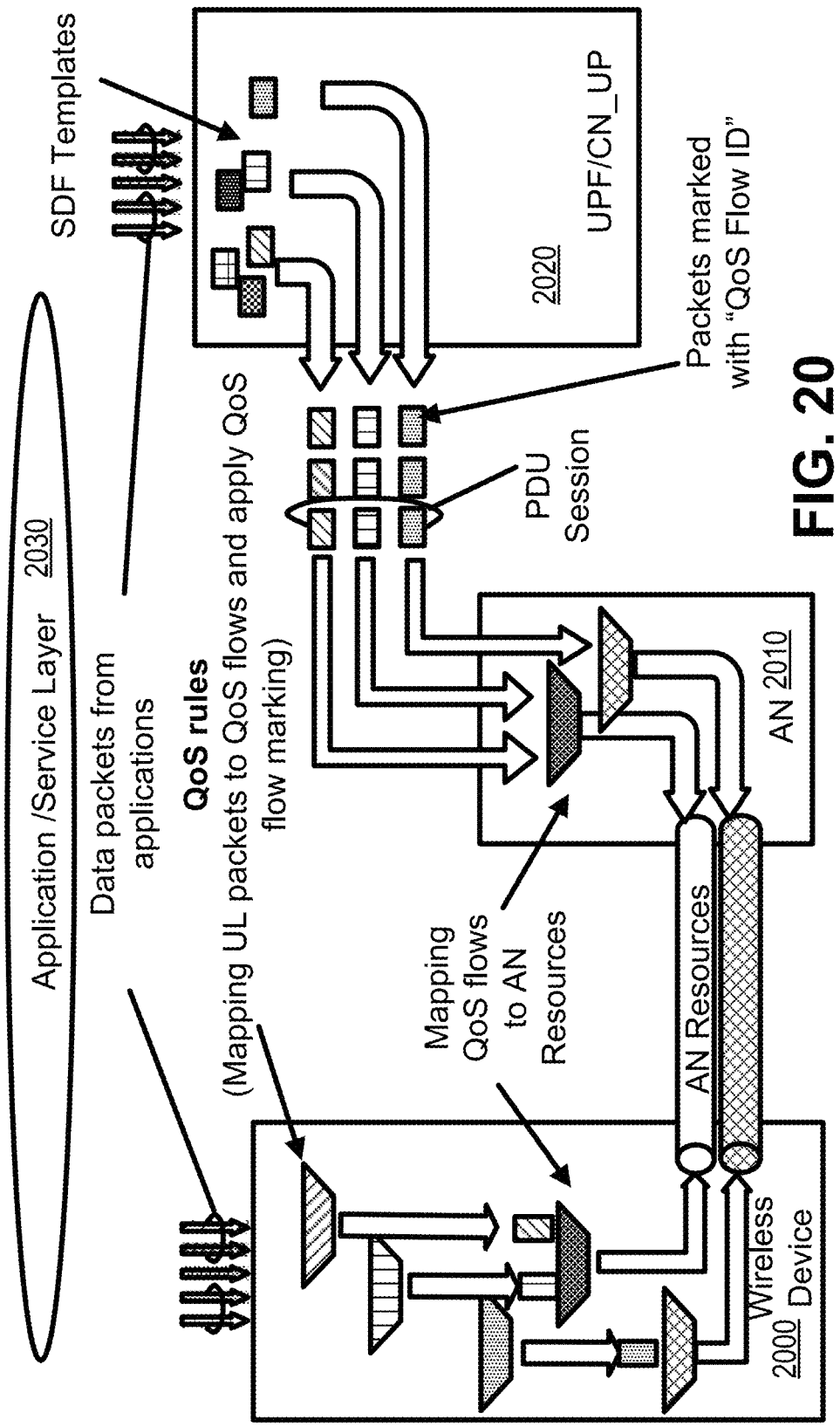
FIG. 20 shows an example for classifying and marking traffic.

FIG. 20 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 2020, AN 2010, and/or wireless device 2000. Packets may arrive from and/or destined to the application/service layer 2030 of wireless device 2000, CN_UP 2020, and/or an AF (e.g., the AF 1545). QoS flow may be granular of QoS differentiation in a PDU session. A QoS Flow ID QFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 1560) may allocate the QFI for a QoS flow and may derive its QoS parameters from the information provided by the PCF. The SMF 1560 may provide the QFI together with the QoS profile containing the QoS parameters of a QoS flow to the (R)AN 2010. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, etc.). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, etc.).

One or more devices (e.g., a 5GC) may support edge computing and may provide operators and/or third party services to be hosted close to the wireless device access point of attachment. The one or more devices (e.g., a 5GC) may select a UPF 1510 close to the wireless device 1500 and may execute the traffic steering from the UPF 1510 to the LADN via a N6 interface. This selecting a UPF 1510 close to the wireless device may be based on the wireless device subscription data, wireless device location, the information from application function AF 1545, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 1510 to route the user traffic to the LADN, traffic steering where the one or more devices (e.g., a 5GC) selects the traffic to be routed to the applications in the LADN, session and service continuity to provide wireless device 1500 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 1505, 5GC and a wireless device 1500, etc. Provided NSSAI may be an NSSAI provided by a serving PLMN, for example, during a registration procedure, indicating the NSSAI provided by the network for the wireless device 1500 in the serving PLMN for the current registration area. A periodic registration update may be wireless device 1500 re-registration at expiry of a periodic registration timer. A requested NSSAI may be a NSSAI that the wireless device 1500 may provide to the network. A service-based interface may represent how a set of services may be provided/exposed by a given NF.

A PDU connectivity service may provide exchange of PDUs between a wireless device 1500 and a data network. PDU session may be an association between a wireless device 1500 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session.

For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 15 shows an example service-based representation, where network functions within the control plane may provide other authorized network functions to access their services. This service-based representation shown in FIG. 15 may also comprise point-to-point reference points where necessary. FIG. 16 shows an example reference point representation, showing the interaction between the NF services in the network functions described by point-to-point reference point (e.g., N11) between any two network functions.

Establishment of user plane connectivity to a data network via a network slice instance(s) may comprise performing an RM procedure, for example, to select an AMF 1555 that supports the required network slices, and establishing one or more PDU session(s) to the required data network via the network slice instance(s). The set of network slices for a wireless device 1500 may be changed, for example, if the wireless device 1500 may be registered with a network. The set of network slices for the wireless device 1500 may be initiated by the network or the wireless device 1500.

Ethernet over wireless communications may provide advantages to wireless communications and a user. For example, wireless communications services may be enhanced, and/or additional services may be made available, by using Ethernet over wireless communications. Additional data and/or different types of data may be accommodated using Ethernet over wireless communications. User specific services and/or device specific services may be provided by using Ethernet over wireless communications. Different priority, rates, and/or pricing may be implemented for services and/or applications by using Ethernet over wireless communications. Ethernet over wireless communications may comprise Ethernet over any wireless system, including but not limited to Ethernet over 5G or Ethernet over any legacy or future wireless communication system.

A packet data unit (PDU) session may be supported. The PDU session may be supported, for example in 5G, using one or more protocols such as IPv4, IPv6, or Ethernet, or the PDU session may be unstructured (e.g., a non-IP PDU). Ethernet may comprise a variety of networking technologies, such as those that may be used in local area networks (LANs), metropolitan area networks (MANs), wide area networks (WAN), or other networks. A data packet on an Ethernet link may be referred to as an Ethernet packet. An Ethernet packet may transport an Ethernet frame as its payload. With Ethernet over wireless communications, an Ethernet packet may be transferred over a wireless communication system (e.g., a 5G system).

Ethernet over wireless communications, such as Ethernet over 5G, may require information from outside of certain network devices (e.g., outside of a 5GC). For example, in some systems (e.g., in 5G) a control plane may not allocate medium access control (MAC) addresses and/or Ethertype to a wireless device for Ethernet over wireless communications. Certain network devices may not have source MAC addresses, destination MAC addresses, Ethertype, and/or other user specific and/or device specific information that may be necessary to serve Ethernet over wireless communications for a wireless device. A policy control device may require such information in order to provide policy information for servicing the wireless device using Ethernet over wireless communications. A session management device may require such user specific and/or device specific information to provide requested services for the wireless device and/or to implement any required policies for such services. A user plane function may require such information to detect Ethernet packet and/or to enforce policies. Additionally or alternatively, other devices in a network may require user specific and/or device specific information to provide Ethernet over wireless communications or the wireless device. A wireless device may provide, for example, an Ethernet packet filter that may comprise information necessary to serve an Ethernet over wireless communications for the wireless device. Additionally or alternatively, a data network outside of a core network (e.g., outside of a 5GC) may provide for example, an Ethernet packet filter that may comprise information necessary to serve an Ethernet over wireless communications for the wireless device.

Figure 21A:
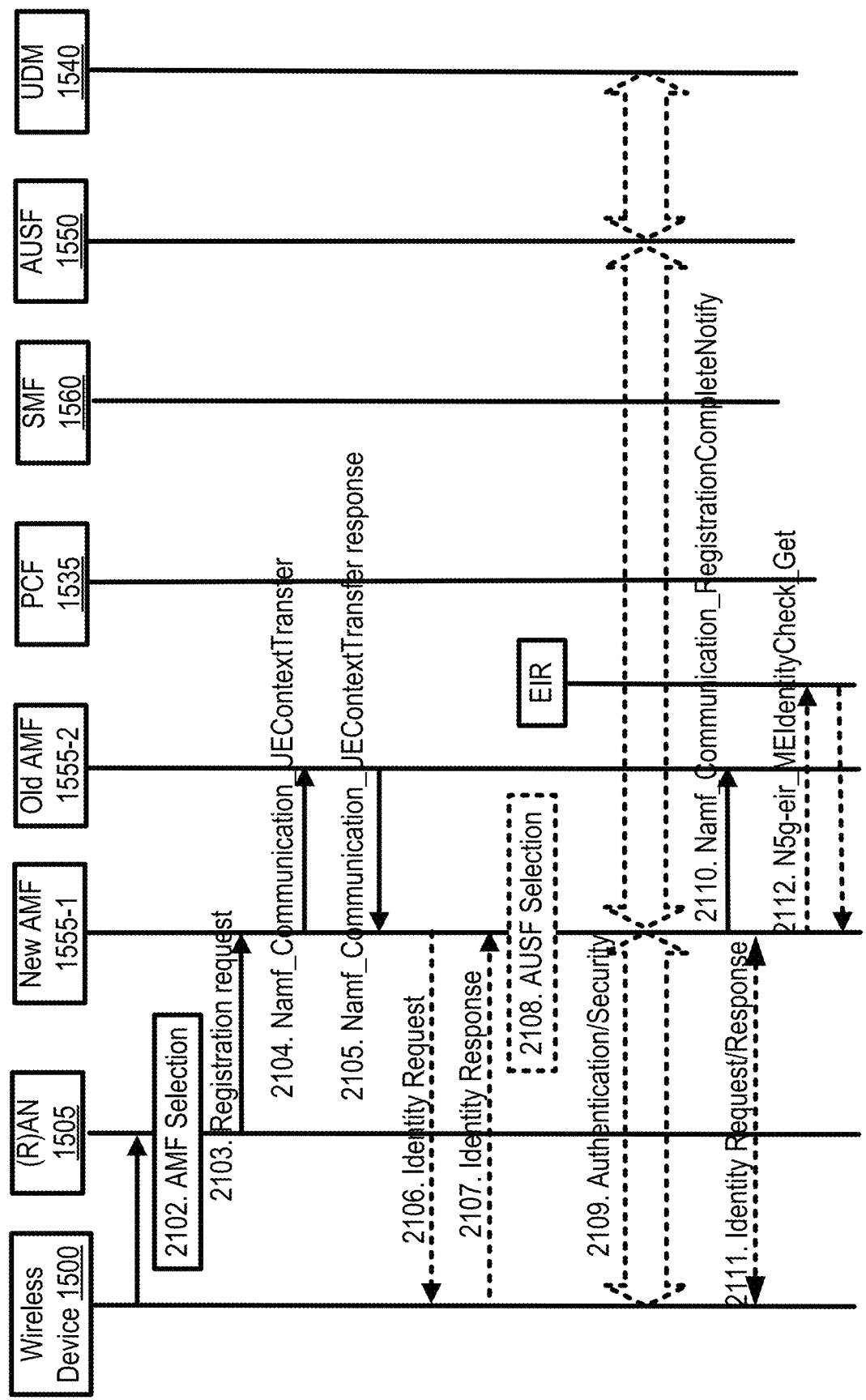
FIGS. 21A-B shows examples of registration procedures.
Figure 21B:
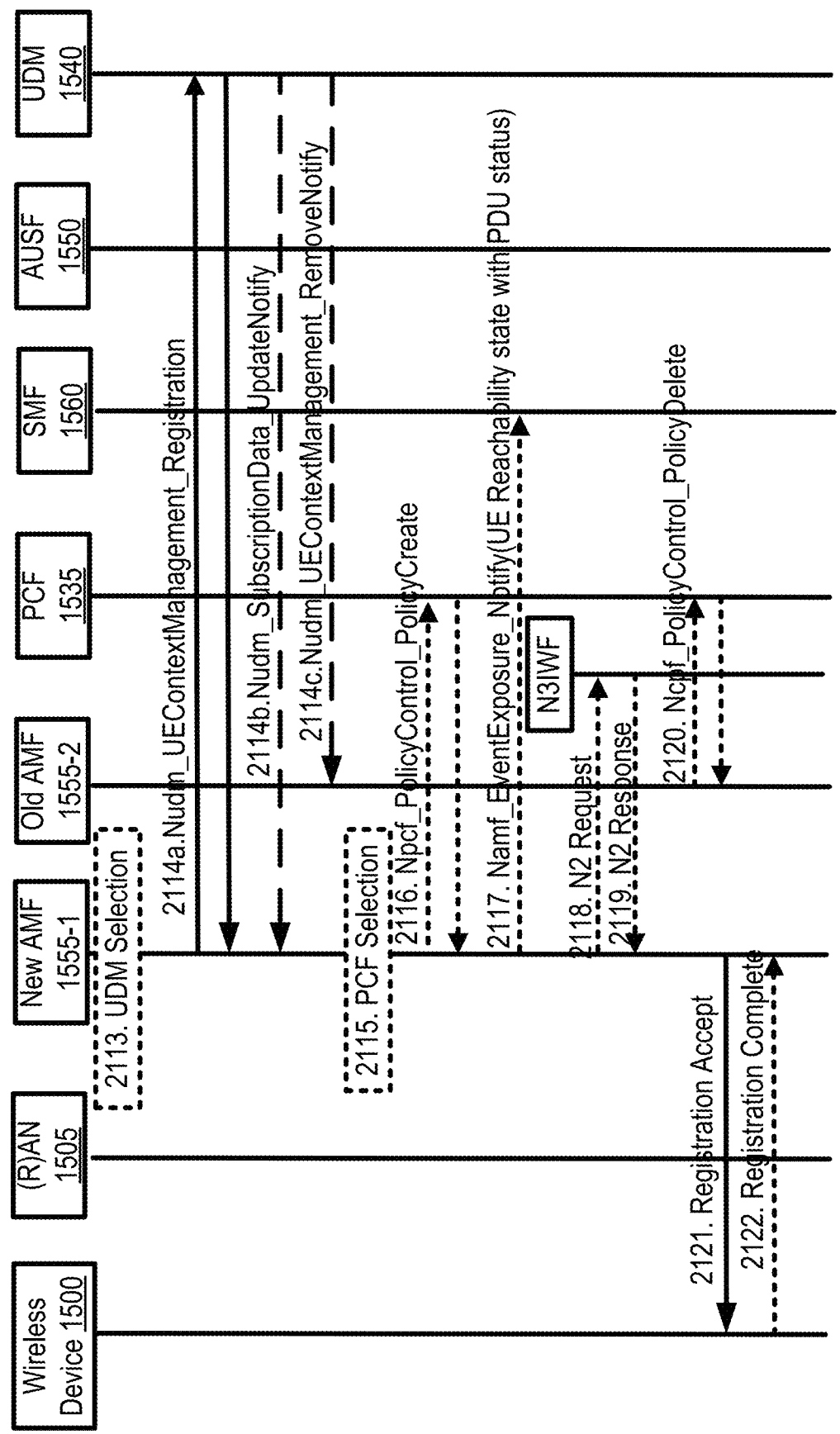

FIGS. 21A and 21B show connection, registration, and mobility management procedures. These procedures are described, for example, in "5G; Procedures for the 5G System," ETSI TS 123 502 version 15.2.0, also 3GPP TS 23.502 version 15.2.0 Release 15, dated June 2018 and published by the European Telecommunications Standards Institute.

At step 2101 (in FIG. 21A), a wireless device (e.g., wireless device 1500) may send a message comprising a registration request to a (R)AN (e.g., (R)AN 1505). At step 2102, the (R)AN 1505 may perform an AMF selection. At step 2103, the (R)AN 1505 may send a message comprising the registration request to a new AMF (e.g., New AMF 1555-1). At step 2104, the New AMF 1555-1 may send, to an old AMF (e.g., Old AMF 1555-2), a message comprising an indication of a context transfer (e.g., Namf_Communication_UEContextTransfer). At step 2105, the Old AMF 1555-2 may send, to the Old AMF 1555-1, a response message comprising a context transfer response (e.g., Namf_ Communication_UEContextTransfer response). At step 2106, the New AMF 1555-1 may send, to the wireless device 1500, a message comprising an identity request. At step 2107, the wireless device 1500 may send, to the New AMF 1555-1, a message comprising an identity response. At step 2108, the New AMF 1555-1 may perform an AUSF selection. At step 2109, authentication and/or security procedures may be performed between the wireless device 1500 and the New AMF 1555-1, between the New AMF 1555-1 and an AUSF (e.g., AUSF 1550), and/or between the AUSF 1550 and a UDM (e.g., UDM 1540). At step 2110, the New AMF 1555-1 may send, to the Old AMF 1555-2, a message comprising a registration completion notification (e.g., Namf_Communication_RegistrationCompleteNotify). At step 2111, messages comprising identity requests and/or responses may be communicated between the wireless device 1500 and the New AMF 1555-1. At step 2112, the New AMF 1555-1 may send to an EIR, and/or the EIR may send to the AMF 1555-1, one or more messages associated with an identity check (e.g., N5g-eir_MEIdentity-Check_Get).

At step 2113 (in FIG. 8B), the New AMF 1555-1 may perform a UDM selection. At step 2114a, the New AMF 1555-1 may send, to the UDM 1540, a message comprising a context management registration (e.g., Nudm_UEContext-Management_Registration). The UDM 1540 may send, to the New AMF 1555-1, a message comprising a response to the context management registration. At step 2114b, the UDM 1540 may send, to the New AMF 1555-1, a message comprising a notification for a subscription data update (e.g., Nudm_SubscriptionDate_UpdateNotify). At step 2114c, the UDM 1540 may send, to the Old AMF 1555-2, a message comprising a notification of a context management removal (e.g., Nudm_UEContextManagement_RemoveNotify). At step 2115, the New AMF 1555-1 may perform a PCF selection. At step 2116, the New AMF 1555-1 may send, to a PCF (e.g., PCF 1535), a message comprising policy control or policy creation (e.g., Npcf_PolicyControl_PolicyCreate). The PCF 1535 may send a response to the New AMF 1555-1. At step 2117, the New AMF 1555-1 may send, to an SMF (e.g., SMF 1560), a message comprising an event exposure notification (e.g., Namf_EventExposure_Notify (UE Reachability state with PDU status)). At step 2118, the New AMF 1555-1 may send, to a N3IWF, a message comprising an N2 request. At step 2119, the N3IWF may send, to the New AMF 1555-1, a message comprising an N2 response. At step 2120, the Old AMF 1555-2 may send, to the PCF 1535, a message comprising a policy control and/or policy deletion (e.g., Ncpf_PolicyControl_PolicyDelete). The PCF 1535 may send a response to the Old AMF 1555-2. At step 2121, the New AMF 1555-1 may send, to the wireless device 1500, a message comprising a registration acceptance (e.g., Registration Accept). At step 2122, the wireless device 1500 may send, to the New AMF 1555-1, a message comprising a registration completion (e.g., Registration Complete). Steps indicated by dashed lines (e.g., steps 2106-2113, 2115-2120, and 2121) may be optional.

FIG. 22 shows an example of an Ethernet packet and frame structure. An Ethernet packet and frame structure may correspond with the Ethernet packet and frame structure for IEEE 802.3. An Ethernet frame may be preceded by a preamble (e.g., 7 octets) and a start frame delimiter (SFD) (e.g., 1 octet), both of which may be part of an Ethernet packet at a physical layer. The Ethernet frame may start with an Ethernet header, which may comprise destination and/or source MAC addresses as its first two fields (e.g., 6 octets of MAC destination and 6 octets of MAC source). An optional 802.1Q tag (e.g., 4 octets) may follow the MAC addresses. Next, may be an Ethertype (e.g., in Ethernet II) or length (e.g., in IEEE 802.3) (e.g., 2 octets). Thereafter, a middle section of the frame may comprise payload data (e.g., 46-1500 octets), which may include, for example, any headers for other protocols (e.g., Internet Protocol) that may be carried in the frame. The frame may end with a frame check sequence (FCS) (e.g., 4 octets), which may comprise a 32-bit cyclic redundancy check that may be used to detect any in-transit corruption of data. An inter-packet gap (IPG) (e.g., 12 octets) may be provided at the end of the Ethernet packet. A layer 2 Ethernet frame may comprise 64 to 1522 octets after the preamble and the SFD. A layer 1 Ethernet packet may comprise 64 to 1522 octets including the preamble and the SFD, followed by an IPG of 12 octets.

A session management function (SMF) and/or a user plane function (UPF) may provide a PDU session anchor, for example, for a PDU session set up with an Ethernet PDU session type. The SMF and the UPF may support specific behaviors associated with a PDU session that may carry Ethernet frames. A MAC and/or an IP address may not be allocated, for example by a 5GC to a wireless device, for a PDU session. The UPF may store MAC addresses, for example, that may be received from a wireless device, and associate the MAC addresses with an appropriate PDU session.

A wireless device may operate in a bridge mode for connecting a LAN to a 5GS. Different MAC addresses may be used as source address of different frames that may be sent via an uplink over a single PDU session. Different destination MAC address of different frames that may be sent via a downlink, for example over the same PDU session as the uplink, may be used. Entities on the LAN that may be connected to a system (e.g., a 5GS) by the wireless device may be allocated an IP address by a data network. The data network may not be specified by 3GPP 5G specifications. A wireless device that may be connected to the system (e.g., a 5GS) may be the only wireless device that may be authenticated. For example, devices behind a wireless device that may be connected to the system (e.g., a 5GS) may not be authenticated.

Different Frames exchanged via a PDU session, such as an Ethernet type PDU session, may be served with different quality of service (QoS) over the system (e.g., a 5GS). An SMF may provide, to a UPF, traffic filters based on the Ethernet frame structure. A packet filter set may support packet filtering (e.g., for an Ethernet PDU session type) based on one or more of: source MAC address and/or destination MAC address; Ethertype (e.g., such as set forth by IEEE 802.3); customer-virtual Local Area Network (VLAN) tag (C-TAG) and/or service-VLAN tag (S-TAG) VLAN identifier (VID) fields (e.g., such as set forth in IEEE 802.1Q); C-TAG and/or S-TAG priority code point (PCP) and/or drop eligibility indicator (DEI) fields (e.g., such as set forth in IEEE 802.1Q); and/or IP packet filter set. Additionally or alternatively, for example for Ethertype indicates IPv4/IPv6 payload, the packet filter set may support packet filtering comprising one or more of: a source and/or destination IP address and/or a IPv6 prefix, a source and/or destination port number, a protocol ID of a protocol above IP and/or a next header type, a type of service (TOS) (e.g., for IPv4), a traffic class (e.g., for IPv6), a mask, a flow label (e.g., for IPv6), and/or a security parameter index.

Figure 23:
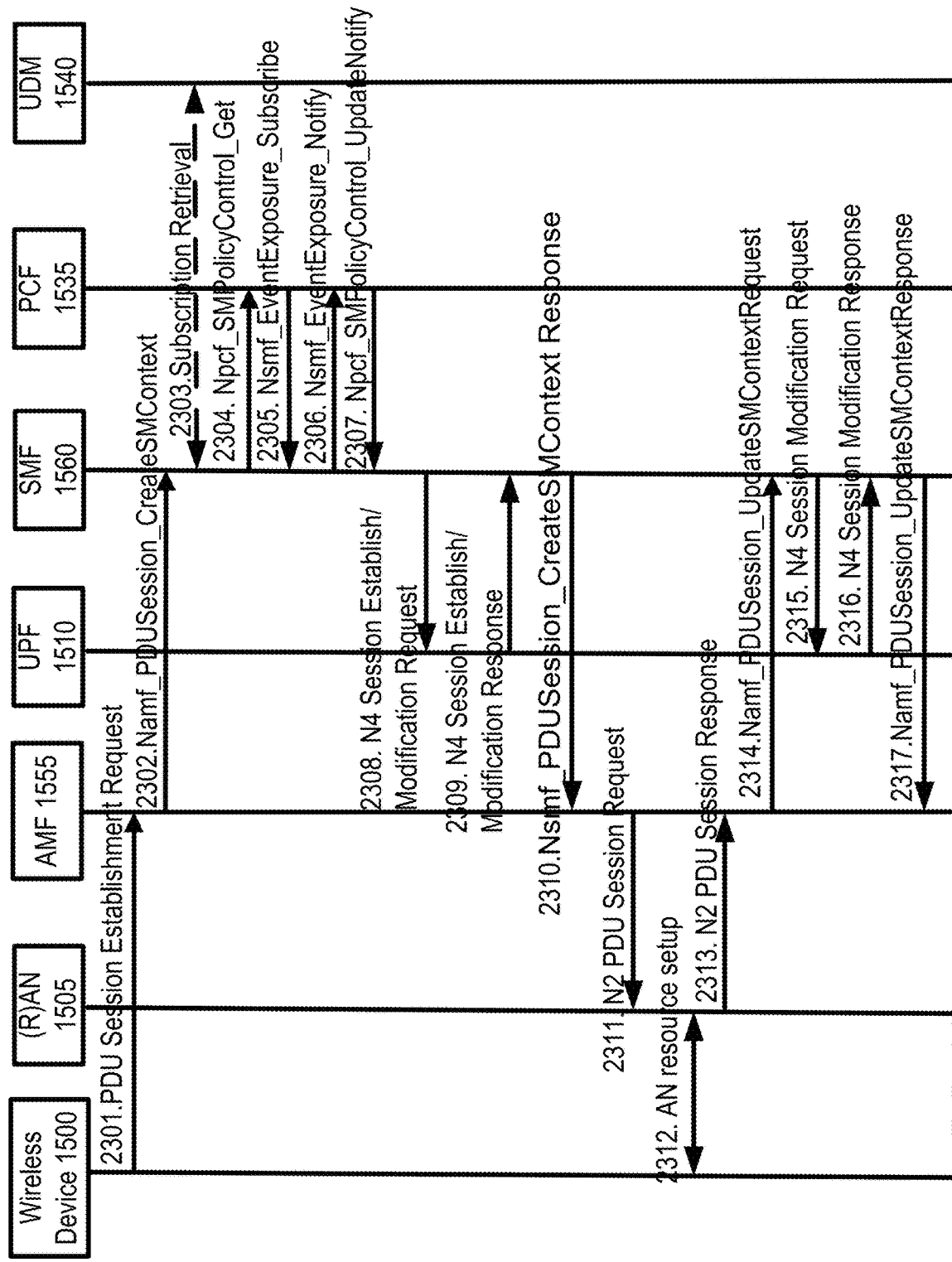
FIG. 23 shows an example of a packet data unit (PDU) session establishment.

FIG. 23 shows an example of a PDU session establishment. The PDU session establishment may originate with a wireless device (e.g., wireless device 1500) requesting a PDU session establishment. At step 2301, the wireless device 1500 may send, to the AMF 1555, a NAS message. The NAS message may comprise one or more of: S-NSSAI, DNN, PDU Session ID, request type, and/or an N1 SM container (e.g., comprising a PDU session establishment request). The wireless device 1500 may initiate the PDU session establishment procedure, for example, by the transmission of a NAS message containing a PDU session establishment request within the N1 SM container. The PDU session establishment request may include, for example, one or more of: a PDU type (e.g., Ethernet), an SSC mode, a protocol configuration option, and/or a PDU session ID (e.g., that may be generated by the wireless device 100).

At step 2302, the AMF 1555 may select an SMF (e.g., SMF 160) and send, to the selected SMF (e.g., SMF 160), a message. The message may comprise a PDU session create request (e.g., Nsmf_PDUSession_CreateSMRequest). The PDU session create request may comprise one or more of: SUPI, DNN, S-NSSAI, PDU session ID, AMF ID, request type, N1 SM container (e.g., comprising the PDU session establishment request), user location information, access type, and/or PEI.

At step 2303, the SMF 1560 may register with the UDM 1540, for example, if the SMF 1560 has not yet registered and/or if subscription data is not available. The SMF 1560 may retrieve subscription data. Subscribers may be notified, for example, if subscription data is modified. The SMF 1560 may select an UPF and trigger a PDU session establishment authentication and/or authorization, for example, if the SMF 1560 determines it should perform secondary authorization and/or authentication during the establishment of the PDU session by a DN-AAA server.

At step 2304, the SMF 1560 may perform PCF selection (e.g., if dynamic PCC is deployed) and/or the SMF 1560 may apply one or more local policies (e.g., if dynamic PCC is not deployed). The SMF 1560 may invoke an operation (e.g., a Npcf_SMPolicyControl_Get operation), for example, to establish a PDU session with the PCF 1535 and/or to obtain the default PCC rules for the PDU session.

At step 2305, the PCF 1535 may subscribe one or more events in the SMF 1560, for example, by invoking an operation (e.g., a Nsmf_EventExposure_Subscribe operation). At step 2306, the SMF 1560 may report one or more events to the PCF 1535 that were previously subscribed, for example, by invoking a service operation (e.g., a Nsmf_EventExposure_Notify service operation). At step 2307, the PCF 1535 may provide updated policies to the SMF 1560, for example, by invoking a service operation (e.g., a Npcf_SMPolicyControl_UpdateNotify service operation). The PCF 1535 may provide, to the SMF 1560, authorized Session-AMBR and/or the authorized 5QI/ARP.

At step 2308, the SMF 1560 may initiate an N4 session establishment procedure with the selected UPF 1510, for example, if a request type indicates and initial request and/or if a PDU session establishment authentication and/or authorization was not performed. Additionally or alternatively, the SMF 1560 may initiate an N4 session modification procedure with the selected UPF 1510, for example, by the SMF 1560 sending an N4 session establishment and/or modification request to the UPF 1510, and/or by providing one or more packet detection, enforcement and/or reporting rules that may be installed on the UPF 1510 for the PDU session. The CN tunnel info may be provided to UPF 1510 at step 2308, for example, if CN tunnel info is allocated by the SMF 1560.

At step 2309, the UPF 1510 may acknowledge the SMF 1560, for example, by sending an N4 session establishment and/or modification response. The CN tunnel info may be provided to SMF 1560 at step 2309, for example, if CN tunnel info is allocated by the UPF 1510.

At step 2310, the SMF 1560 may send, to the AMF 1555, one or more messages comprising a response message. The response message (e.g., Nsmf_PDUSession_CreateSM Response) may comprise one or more of: cause information, N2 SM information, and/or N1 SM container. The N2 SM information may comprise one or more of a PDU session ID, QoS profile, SN tunnel information, or S-NSSAI, session-AMBR. The N1 SM container may comprise a PDU session establishment accept. The PDU session establishment accept may comprise one or more of a: QoS rule, SSC mode, S-NSSAI, allocated IPv4 address, or session-AMBR. The N2 SM information may comprise information that the AMF 1555 may forward to the (R)AN 1505. The CN tunnel information may correspond to the Core Network address of the N3 tunnel corresponding to the PDU Session. The QoS profile may provide the (R)AN 1505 with the mapping between QoS parameters and QoS flow identifiers. Multiple QoS profiles may be provided to the (R)AN 1505. The PDU session ID may be used by AN signaling with the wireless device 1500 to indicate to the wireless device 1500 an association between AN resource and a PDU Session for the wireless device 1500.

At step 2311, the AMF 1555 may send, to the (R)AN 1505, an N2 PDU session request. The N2 PDU session request may comprise one or more of N2 SM information or a NAS message. The NAS message may comprise one or more of: a PDU session ID and/or an N1 SM container (e.g., a PDU session establishment accept message). The AMF 1555 may send the NAS message comprising a PDU session ID and a PDU session establishment accept messages (e.g., that may be targeted to the wireless device 1500), and N2 SM information that may be received from the SMF 1560, within the N2 PDU session request to the (R)AN 1505.

At step 2312, the (R)AN 1505 may send, to the wireless device 1500, one or more messages for an AN resource setup. The wireless device 1500 may send, to the (R)AN 1550 one or more messages for the AN resource setup. The (R)AN 1505 may issue an AN specific signaling exchange with the wireless device 1500 that may be related to the information received from SMF 1560. For example, an RRC connection reconfiguration (e.g., for a 3GPP RAN) may take place with the wireless device 1500 establishing the necessary RAN resources related to the QoS rules for the PDU session request received at step 2310. The (R)AN 1505 may allocate (R)AN N3 tunnel information for the PDU session. The (R)AN 1505 may forward the NAS message (e.g., comprising one or more of a PDU session ID, or N1 SM container such as a PDU session establishment accept message) that may be provided at step 2310 to the wireless device 1500. The (R)AN 1505 may provide the NAS message to the wireless device 1500, for example, if the necessary RAN resources have been established and/or the allocation of (R)AN tunnel information has been successful.

At step 2313, the (R)AN 1505 may send, to the AMF 1555, an N2 PDU session response. The N2 PDU session response may comprise one or more of: a PDU session ID, a cause message, and/or N2 SM information. N2 SM information may comprise one or more of: a PDU Session ID, (R)AN tunnel information, and/or a list of accepted and/or rejected QoS profile(s). The (R)AN tunnel info may correspond to the access network address of the N3 tunnel corresponding to the PDU session.

At step 2314, the AMF 1555 may send, to the SMF 1560, an SM context request message (e.g., Nsmf_PDUSession_UpdateSMContext Request). The SM context request message may comprise, for example, N2 SM information. The AMF 1555 may forward the N2 SM information, that may be received from the (R)AN 1505, to the SMF 1560.

At step 2315, the SMF 1560 may initiate an N4 session establishment procedure with the UPF 1510 (e.g., if the N4 session for the PDU session was not already established). Additionally or alternatively, the SMF 1560 may initiate an N4 session modification procedure with the UPF 1510. The SMF 1560 may provide AN tunnel information and CN tunnel information. The CN tunnel information may need to be provided, for example, if the SMF 1560 selected CN tunnel info.

At step 2316, the UPF 1510 may provide an N4 session establishment and/or modification response to the SMF 1560.

At step 2317, the SMF 1560 may send, to the AMF 1555, an SM context response message (e.g., Nsmf_PDUSession_UpdateSMContext Response). The SM context response message may comprise a cause message. The AMF 1555 may forward relevant events to the SMF 1560, for example, after step 2317 and/or for a handover where the (R)AN tunnel information may change and/or the AMF may be relocated.

Figure 24:
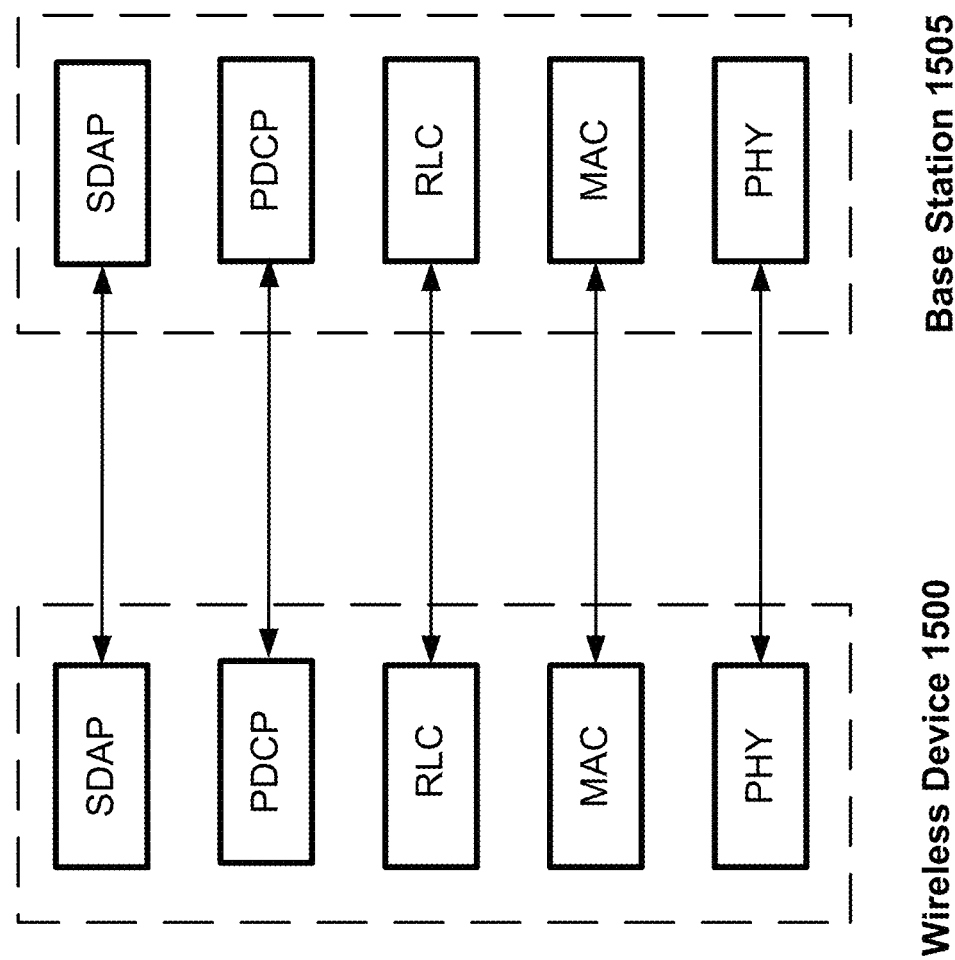
FIG. 24 shows an example of a user plane protocol stack.

FIG. 24 shows an example of a user plane protocol stack. The user plane protocol stack between the wireless device 1500 and the (R)AN 1505 may comprise, for example, service data adaptation protocol (SDAP), PDCP, RLC, MAC, and PHY sublayers. The main services and functions of the PDCP sublayer for the user plane may comprise, for example one or more of: sequence numbering; header compression and decompression (e.g., ROHC); transfer of user data; reordering and duplicate detection; PDCP PDU routing (e.g., for split bearers); retransmission of PDCP SDUs; ciphering, deciphering, and integrity protection; PDCP SDU discard; PDCP re-establishment and data recovery for RLC AM; and/or duplication of PDCP PDUs.

The main services and functions of the PDCP sublayer for the control plane may comprise, for example, one or more of: sequence numbering; ciphering, deciphering, and integrity protection; transfer of control plane data; duplicate detection; and/or duplication of PDCP PDUs. For the header compression and decompression function of the PDCP sublayer, the header compression protocol may be based on the Robust Header Compression (ROHC) framework (e.g., such as in IETF RFC 5795: "The Robust Header Compression (ROHC) Framework"). There may be multiple header compression algorithms, called profiles, defined for the ROHC framework. A profile may be specific to the particular network layer, transport layer, or upper layer protocol combination (e.g., TCP/IP and RTP/UDP/IP). The ROHC channel may be specified as part of the ROHC framework (e.g., such as in IETF RFC 5795). The ROHC framework may include how to multiplex different flows (e.g., header compressed or not) over the ROHC channel, and/or how to associate a specific IP flow with a specific context state (e.g., during initialization of the compression algorithm for that flow). The implementation of the functionality of the ROHC framework and/or of the functionality of the supported header compression profiles may not covered in the 3GPP specifications. The following profiles may be supported, for example, by 3GPP 5G specification TS 38.323:

TABLE 1

Supported header compression protocols and profiles

| Profile Identifier | Usage | Reference |
| --- | --- | --- |
| 0x0000 | No compression | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |

TABLE 1-continued

Supported header compression protocols and profiles

| Profile Identifier | Usage | Reference |
| --- | --- | --- |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

The PDCP Data PDU may be used to convey one or more of: a PDCP SDU SN; user plane data; control plane data; and/or a MAC-I.

Figure 25:
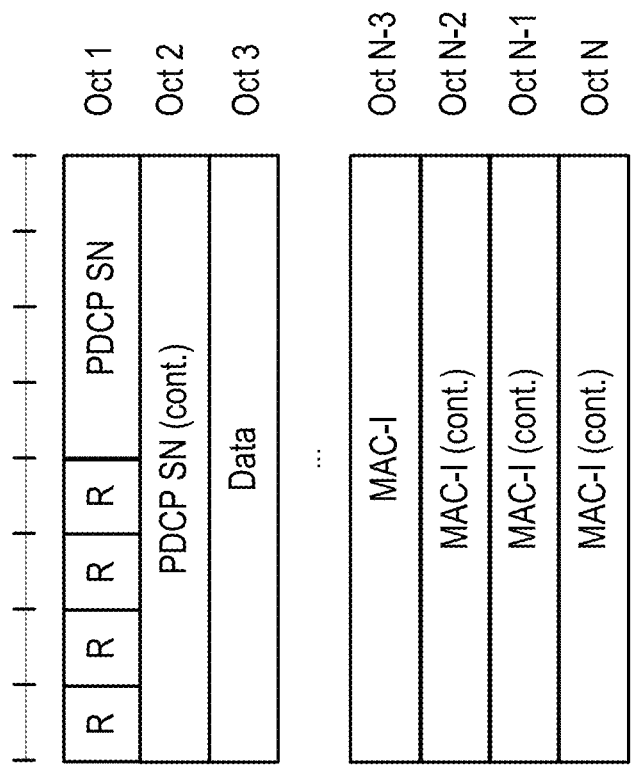
FIG. 25 shows an example of a packet data convergence protocol (PDCP) data PDU.

FIG. 25 shows an example of a PDCP data PDU. A PDCP data PDU with 12 bits in PDCP SN may be used for signaling radio bearers carrying control plane data (SRBs). A PDCP PDU may be a bit string that is byte aligned (e.g., arranged in multiple of 8 bits) in length. Bit strings may be represented by tables in which the most significant bit may be the leftmost bit of the first line of the table (e.g., in Table 1), the least significant bit may be the rightmost bit on the last line of the table, and more generally, the bit string may to be read from left to right and in the reading order of the lines. The bit order of a parameter field within a PDCP PDU may be represented with the first and most significant bit in the leftmost bit and the last and least significant bit in the rightmost bit. PDCP SDUs may be bit strings that may be byte aligned in length. A compressed or uncompressed SDU may be included into a PDCP Data PDU from the first bit onward. The PDCP control PDU may be used to convey one or more of a PDCP status report or an interspersed ROHC feedback.

Figure 26:
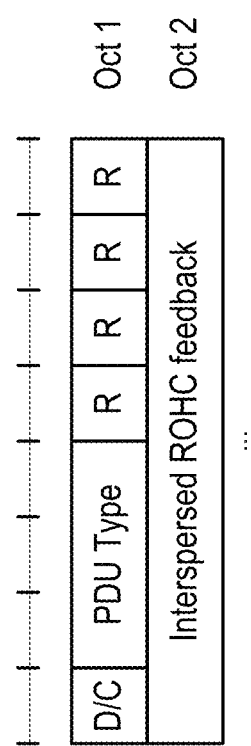
FIG. 26 shows an example of a PDCP control PDU.

FIG. 26 shows an example of a PDCP control PDU. The PDCP control PDU may carry one interspersed ROHC feedback that may be applicable for a data radio bearer which may utilize RLC UM (e.g., UM DRBs), and for a data radio bearer which may utilize RLC AM (e.g., AM DRBs). The PDU type may indicate the type of control information included in the corresponding PDCP control PDU, such as shown in Table 2 below.

TABLE 2

PDU type

| Bit | Description |
| --- | --- |
| 000 | PDCP status report |
| 001 | Interspersed ROHC feedback |
| 010-111 | Reserved |

Figure 27:
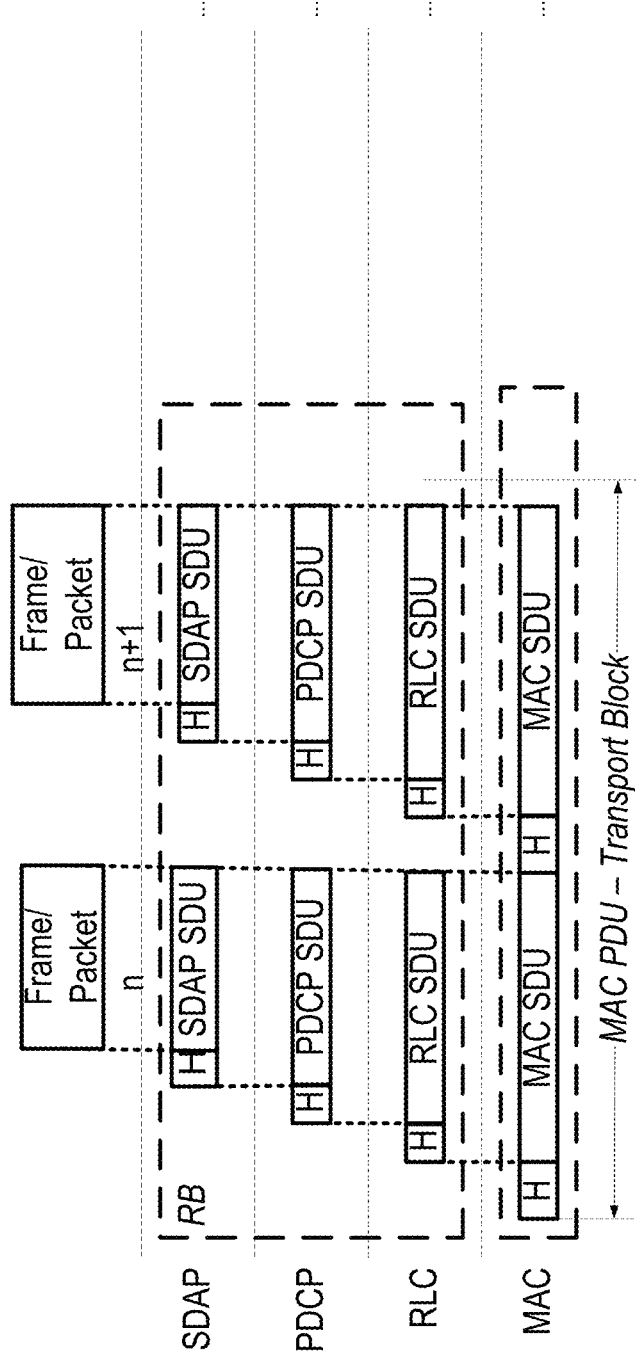
FIG. 27 shows an example layer 2 data flow.

FIG. 27 shows an example of a layer 2 data flow. A transport block may be generated at a MAC layer, for example, by concatenating two RLC PDUs from a radio bearer (RB). The two RLC PDUs from the RB may each correspond to one Ethernet frame and/or IP packet (e.g., n and/or n+1). Headers and subheaders may be represented by "H".

A system (e.g., a 5G system) may support an Ethernet type PDU session. For an Ethernet PDU session type, an Ethernet packet filter set may be used, for example in one or more QoS rules and/or SDF template, to identify a QoS flow. The packet filter set (e.g., for an Ethernet PDU session type) may support packet filtering based on any combination of one or more of: source MAC address and/or destination MAC address; Ethertype (e.g., such as set forth by IEEE 802.3); customer-VLAN tag (C-TAG) and/or service-VLAN tag (S-TAG) VID fields (e.g., such as set forth in IEEE 802.1Q); C-TAG and/or S-TAG PCP/DEI fields (e.g., such as set forth in IEEE 802.1Q); and/or IP packet filter set (e.g., if Ethertype indicates IPv4 and/or IPv6 payload).

Ethernet type PDU sessions may be difficult to implement. Some legacy technologies may not support and/or transfer traffic of Ethernet type PDUs. Enhanced signaling mechanisms may be provided, however, to support traffic of Ethernet type PDUs. For example, signaling mechanisms and/or network protocols may provide capability to transmit and/or receive a wireless device MAC profile and/or an IP profile among network nodes. The wireless device MAC profile and/or an IP profile may be provided to improve network performance, for example, by providing capability to establish an Ethernet type PDU session. One or more devices (e.g., in a 5GC) may not allocate to a wireless device a MAC address and/or an IP address for an Ethernet type PDU session. Network signaling and/or performance may be improved by providing information for an Ethernet type PDU session. A UPF may receive one or more of: a source MAC address, a destination MAC address, and/or an Ethernet packet filter set. The UPF may associate one or more MAC addresses with a PDU session. Information associated with a wireless device may be provided, such as MAC addresses, Ethertype, customer-VLAN tag (C-TAG) and/or service-VLAN tag (S-TAG) VID, C-TAG and/or S-TAG PCP and/or DEI, and/or an IP packet filter set (e.g., if Ethertype indicates an IPv4 and/or an IPv6 payload). An SMF and/or a PCF may create and/or determine a corresponding policy (e.g., QoS control, charging control, gating, etc.) that may require packet filter information, for example, to detect a service data flow and/or a QoS flow. A UPF may receive one or more policies from an SMF, for example, to detect and/or process a service data flow and/or a QoS flow. A UPF may store one or more MAC addresses (e.g., that may be received from the wireless device). The UPF may associate one or more MAC addresses with a PDU session (e.g., an Ethernet PDU session).

A system may provide support for indicating an Ethernet PDU session type. For a PDU session set up with an Ethernet PDU session type, the SMF and the UPF (e.g., acting as a PDU session anchor) may support specific behaviors associated with the PDU session carrying Ethernet frames. Neither a MAC nor an IP address may be allocated by the 5GC to the wireless device for this PDU session. The UPF may store the MAC addresses received from the wireless device, and may associate those MAC Addresses with the appropriate PDU session. This may occur if a MAC address and/or an IP address are not allocated by the 5GC to the wireless device for a PDU session.

The wireless device may operate in bridge mode with regard to a LAN it is connecting to (e.g., the 5GS). One or more MAC addresses may be used as one or more source addresses for different frames sent UL over a single PDU session (and/or different frames sent DL over the same PDU session). Entities on the LAN connected to the 5GS (e.g., by the wireless device) may be allocated an IP address by the DN.

Different Frames exchanged on a PDU session of Ethernet type may be served with different QoS over the 5GS. The SMF may provide to the UPF traffic filters based on the Ethernet frame structure. The system may support an unstructured PDU session type. Different Point-to-Point (PtP) tunneling techniques may be used to deliver Unstructured PDU session type data to the destination (e.g., application server) in the Data Network via N6.

Point-to-point tunneling based on UDP/IP encapsulation may be used (e.g., using one or more tunneling techniques described herein). Other techniques may also be supported. The UPF may be able to map the address used between the UPF and the DN to the PDU session. The mapping may be used regardless of any addressing scheme used from the UPF to the DN.

The following considerations may apply, for example if point-to-point tunneling based on UDP and/or IPv6 is used, IPv6 prefix allocation for PDU sessions may be performed locally by the (H-)SMF without involving the wireless device. The UPF(s) may act as a transparent forwarding node for the payload between the wireless device and the destination in the DN. For uplink, the UPF may forward the received Unstructured session PDU type data to the destination in the data network over the N6 PtP tunnel using UDP and/or IPv6 encapsulation. For downlink, the destination in the data network may send the unstructured session PDU type data using UDP and/or IPv6 encapsulation with the IPv6 address of the PDU Session and/or the 3GPP defined UDP port for unstructured PDU session type data. The UPF acting as a PDU session anchor may decapsulate the received data (e.g., it may remove the UDP and/or IPv6 headers) and may forward the data identified by the IPv6 prefix of the PDU session for delivery to the wireless device. The (H-)SMF may perform the IPv6 related operations, for example, even if the IPv6 prefix may not be provided to the wireless device (e.g., router advertisements and DHCPv6 may not performed). The SMF may assign an IPv6 interface identifier for the PDU session. The allocated IPv6 prefix may identify the PDU session of the wireless device.

A packet filter set may be used in the QoS rules or SDF template to identify a QoS flow. The packet filter set may contain packet filters for the DL direction, the UL direction, and/or packet filters that may be applicable to both directions. There may be two or more types of packet filter sets. For example, one type may be an IP packet filter set. Another type may be an Ethernet packet filter set. The IP packet filter set and/or the Ethernet packet filter set may correspond to PDU session types.

The packet filter set may support packet filtering (e.g., for an IP PDU session type) based on one or more of: source and/or destination IP address or IPv6 prefix; source and/or destination port number; protocol ID of a protocol (e.g., a protocol above IP); protocol ID of a next header type; a type of service (TOS) (e.g., for IPv4); a traffic class (e.g., for IPv6); a mask; a flow label (e.g., for IPv6); and/or a security parameter index.

A value left unspecified in a filter may match a value of the corresponding information in a packet. An IP address or Prefix may be combined with a prefix mask. Port numbers may be specified as port ranges.

The packet filter set may support packet filtering (e.g., for an Ethernet PDU session type) based on at least any combination of: a source MAC address; a destination MAC address; an Ethertype (e.g., such as set forth in IEEE 802.3); a customer-VLAN tag (C-TAG) and/or Service-VLAN tag (S-TAG) VID field(s) (e.g., such as set forth in IEEE 802.1Q); a C-TAG and/or S-TAG PCP and/or DEI field(s) (e.g., such as set forth in IEEE 802.1Q); and/or an IP packet filter set (e.g., if an Ethertype indicates an IPv4 payload and/or an IPv6 payload).

The MAC address may comprise specified address ranges. A value left unspecified in a filter may match a value of the corresponding information in a packet. One or more header compression protocols and/or profiles may be supported. A base station and/or a wireless device may apply a header compression protocol (e.g., for an IP packet) that may be based on a Robust Header Compression (ROHC) framework. There may be multiple header compression algorithms, which may be called profiles, defined for an ROHC framework. A header compression profile may be specific to a particular network layer, transport layer, and/or upper layer protocol combination (e.g., TCP/IP, RTP/UDP/IP, etc.). Detailed definitions of an ROHC channel may be specified as part of the ROHC framework in RFC 5795. This may include how to multiplex different flows (header compressed or not) over the ROHC channel, as well as how to associate a specific IP flow with a specific context state during initialization of the compression algorithm for that flow. Regarding an ROHC framework, a PDCP layer may apply RFC 5795 for no compression, RFC 3095 and/or RFC 4815 for RTP/UDP/IP, RFC 3095 and/or RFC 4815 for UDP/IP, RFC 3095 and/or RFC 4815 for ESP/IP, RFC 3843 and/or RFC 4815 for IP, RFC 6846 for TCP/IP, RFC 5225 for RTP/UDP/IP, RFC 5225 for UDP/IP, RFC 5225 for ESP/IP, RFC 5225 for IP, etc.

One or more PDCP entities associated with DRBs may be configured by upper layers (e.g. an RRC layer) to use header compression either bidirectionally (e.g., if headerCompression is configured) or for an uplink only (e.g., if uplinkOnlyHeaderCompression is configured). The wireless device may process (e.g., if uplinkOnlyHeaderCompression is configured) the received PDCP Control PDU for interspersed ROHC feedback packet corresponding to the uplink header compression. The wireless device may or may not perform header decompression for the received PDCP Data PDU. PDCP entities associated with SLRBs may be configured to use header compression for IP SDUs.

RFC 5795 may have configuration parameters that may be configured by upper layers between compressor and/or decompressor peers. These parameters may define the ROHC channel. The ROHC channel may be a unidirectional channel (e.g., there may be one channel for the downlink and one for the uplink if headerCompression may be configured; or there may be one channel for the uplink if uplinkOnlyHeaderCompression is configured). There may be one set of parameters for each channel. The same values may be used for both channels belonging to the same PDCP entity (e.g., if headerCompression is configured).

These parameters may be categorized in two different groups, such as defined below: mandatory and configured by upper layers (e.g., M group); or not used in this specification (e.g., N/A group).

The usage and definition of the parameters may be as follows. MAX_CID (M) may be the maximum CID value that may be used. One CID value may be reserved for uncompressed flows. The parameter MAX_CID may be configured by upper layers (maxCID). LARGE_CIDS may be inferred from the configured value of MAX_CID according to the following rule: If MAX_CID>15 then LARGE_CIDS=TRUE else LARGE_CIDS=FALSE. This value may not be configured by upper layers. PROFILES (M) may be used to define which profiles may be allowed to be used by the wireless device. The parameter PROFILES may be configured by upper layers (e.g., profiles for uplink and downlink, rohc-Profiles in SL-Preconfiguration or SL-V2X-Preconfiguration for sidelink). FEEDBACK_FOR (N/A) may be a reference to the channel in the opposite direction between two compression endpoints and/or may indicate to what channel any feedback sent may refer to. Feedback received on one ROHC channel for this PDCP entity may refer to the ROHC channel in the opposite direction for this same PDCP entity. MRRU (N/A) may indicate that ROHC segmentation may not be used.

The header compression protocol may generate, for example, two types of output packets: compressed packets, each associated with one PDCP SDU; and/or standalone packets not associated with a PDCP SDU (e.g., interspersed ROHC feedback packets). A compressed packet may be associated with the same PDCP SN and COUNT value as the related PDCP SDU. Interspersed ROHC feedback packets may not be associated with a PDCP SDU. Interspersed ROHC feedback packets may not be associated with a PDCP SN and may not be ciphered. The compressor may associate the new IP flow with one of the ROHC CIDs allocated for the existing compressed flows or may send PDCP SDUs belonging to the IP flow as uncompressed packet (e.g., the MAX_CID number of ROHC contexts are already established for the compressed flows and a new IP flow does not match any established ROHC context).

The PDCP PDUs may be de-compressed by the header compression protocol after performing deciphering, for example, if header compression is configured by upper layers for PDCP entities associated with user-plane data. The system may allow for a PDCP control PDU for an interspersed ROHC feedback packet. The wireless device may submit to lower layers the corresponding PDCP control PDU (e.g., without associating a PDCP SN and/or without performing ciphering). This submission may occur, for example, if an interspersed ROHC feedback packet is generated by the header compression protocol.

After receiving a PDCP control PDU for interspersed ROHC feedback packet from lower layers, the wireless device may deliver the corresponding interspersed ROHC feedback packet to the header compression protocol (e.g., without performing deciphering).

A base station may configure header compression profiles for PDCP packets associated with an Ethernet PDU session type and/or an unstructured PDU session type. The header compression profiles may be different from a header compression profile for IP PDU session type packets. A base station may receive PDU session type information (e.g., to apply differentiated PDCP packet header compression profiles for packets of an Ethernet PDU session type and/or an unstructured PDU session type) from a core network entity (e.g. an AMF, SMF, UPF, MME, serving gateway, etc.) and/or from another base station during a PDU session setup procedure, a PDU session modify procedure, and/or a handover procedure.

A first base station may serve a wireless device with one or more cells. At least one of the cells may be operated by the first base station, and/or one or more other cells may be operated by a secondary base station, for example, if the first base station is a master base station for a dual connectivity (e.g. multi-connectivity, tight-interworking between an LTE base station and a 5G base station, etc.) of the wireless device. The first base station may be an initial base station to which the wireless device may make an initial Radio Resource Control (RRC) connection. The first base station may be a handover target base station towards which the wireless device may be handed over from a source base station (e.g., another base station).

A core network entity (e.g. an AMF, SMF, UPF, MME, serving gateway, etc.) may interwork with the first base station to serve the wireless device (e.g. to support a mobility control, a PDU session control, a QoS flow control, a bearer control, a wireless device context management, a policy control, a security control, etc.). The AMF may be an access and mobility management function. The SMF may be a Session Management Function. The UPF may be a user plane function. The MME may be a mobility management entity.

The first base station may receive, from the core network entity, a first message associated with the wireless device. The first message may be transmitted via a direct interface (e.g., N2 interface, N3 interface, NG interface, S1 interface, etc.) between the first base station and the core network entity. The first message may be at least one of an initial context setup request message, a PDU session (e.g., QoS flow and/or bearer) setup request message, a PDU session (e.g., QoS flow and/or bearer) modify request message, a handover request message, etc. The first message may comprise one or more of an identifier of the wireless device (e.g. an AMF UE N2AP identifier, an AMF UE NGAP identifier, a gNB UE N2AP identifier, a gNB UE NGAP identifier, etc.), wireless device aggregated maximum bit rate (e.g., wireless device AMBR, and/or a maximum allowed aggregated bit rate for the wireless device) context information of the wireless device, etc.

The first message may comprise PDU session configuration parameters associated with a first PDU session for the wireless device. The PDU session configuration parameters may comprise at least one of a PDU session identifier, a S-NSSAI (e.g., single network slice selection assistance information, network slice selection assistance information, etc.), a QoS flow identifier of a QoS flow associated with the first PDU session, PDU session QoS parameters (e.g., 5QI, QCI, allocation and retention priority, GBR QoS information, a maximum bit rate for uplink and/or downlink, guaranteed bit rate for uplink and/or downlink, etc.), QoS flow QoS parameters, transport layer address, a tunnel endpoint identifier (e.g., GTP-TEID), a NAS-PDU, a correlation identifier, a MAC address (e.g., associated with the first PDU session) of the wireless device, etc. The first base station may determine a PDCP packet header compression profile based on the MAC address of the wireless device.

The PDU session configuration parameters may comprise a PDU session type field for the first PDU session. The PDU session type field may indicate that a PDU session type of the first PDU session is an Ethernet PDU session type, an unstructured PDU session type, etc. The first message may further comprise a source MAC address and/or a destination MAC address of Ethernet frames associated with the first PDU session. One or more of the source MAC address and/or the destination MAC address may be a MAC address of the wireless device (e.g., associated with the first PDU session). If the first PDU session is an Ethernet PDU session type, Ethernet frames may be transmitted via the first PDU session.

The first message may be configured to request an initiation of a context setup for the wireless device (e.g., if the first message is an initial context setup request message). The first base station may set up (e.g., based on receiving the first message) one or more context for the wireless device (e.g., PDU session configuration, QoS flow configuration, bearer configuration associated with PDU sessions and/or QoS flows). The first base station may transmit an initial context setup response message to the core network entity. The initial context setup response message may comprise one or more PDU session identifiers (e.g., QoS flow identifiers and/or bearer identifiers) of one or more PDU sessions (e.g., QoS flows and/or bearers) allowed by the first base station, a failed list of PDU sessions (e.g., QoS flows and/or bearers) not established by the first base station, etc. The initial context setup request message may be a part of a registration procedure and/or of a service request procedure for the wireless device.

The first message may be configured (e.g., if the first message is a PDU session, such as a QoS flow or bearer, setup request message) to request a setup of one or more PDU sessions (e.g., QoS flows and/or bearers) for the wireless device. The first base station may setup (e.g., based on receiving the first message) one or more PDU sessions (e.g., QoS flows and/or bearers) for the wireless device (e.g. configure PDU session configuration, QoS flow configuration, bearer configuration associated with PDU sessions and/or QoS flows), and/or may transmit a PDU session (e.g., QoS flow and/or bearer) setup response message to the core network entity. The PDU session (e.g., QoS flow and/or bearer) setup response message may comprise one or more PDU session identifiers (e.g., QoS flow identifiers and/or bearer identifiers) of one or more PDU sessions (e.g., QoS flows and/or bearers) allowed by the first base station, a failed list of PDU sessions (e.g., QoS flows and/or bearers) not established by the first base station, etc. The PDU session (e.g., QoS flow and/or bearer) setup request message may be a part of a service request procedure, a PDU session (e.g., QoS flow and/or bearer) establishment procedure, and/or a PDU session (e.g., QoS flow and/or bearer) modification procedure for the wireless device.

The first message may be configured to request a modification of one or more PDU sessions (QoS flows, bearers) for the wireless device. This configuration may occur if the first message is a PDU session (e.g., QoS flow and/or bearer) modify request message. Based on receiving the first message, the first base station may modify one or more PDU sessions (e.g., QoS flows and/or bearers) for the wireless device (e.g., configure PDU session configuration, QoS flow configuration, bearer configuration associated with PDU sessions and/or QoS flows), and/or may transmit a PDU session (e.g., QoS flow and/or bearer) modify response message to the core network entity. The PDU session (e.g., QoS flow and/or bearer) modify response message may comprise one or more PDU session identifiers (e.g., QoS flow identifiers and/or bearer identifiers) of one or more PDU sessions (e.g., QoS flows and/or bearers) allowed for modification by the first base station, a failed list of PDU sessions (e.g., QoS flows and/or bearers) not modified by the first base station, etc. The PDU session (e.g., QoS flow and/or bearer) modify request message may be a part of a service request procedure, a PDU session (e.g., QoS flow and/or bearer) establishment procedure, and/or a PDU session (e.g., QoS flow and/or bearer) modification procedure for the wireless device.

The first message may be configured to request a handover of the wireless device towards one or more cells of the first base station. This configuration may occur if the first message is a handover request message. The first message may further comprise one or more UE contexts for the wireless device (e.g., security information, CSI information, MDT configuration information, ProSe configuration information, V2X service information, etc.), a handover cause value, a handover restriction list, etc. The handover request message may be a part of an NG (N2) interface based handover procedure for the wireless device. The core network entity may transmit the first message, for example, after or in response to receiving a handover required message from a handover source base station that serves the wireless device upon initiating the handover. One or more elements of the first message may be determined based on the handover required message and/or may be forwarded from the handover required message. One or more elements of the PDU session configuration parameters may be determined by the core network entity.

The first base station may transmit a Radio Resource Control (RRC) message to the wireless device. This transmission may occur based on receiving the PDU session configuration parameters associated with the first PDU session for the wireless device via the first message. The RRC message may be transmitted via a radio interface (e.g., an air interface, a signaling radio bearer). The RRC message may be an RRC connection reconfiguration message, an RRC connection reestablishment message, an RRC connection resume message, an RRC connection setup message, etc. The RRC message may comprise Packet Data Convergence Protocol (PDCP) configuration information for a first bearer associated with the first PDU session. The first bearer may be a radio bearer (e.g., a data radio bearer and/or a signaling radio bearer) between the first base station and the wireless device to be utilized for transmitting one or more packets associated with the first PDU session. Ethernet frames may be transmitted via the first bearer, for example, if the first PDU session is an Ethernet PDU session type.

The first base station may configure the PDCP configuration information (e.g., PDCP-config) of the RRC message at least based on one or more elements of the PDU session type field of the PDU session configuration parameters associated with the first PDU session. The PDCP configuration information may comprise one or more of a discard timer for a PDCP configuration, a status report required indication for an RLC-AM, a PDCP sequence number size, a PDCP packet reordering timer, an indication of uplink data transmission via a secondary cell group, an uplink data transmission split threshold, status feedback report configuration information, an uplink only header compression indication, etc.

A size of the header may be large to transmit via a radio interface (e.g., if a header of Ethernet frames may comprise a source MAC address and destination MAC address). Transmitting a header for Ethernet frames may not be efficient in an environment with limited radio resources. A base station and/or a wireless device may apply (e.g., if transmitting Ethernet frames) a header compression to reduce a size of frame header.

A base station and/or a wireless device may apply a header compression protocol (e.g., for an IP packet) that may be based on a Robust Header Compression (ROHC) framework. There may be multiple header compression algorithms, which may be called profiles, defined for an ROHC framework. A header compression profile may be specific to a particular network layer, transport layer, and/or upper layer protocol combination, e.g. TCP/IP, RTP/UDP/IP, etc. Detailed definitions of an ROHC channel may be specified as part of the ROHC framework such as in RFC 5795. The specification may indicate how to multiplex different flows (header compressed or not) over the ROHC channel, and/or how to associate a specific IP flow with a specific context state during initialization of the compression algorithm for that flow. Regarding an ROHC framework, a PDCP layer may apply RFC 5795 for no compression, RFC 3095 and/or RFC 4815 for RTP/UDP/IP, RFC 3095 and/or RFC 4815 for UDP/IP, RFC 3095 and/or RFC 4815 for ESP/IP, RFC 3843 and/or RFC 4815 for IP, RFC 6846 for TCP/IP, RFC 5225 for RTP/UDP/IP, RFC 5225 for UDP/IP, RFC 5225 for ESP/IP, RFC 5225 for IP, etc.

The PDCP configuration information may comprise one or more of: a PDCP packet header compression profile for the Ethernet PDU session type; a PDCP packet header compression profile for the unstructured PDU session type; an indication indicating that a PDCP packet header compression is not applied; etc. A handover target base station for a wireless device may receive, from a handover source base station and/or a core network entity (e.g., AMF, MME, etc.), PDU session configuration parameters associated with a first PDU session (e.g., PDU session, QoS flow, bearer, packet flow, tunnel, etc.) of an Ethernet type. The handover target base station may transmit, to at least the handover source base station (e.g., directly or via the core network entity), Radio Resource Control (RRC) parameters comprising Packet Data Convergence Protocol (PDCP) configuration parameters associated with the first PDU session. The RRC parameters may be further transmitted to the wireless device. The wireless device may transmit (e.g., based on completing the handover and/or the RRC parameters), to the handover target base station, one or more PDCP packets constructed (e.g., based on the PDCP configuration parameters).

A second base station (e.g., handover source base station, eNB, gNB, NR-RAN, etc.) may receive a measurement report from a wireless device. The measurement report may be transmitted an RRC message. The measurement report may comprise at least one of a Reference Signal Received Power (RSRP), a Reference Signal Received Quality (RSRQ), etc., for one or more cells of a first base station (e.g., handover target base station, eNB, gNB, NR-RAN, etc.). The second base station may make a decision to initiate a handover for the wireless device towards a target cell, which may be one of the one or more cells of the first base station.

The second base station may transmit (e.g., based on the decision of the handover for the wireless device) a first message to the first base station via a direct interface between the second base station and the first base station (e.g., Xn interface, X2 interface, Xx interface, etc.). The first message may be a handover request message. The first message may comprise at least one of a handover cause value, a cell identifier of the target cell, an AMF identifier, wireless device context information (e.g., security related information, a wireless device aggregated maximum bit rate, PDU session resources to be setup list: PDU session identifier, network slice selection assistance information, S-NS-SAI, QoS flow list), RRC configuration information, handover restriction list, trace activation indication, MDT information, etc.

The second base station may transmit (e.g., based on a handover decision regarding the wireless device) a handover required message to a core network entity (e.g., AMF, MME, etc.) via an interface between the second base station and the core network entity (e.g., NG interface, S1 interface, etc.). The handover required message may comprise at least one of one or more identifiers of the wireless device (e.g., AMF UE NGAP ID, RAN UE NGAP ID, AMF UE N2AP ID, RAN UE N2AP ID, AMF UE S1AP ID, RAN UE S1AP ID, etc.), handover type information (e.g., IntraNR, NRtoLTE-EPC, NRtoLTE-5GC, LTEtoNR, etc.), a handover cause value, a target cell identifier, a direct forwarding path availability indication, and/or source to target transparent container (e.g., RRC configuration information, etc.).

The core network entity may transmit (e.g., based on receiving the handover required message from the second base station) a first message to the first base station via an interface between the first base station and the core network entity (e.g., NG interface, S1 interface, etc.). The transmission may be based on one or more elements of the handover required message. The first message may be a handover request message. The first message may comprise one or more of an identifier of the wireless device (e.g., AMF UE NGAP ID, AMF UE N2AP ID, AMF UE S1AP ID, gNB UE NGAP ID, gNB UE N2AP ID, gNB UE S1AP ID, etc.), handover type information (e.g., IntraNR, NRtoLTE-EPC, NRtoLTE-5GC, LTEtoNR, etc.), a handover cause value, a target cell identifier, security related information, a wireless device aggregated maximum bit rate, paging assistance information, wireless device security capabilities, one or more security keys, etc.

The first message, which may be transmitted by the second base station (e.g., handover request message via an Xn interface) or the core network entity (e.g., handover request message via an NG interface), may comprise one or more of an identifier of the wireless device (e.g., old NG-RAN node UE XnAP ID, New NG-RAN node UE XnAP ID, Old NG-RAN node UE X2AP ID, New NG-RAN node UE X2AP ID, AMF UE N2AP identifier, gNB UE N2AP identifier, AMF UE NGAP identifier, eNB UE NGAP identifier, AMF UE S1AP identifier, eNB UE S1AP identifier, etc.), wireless aggregated maximum bit rate (e.g., wireless device AMBR and/or a maximum allowed aggregated bit rate for the wireless device), context information of the wireless device, etc.

The first message may comprise PDU session configuration parameters associated with a first PDU session for the wireless device. The PDU session configuration parameters may comprise one or more of a PDU session identifier, a S-NSSAI (e.g., single network slice selection assistance information, network slice selection assistance information, etc.), a QoS flow identifier of a QoS flow associated with the first PDU session, PDU session QoS parameters (e.g., 5QI, QCI, allocation and retention priority, GBR QoS information, a maximum bit rate for uplink and/or downlink, and/or guaranteed bit rate for uplink and/or downlink), QoS flow QoS parameters, transport layer address, a tunnel endpoint identifier (e.g., GTP-TEID), a NAS-PDU, a correlation identifier, a MAC address (e.g., associated with the first PDU session) of the wireless device, etc. The first base station may determine a PDCP packet header compression profile based on the MAC address of the wireless device.

The PDU session configuration parameters may comprise a PDU session type field for the first PDU session. The PDU session type field may indicate that a PDU session type of the first PDU session is one or more of an Ethernet PDU session type, an unstructured PDU session type, etc. The first message may further comprise a source MAC address and a destination MAC address of Ethernet frames associated with the first PDU session. The source MAC address and/or the destination MAC address may be a MAC address of the wireless device (e.g., associated with the first PDU session). Ethernet frames may be transmitted via the first PDU session, for example, if the first PDU session is an Ethernet PDU session type.

A base station may configure header compression profiles for Packet Data Convergence Protocol (PDCP) packets associated with an Ethernet PDU session type and/or an unstructured PDU session type, wherein the header compression profiles may be different from a header compression profile for IP PDU session type packets. A base station may receive (e.g., to apply differentiated PDCP packet header compression profiles for packets of an Ethernet PDU session type and/or an unstructured PDU session type) PDU session type information from a core network entity (e.g., AMF, SMF, UPF, MME, serving gateway, etc.) and/or from another base station during a PDU session setup procedure, a PDU session modify procedure, and/or a handover procedure.

A first base station may receive, from a core network entity (e.g., the AMF), a first message comprising packet data unit (PDU) session configuration parameters associated with a first PDU session for a wireless device. The PDU session configuration parameters may comprise a PDU session type field indicating that the first PDU session is an Ethernet type. The first base station may send, to the core network entity, a second message configured to acknowledge one or more elements of the first message. The PDU session configuration parameters may further comprise a second field indicating a payload type for a packet of the Ethernet type, wherein the payload type may be one of the following: IPv4, IPv6, or any other IP profile. The PDU session type field may further indicate a payload type for a packet of the Ethernet type, wherein the payload type may be one of the following: IPv4, IPv6, or any other IP profile. The core network entity may receive, from an SMF, a PDU session create response message, wherein the PDU session create response may be configured to confirm creation of the PDU session of the Ethernet type.

The first base station may receive a first packet of the Ethernet type. The first base station may construct a PDCP packet data unit comprising the first packet and a PDCP header. The header may comprise a field indicating that the packet is Ethernet type. The first base station may transmit to a wireless device the first packet. The first base station may determine (e.g., based on the first PDU session being the Ethernet type) a first PDCP packet header compression profile for a first bearer associated with the first PDU session. The first base station may transmit (e.g., to the wireless device) a PDCP packet associated with the first bearer. The Ethernet packet header of the PDCP packet may be compressed based on the PDCP packet header compression profile.

The first base station may receive one or more packets associated with the first bearer. The first base station may transmit (e.g., to the wireless device) one or more downlink PDCP packets generated from the one or more packets based on the PDU session type indication. The first base station may transmit the RRC message to the wireless device via the core network entity and/or a second base station. The second base station may be a handover source base station (e.g., if the first message is a handover request message). The first base station may further transmit, to a third base station, a second message comprising one or more elements of the first message, wherein the second message may be a handover request message. The first message may be configured to request one or more of: an initial context setup; an establishment of the first PDU session; a modification of the first PDU session; an establishment of a radio bear for the first PDU session; a modification of a radio bearer for the first PDU session; and/or a handover of the wireless device towards at least one cell of the first base station.

The first base station may receive (e.g., from a network node) a first message comprising PDU session configuration parameters associated with a first PDU session for a wireless device. The PDU session configuration parameters may comprise a PDU session type field indicating that the first PDU session is an Ethernet type. The first base station may transmit (e.g., to the network node) a second message comprising an RRC message for a wireless device. The RRC message may comprise PDCP configuration information for a first bearer associated with the first PDU session at least based on the PDU session being of the Ethernet type. The first base station may receive (e.g., from the wireless device associated with the RRC message) one or more PDCP packets associated with the first bearer. The one or more PDCP packets may be generated based on the PDCP configuration information.

The network node may be a second base station. The network node may be an AMF. The PDU session type field or a second field may indicate that the Ethernet type comprises payload of IPv4, IPv6, RTP/UDP/IP, or any other PDCP profiles. The PDCP configuration information may comprise a PDCP packet header compression profile for the Ethernet PDU. The first base station may transmit one or more downlink PDCP packets generated based on the PDU session type indication. The first message may be a handover request message for the wireless device.

The wireless device capability information may comprise the wireless device radio capability information and/or the wireless device core network capability information (e.g., Core Network Capability). The wireless device radio capability for paging Information may be separate from the wireless device radio capability information and/or the wireless device core network capability information. The wireless device radio capability for paging information may be used to enhance the paging in the E-UTRAN and/or the 5G new RAN.

The wireless device radio capability information may contain information on RATs that the wireless device may support (e.g., power class, frequency bands, etc.). This information may be sufficiently large (e.g., >50 octets) such that it may be undesirable to send it across the radio interface at every transition from ECM IDLE to ECM CONNECTED. To avoid this radio overhead, the MME/AMF may store the wireless device capability information during ECM IDLE state and the MME/AMF may, if it is available, send its up-to-date wireless device radio capability information to the E UTRAN and/or 5G new RAN in the S1/NG/N2 interface INITIAL CONTEXT SETUP REQUEST message unless the wireless device is performing an attach and/or registration procedure or a Tracking and/or registration Area Update procedure (e.g., for the "first TAU following GERAN/UTRAN Attach" or for a "radio capability update").

The MME/AMF may delete (or mark as deleted) any wireless device radio capability information that it may have stored, such as if the wireless device is performing an attach and/or registration procedure or a tracking and/or registration area update procedure (e.g., for the "first TAU following GERAN/UTRAN Attach" or for "radio capability update"). The MME/AMF may not send wireless device radio capability information to the E UTRAN and/or 5G New RAN in that message, for example, if the MME sends an S1, NG, and/or N2 interface INITIAL CONTEXT SETUP REQUEST or UE RADIO CAPABILITY MATCH REQUEST message during that procedure. The message may trigger the E UTRAN and/or 5G new RAN to request the wireless device radio capability from the wireless device and to upload it to the MME/AMF in the S1, NG, and/or N2 interface UE CAPABILITY INFO INDICATION message. The MME/AMF may store the wireless device radio capability information, and may include it in further INITIAL CONTEXT SETUP REQUEST or UE RADIO CAPABILITY MATCH REQUEST messages in other cases than attach and/or registration procedure, for example, tracking and/or registration area update procedure, e.g. for the "first TAU following GERAN/UTRAN Attach" and "U radio capability update" procedure.

The MME/AMF may send an S1 and/or NG interface INITIAL CONTEXT SETUP REQUEST message to the E UTRAN and/or 5G New RAN without wireless device radio capability information in it, such as if the wireless device is performing a Service Request (or other) procedure and/or the MME/AMF does not have wireless device radio capability information available (or it is available, but marked as "deleted"). This triggers the E UTRAN and/or 5G RAN to request the wireless device radio capability from the wireless device and upload it to the MME/AMF in the S1/NG/N2 interface UE CAPABILITY INFO INDICATION message. This use of the INITIAL CONTEXT SETUP REQUEST message may indicate that (e.g., for a signaling procedure such as a periodic tracking and/or registration area update) the wireless device radio capability may not be sent to the E UTRAN and/or 5G new RAN.

For cellular Internet of things (CIoT) optimizations, during the attach/registration procedure or the tracking/registration area update procedure (e.g., for the "first TAU following GERAN/UTRAN Attach"), if the MME/AMF does not send an S1/NG/N2 interface INITIAL CONTEXT SETUP REQUEST to the E-UTRAN/5G new RAN, the MME/AMF may obtain the wireless device radio capability information by sending the connection establishment indication message without wireless device radio capability information included to the E-UTRAN/5G new RAN. This may trigger the E UTRAN/5G new RAN to request the wireless device radio capability from the wireless device and upload it to the MME/AMF in the S1, NG, and/or N2 interface UE CAPABILITY INFO INDICATION message. In subsequent ECM connections, for example, if the MME/AMF does not send an S1/NG/N2 interface INITIAL CONTEXT SETUP REQUEST to the E UTRAN/5G new RAN, the MME/AMF may send the wireless device radio capability to the E-UTRAN/5G new RAN in the connection establishment indication message or downlink NAS transport message.

The wireless device radio capability may be provided indirectly from one CN node to another. The wireless device radio capability may be uploaded to the MME/AMF, for example, if the E-UTRAN/5G new RAN requests the wireless device radio capability information from the wireless device.

During handover via the MME/AMF (e.g., intra RAT and/or inter RAT), the radio capability information for the source and target RATS (e.g., 3GPP RATs) may be transferred in a source to target transparent container. Information on additional RATS (e.g., 3GPP RATs) may be optionally transferred in a source to target transparent container. Transfer of the radio capability information related to the source and/or additional RATs may have the advantage of avoiding the need for the target RAT to retrieve the information from the wireless device prior to a subsequent inter-RAT handover.

The MME/AMF may store the wireless device radio capability information (e.g., to allow for the addition of future radio technologies, frequency bands, and other enhancements). The E UTRAN/5G new RAN may store the wireless device radio capability information, received in the S1/NG/N2 interface INITIAL CONTEXT SETUP REQUEST message or obtained from the wireless device, for the duration of the RRC connection for that UE.

The MME/AMF may request for voice support match information. If requested, the base station (e.g., an eNB or gNB) may derive and/or provide an indication to the MME/AMF whether the wireless device radio capabilities are compatible with the network configuration (e.g., whether the wireless device supports the frequency bands that the network may rely upon for providing full PS voice coverage or whether the wireless device supports the SRVCC configuration of the network).

The wireless device core network capability may be split into the wireless device network capability IE (e.g., mostly for E-UTRAN/5G new RAN access related core network parameters) and the MS network capability IE (e.g., mostly for UTRAN/GERAN access related core network parameters) and may contain non radio-related capabilities (e.g., the NAS security algorithms, etc.). The wireless device network capability and/or the MS network capability may be transferred between CN nodes at MME/AMF to MME/AMF, MME/AMF to SGSN, SGSN to SGSN, and SGSN to MME/AMF changes.

The wireless device may send the wireless device core network capability information to the MME/AMF during the attach/registration and non-periodic/periodic tracking/registration area update procedure within the NAS message. The capability information may have the advantage of keeping the wireless device core network capability information stored in the MME/AMF up to date (e.g., to handle the situation if the USIM is moved into a different device while out of coverage, and the old device did not send the detach message; and/or to handle an inter-RAT tracking area update).

The MME/AMF may store the latest wireless device core network capability received from the wireless device. Wireless device core network capability that an MME/AMF may receive from an old MME/AMF/SGSN may be replaced if the wireless device provides the wireless device core network capability with attach/registration and/or the tracking/registration area update signaling. The MME may remove the stored MS nwork capability, if MS network capability is not included in attach/registration or tracking/registration area update signaling (e.g., if the wireless device is capable of E-UTRAN/5G new RAN).

If the wireless device's UE Core network capability information changes (e.g., in either CONNECTED or in IDLE state, which may be associated with instances of LTE/5G/GERAN/UTRAN coverage and/or having ISR activated), the wireless device may perform a Tracking/registration Area Update when it next returns to E UTRAN/5G new RAN.

To allow for the addition of future features, the MME/AMF may store the wireless device network capability and the MS network capability. The base station (e.g., eNB/gNB) may upload the wireless device radio capability for paging information to the MME/AMF in the S1/NG/N2 interface UE CAPABILITY INFO INDICATION message (e.g., in a separate IE from the wireless device radio capability). The wireless device radio capability for paging information may contain wireless device radio paging information provided by the wireless device to the base station, and other information derived by the base station (e.g., band support information) from the wireless device radio capability information. The wireless device radio paging information may assist the E-UTRAN in optimizing the radio paging procedures.

The upload may occur substantially concurrently with the base station uploading the wireless device radio capability information. The MME/AMF may store the wireless device radio capability for paging information in the MME/AMF context. The MME/AMF may provide the wireless device radio capability for paging information to the base station as part of the S1/NG/N2 paging message, for example, if the MME/AMF needs to page. The base station may use the wireless device radio capability for paging information to enhance the paging towards the wireless device.

If the wireless device radio capability for paging information changes, the wireless device may follow the same procedures as if the wireless device radio capability changes. The wireless device radio capability for paging information may be sent to the target MME/AMF (e.g., to handle the situations of connected mode inter-MME/AMF change). The wireless device radio capability for paging information may be applicable for MMEs/AMFs (e.g., it may not be applicable for SGSNs). Therefore, it may not be included by MME/AMF during context transfers towards SGSNs.

A wireless device may send, to a core network entity (e.g., AMF, MME, etc.), wireless device capability information, which may comprise an information field indicating that the wireless device supports an Ethernet type PDU session (e.g., Ethernet type data network connection, Ethernet type bearer, Ethernet type QoS flow, etc.). The core network entity may determine whether it initiates for the wireless device to request a data network connection of Ethernet type at least based on the wireless device capability information. The core network entity may establish a data network connection (e.g., PDU session, bearer, QoS flow, etc.) of an Ethernet type based on the wireless device capability information.

A core network entity (e.g., AMF, MME, etc.) may provide, to a wireless device, a network feature support information of a core network associated with the core network entity. The network feature support information may comprise an information field indicating that the core network supports an Ethernet type data network connection (e.g., Ethernet type PDU session, Ethernet type bearer, Ethernet type QoS flow, etc.). The wireless device may determine whether it requests for the core network entity to establish a data network connection of an Ethernet type based on the network feature support information received from the core network entity.

Figure 28:
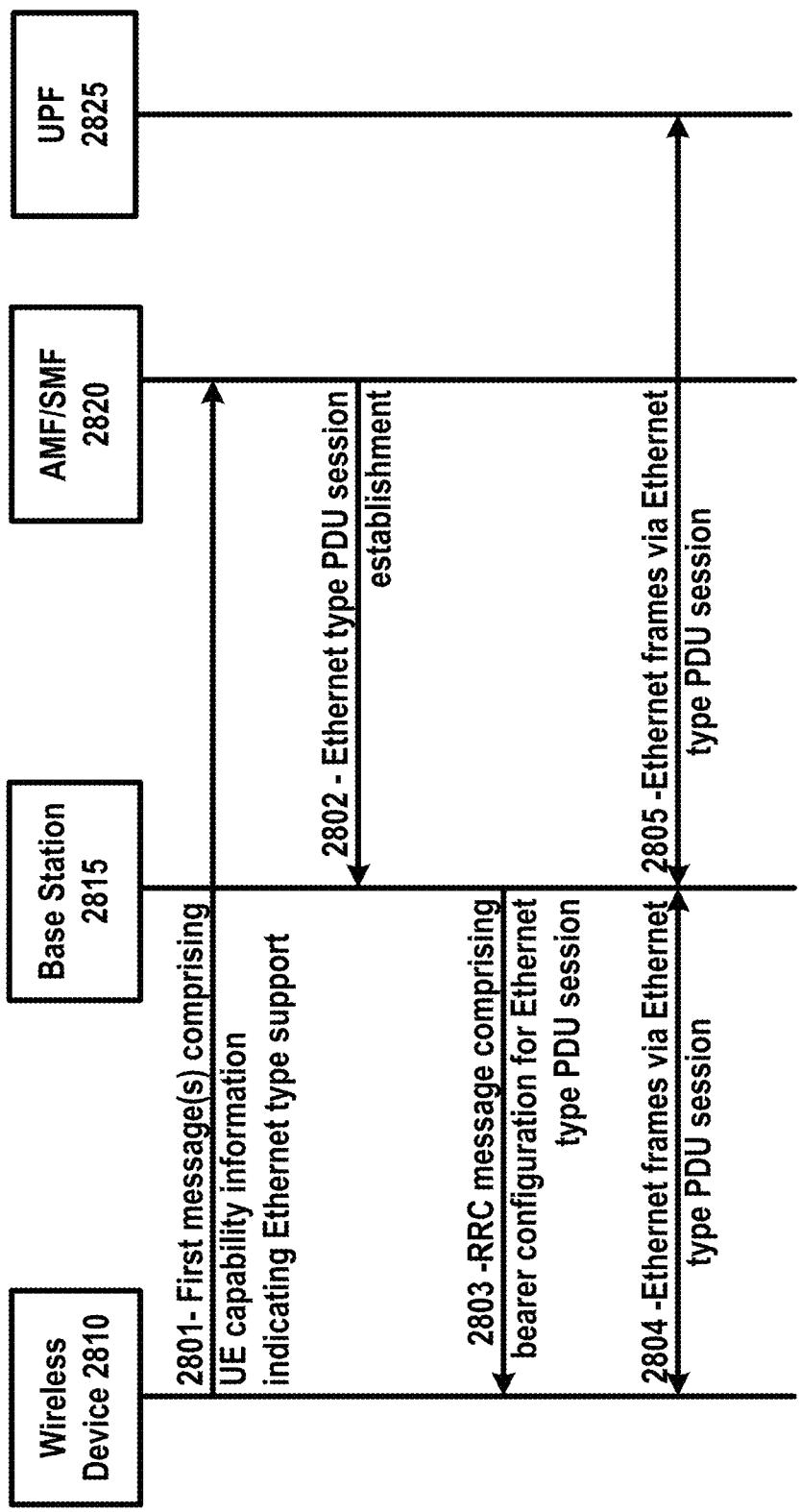
FIG. 28 shows an example message flow for an Ethernet type PDU session.

FIG. 28 shows an example message flow for determining support for an Ethernet type PDU session. At step 2801, a wireless device 2810 (which may be a wireless device 406, or any other wireless device described herein) may send, to a core network entity (e.g., an AMF and/or SMF 2820, which may be any AMF and/or SMF 2820 described herein), a first message. The first message may be sent via a base station 2815, which may be any base station described herein. The first message may be a NAS layer message sent via a base station. The first message may be a message for a registration, an attach, etc., of the wireless device 2810 to a network and/or services (e.g., LTE and/or 5GS services). The first message may be an attach request message, a registration request message, etc. The first message may be a message to update location related information (e.g., tracking area, registration area, etc.) of the wireless device 2810. The first message may be a tracking area update request message, a registration area update request message, etc.

At step 2802, the core network entity may send (to the wireless device 2810 and/or based on the first message) an accept message for the first message to indicate the request of the first message is accepted. The first message may be an attach accept message, a registration accept message, a tracking area update accept message, a registration area update accept message, a PDU session resource setup request message, etc. The accept message may comprise at least one of tracking area information (e.g., TAI, registration area identifier, location area identifier, etc.), GUTI, identifier of the core network entity, accept indication, etc.

The accept message may trigger the base station 2815 sending, to the wireless device 2810, a second message (e.g., an RRC message) comprising bearer configuration information for an Ethernet type PDU session. The base station 2815 may send the second message based on the determination made based on the first indication field and/or one or more elements of the wireless device capability information. The second message may be sent to initiate for the wireless device 2810 requesting a data network connection of an Ethernet type. The data network connection may comprise Ethernet frames transmitted at step 2804, from the wireless device 2810 to the base station 2815 via the Ethernet type PDU session. At step 2805, the Ethernet frames may be forwarded from the base station 2815 to the AMF/SMF 2820 and/or to the UPF 2825 via the Ethernet type PDU session.

The second message may be sent via a direct interface between the core network entity and the base station (e.g., NG interface, N2 interface, N3 interface, S1 interface, etc.). The second message may be a first paging message associated with a service of Ethernet type (e.g., Ethernet type data network connection, Ethernet type PDU session, Ethernet type QoS flow, Ethernet type bearer, etc.). The base station 2815 may transmit, to the wireless device 2810, via a radio interface, a second paging message (e.g., RRC paging message) to inform the wireless device that the wireless device needs to make an RRC connection with the base station. The base station 2815 may send the second paging message based on the second message (e.g., the first paging message). The wireless device 2810 may initiate a random access procedure to make an RRC connection with the base station, for example, based on receiving the second paging message.

A base station (e.g., a base station 400, a base station 2815, base station 2930, or any other base station described herein) may serve a wireless device (e.g., a wireless device 406, a wireless device 2810, a wireless device 2920, or any other wireless device described herein) with one or more cells. One or more of the one or more cells may be operated by the first base station. One or more other cells of the one or more cells may be operated by a secondary base station when the first base station is a master base station for a dual connectivity (e.g., multi-connectivity, tight-interworking between an LTE base station and a 5G base station, etc.) of the wireless device. A core network entity (e.g., AMF, SMF, UPF, MME, Serving Gateway, etc.) may interwork with the base station to serve the wireless device (e.g., to support a registration, an attach, a service registration, a tracking area management, a registration area management, a location related information management, a mobility control, a PDU session control, a QoS flow control, a bearer control, a wireless device context management, a policy control, a security control, etc.). The AMF may be an Access and Mobility Management Function. The SMF may be a Session Management Function. The UPF may be a User Plane Function. The MME may be a Mobility Management Entity.

The base station may transparently transfer one or more uplink control messages received from the wireless device towards the core network entity, and/or one or more downlink control messages received form the core network entity towards the wireless device via a radio resource control (RRC) messages and/or an NG interface messages (e.g., S1 message, N2 message, N3 message, NG message, etc.).

The wireless device may send, to a core network entity a first message. The first message may be sent via a base station, which may be any base station described herein. The first message may be a NAS layer message sent via a base station. The first message may be a message for a registration, an attach, etc., of the wireless device to a network and/or services (e.g., LTE and/or 5GS services). The first message may be an attach request message, a registration request message, etc. The first message may be a message to update location related information (e.g., tracking area, registration area, etc.) of the wireless device. The first message may be a tracking area update request message, a registration area update request message, etc.

The first message may comprise at least one of a request indication, GUTI, UE identifier (e.g., TMSI, IMSI, S-TMSI, etc.), last visited tracking area information (e.g., last visited registration identifier, last visited location area identifier, etc.), DRX related information, etc.

The core network entity may send (to the wireless device and/or based on the first message) an accept message for the first message to indicate the request of the first message is accepted. The first message may be an attach accept message, a registration accept message, a tracking area update accept message, a registration area update accept message, etc. The accept message may comprise at least one of tracking area information (e.g., TAI, registration area identifier, location area identifier, etc.), GUTI, identifier of the core network entity, accept indication, etc.

The first message may comprise wireless device capability information (e.g., wireless device network capability information element) of the wireless device. The wireless device capability information may comprise one or more indication fields to inform whether the wireless device supports one or more functions, such as security integration algorithms, encryption algorithms, ProSe related functions, CIoT optimization functions, D2D communication functions, etc.

The wireless device capability information may comprise a first indication field indicating that the wireless device supports a PDU session of an Ethernet type (e.g., Ethernet type PDU session, Ethernet type data network connection, Ethernet type bearer, Ethernet type QoS flow, etc.). The first indication field may comprise one or more capability indication bits, which may be binary. If the first indication field comprises "0", it may indicate that the wireless device does not support an Ethernet type data network connection (e.g., Ethernet type PDU session, Ethernet type bearer, Ethernet type QoS flow, etc.). If the first indication field comprises "1", it may indicate that the wireless device supports an Ethernet type data network connection.

The wireless device capability information may comprise a MAC address of the wireless device for an Ethernet type service (e.g., Ethernet type PDU session, Ethernet type data connection, Ethernet type bearer, Ethernet type QoS flow, etc.). The MAC address may be associated with a certain PDU session of Ethernet type, which may be established and/or will be established for the wireless device.

The wireless device capability information may comprise one or more indication fields (e.g., information elements) indicating one or more of: that the wireless device supports an Ethernet Type providing a certain data transmission bit rate (e.g., at least one Ethernet type of 10 Mbps, 100 Mbps, 1 Gbps, etc.); that the wireless device supports Multiple Ethernet addresses; that the wireless device supports multiple Ethernet types; that the wireless device operates (and/or is able to operate) as at least one of a terminating node, an originating node, and/or a switch/hub for an Ethernet type session; that the wireless device supports an Ethernet type of a certain Ethernet standard version; etc.

The wireless device capability information may comprise one or more indication fields (e.g., information elements) indicating that the wireless device supports an address resolution protocol (ARP), and/or one or more configuration parameters (e.g., transmission interval, delay information, multicast related information, etc.) associated with the ARP. The wireless device capability information may comprise one or more indication fields (e.g., information elements) indicating that the wireless device supports Ethernet Multicast and/or Broadcast, and/or one or more configuration parameters (e.g., mask information, address information, etc.) associated with the Ethernet multicast and/or broadcast. The wireless device capability information may comprise one or more QoS related information, such as one or more QoS features (e.g., QoS level, supporting bit rate, latency, frame loss rate, transmission delay, transmission periodicity, frame error rate, priority information, etc.) and/or one or more QoS parameters.

The wireless device capability information may comprise a multicast indication field indicating that the wireless device supports Ethernet multicast. The multicast indication field may comprise one or more indication values for the wireless device, which may be binary. If the multicast indication field comprises "0", it may indicate that multicast support is disabled. If the multicast indication field comprises "1", it may indicate that multicast support is enabled but only on an active slave. If the multicast indication field comprises "2", it may indicate that multicast support is enabled on all slaves.

The wireless device capability information may comprise a primary indication field indicating that the wireless device may be a primary device (e.g., interface name: eth0) for Ethernet type connection. The primary device may be the first of bonding interfaces to be used, and/or may not be abandoned unless it fails. This setting of the primary indication field (e.g., wireless device may be a primary device) may be used when an NIC (e.g., Ethernet-based network interface card) in the bonding interface is faster and/or is able to handle a bigger load.

The core network entity may determine whether it initiates an Ethernet type data network connection for the wireless device based on the first indication field. The core network entity may determine whether it initiates an Ethernet type data network connection for the wireless device based on one or more elements of the wireless device capability information and/or one or more wireless device subscription information of the wireless device. The core network entity may determine one or more configurations associated with an Ethernet type data network connection (e.g., Ethernet type service, Ethernet type PDU session, Ethernet type QoS flow, Ethernet type bearer, etc.) for the wireless device based on the first indication field and/or one or more elements of the wireless device capability information. The core network entity may determine whether it initiates one or more procedures associated with an Ethernet type data connection (e.g., Ethernet type service, Ethernet type PDU session, Ethernet type QoS flow, Ethernet type bearer, etc.) for the wireless device based on the first indication field and/or one or more elements of the wireless device capability information.

The core network entity (e.g., AMF or SMF, MME, etc.) may transmit one or more elements of the wireless device capability information to a second core network entity (e.g., UPF, user plane core network entity, SMF, SGW, PGW, NEF, SCEF, etc.). The second core network entity may determine whether it initiates an Ethernet type data network connection for the wireless device based on the one or more elements of the wireless device capability information when the second core network entity receives mobile terminating data (e.g., MT packets, MT frames, etc.) of Ethernet type and/or mobile terminating data indication associated with Ethernet type from a network node (e.g., an application server, another network other than an LTE network and/or a 5G network, another wireless device, network entity of an LTE network and/or a 5G network, etc.) for the wireless device. The mobile terminating data indication may be a request indication for an Ethernet type data network connection for the wireless device. The mobile terminating data indication may indicate that mobile terminating data of Ethernet type for the wireless device will be sent to the second core network entity.

The core network entity may send an Ethernet type PDU session establishment message to a base station, which may trigger an RRC message comprising bearer configuration information for Ethernet type PDU session second message to a base station and/or to the wireless device based on the determination made based on the first indication field and/or one or more elements of the wireless device capability information. The second message may be sent to initiate for the wireless device to request a data network connection of an Ethernet type. The data network connection may comprise Ethernet frames transmitted at step from the wireless device to the base station via the Ethernet type PDU session. The Ethernet frames may be forwarded from the base station to the AMF/SMF and/or the UPF via the Ethernet type PDU session.

The wireless device may send, to the core network entity and based on receiving the second paging message, a third message to request establishment of a first data network connection of Ethernet type via the base station. The third message may be sent via the base station (e.g., via an RRC message and/or an NG message (N2 message, S1 message)). The third message may be a service request message, a PDU session establishment request message, a data network connection request message, etc. The third message may comprise at least one of a request indication, GUTI, an identifier of the wireless device (e.g., TMSI, IMSI, S-TMSI, etc.), last visited tracking area information (e.g., last visited registration identifier, last visited location area identifier, etc.), DRX related information, etc. The third message may comprise a MAC address of the wireless device, wherein the MAC address may be associated with the first data network connection of Ethernet type (e.g., Ethernet type data network connection, Ethernet type PDU session, Ethernet type QoS flow, Ethernet type bearer, Ethernet frame transmission flow, etc.).

The core network entity may send (e.g., based on the third message) a fourth message associated with the wireless device to the base station. The fourth message may comprise one or more configuration information to establish a first PDU session associated with the first data network connection. The first PDU session may be Ethernet type. The fourth message may be sent to request, to the base station, establishment of one or more PDU sessions of Ethernet type (e.g., Ethernet type data network connection, Ethernet type PDU session, Ethernet type QoS flow, Ethernet type bearer, Ethernet frame transmission flow, etc.) for the wireless device. The fourth message may be sent via a direct interface between the core network entity and the base station (e.g., NG interface, N2 interface, S1 interface, N3 interface, etc.). The fourth message may be an initial context setup request message, a PDU session setup request message, a PDU session modify request message, an E-RAB setup request message, an E-RAB modify request message, etc.

The fourth message may comprise at least one of one or more UE identifier of the wireless device, UE aggregate maximum bit rate (UE-AMBR), one or more PDU session identifier of the one or more PDU sessions of Ethernet type and/or of the second data network connection, one or more QoS information, GTP tunneling information (e.g., tunnel endpoint identifiers), NAS-PDU, PDU session type information (e.g., Ethernet type indication), slice identifiers, network slice selection assistant information (e.g., S-NS-SAI, NSSAI, etc.), one or more bearer identifiers, one or more QoS flow identifiers, etc. Based on receiving the fourth message, the base station may configure one or more parameters associated with at least one of the first data network connection and/or the one or more PDU sessions of Ethernet type, and/or transmit, to the wireless device, an RRC message to add/modify at least one of the one or more PDU sessions of Ethernet type.

The second message may be sent to the wireless device via the base station. The second message may be a NAS layer message to request the wireless device to initiate a PDU session request procedure associated with PDU sessions of Ethernet type (e.g., Ethernet type data network connection, Ethernet type PDU session, Ethernet type QoS flow, Ethernet type bearer, Ethernet frame transmission flow, etc.).

The core network entity may send, to the base station and based on the determination made based on the first indication field and/or one or more elements of the wireless device capability information, a PDU session configuration request message to establish and/or modify one or more PDU sessions of Ethernet type (e.g., Ethernet type data network connection, Ethernet type PDU session, Ethernet type QoS flow, Ethernet type bearer, Ethernet frame transmission flow, etc.) for the wireless device. The PDU session configuration request message may be sent via the direct interface between the core network entity and the base station (e.g., NG interface, N2 interface, S1 interface, N3 interface, etc.). The PDU session configuration request message may be an initial context setup request message, a PDU session setup request message, a PDU session modify request message, an E-RAB setup request message, an E-RAB modify request message, etc. Based on receiving the PDU session configuration request message, the base station may configure one or more parameters associated with at least one of the one or more PDU sessions of Ethernet type, and/or transmit, to the wireless device, an RRC message to add/modify one or more of the PDU sessions of Ethernet type.

Figure 29:
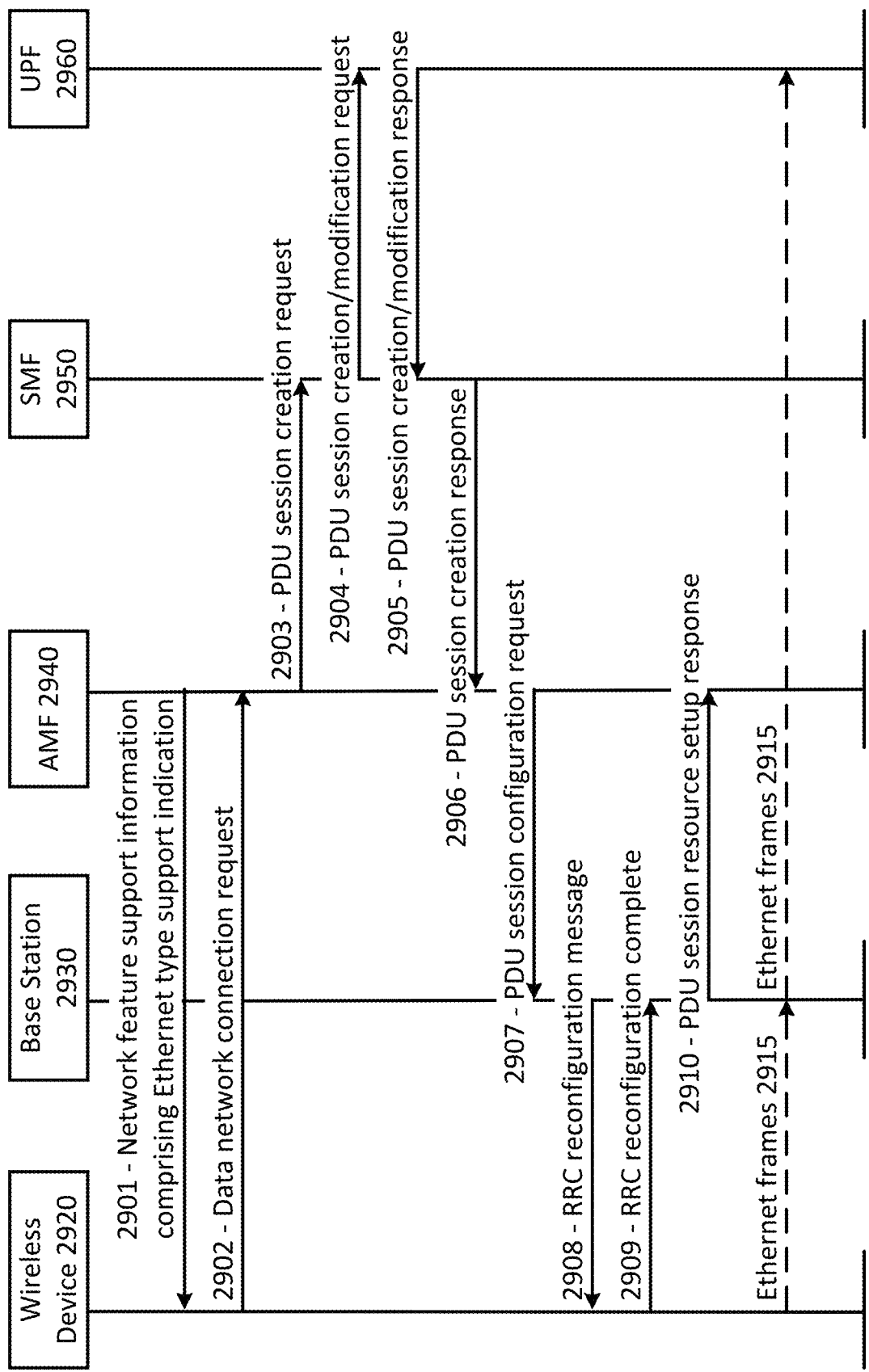
FIG. 29 shows an example message flow for establishing an Ethernet type PDU session.

FIG. 29 shows an example message flow for establishing an Ethernet type PDU session. At step 2901, a core network entity (e.g., AMF 2940, SMF 2950, UPF 2960, MME, Serving Gateway, etc.) may send, to a wireless device 2920, a fifth message comprising network feature support information (e.g., 5G network feature support information element, EPS network feature support information elements, etc.) of a core network associated with the core network entity and/or the wireless device 2920. The fifth message may be sent (e.g., based on receiving the first message from the wireless device 2920) to indicate that the request of the first message is accepted (or may be sent without a first message having occurred). The fifth message may be an attach accept message, a registration accept message, a tracking area update accept message, a registration area update accept message, etc. The fifth message may be sent via a base station 2930.

The network feature support information of the fifth message may comprise one or more indication fields to inform whether the core network (e.g., associated with the core network entity and/or the wireless device supports) one or more functions, such as security integration algorithms, encryption algorithms, ProSe related functions, CIoT optimization functions, D2D communication functions, header compression functions, etc.

The network feature support information may comprise a second indication field indicating that the core network (e.g., associated with the core network entity and/or the wireless device supports) supports a PDU session of an Ethernet type (e.g., Ethernet type PDU session, Ethernet type data network connection, Ethernet type bearer, Ethernet type QoS flow, etc.). The second indication field may comprise one or more capability indication bits (e.g., one or more feature support indication bits, which may be binary). If the second indication field comprises "0", it may indicate that the core network does not support an Ethernet type data network connection (e.g., Ethernet type PDU session, Ethernet type bearer, Ethernet type QoS flow, etc.). If the second indication field comprises "1", it may indicate that the core network supports an Ethernet type data network connection.

The network feature support information may comprise a MAC address of the wireless device 2920 for an Ethernet type service (e.g., Ethernet type PDU session, Ethernet type data connection, Ethernet type bearer, Ethernet type QoS flow, etc.). The MAC address may be associated with a certain PDU session of Ethernet type, which may be established and/or will be established for the wireless device 2920.

The network feature support information may comprise a MAC address of an end node (source or destination node, e.g., opposite side node of the wireless device) for an Ethernet type service (e.g., Ethernet type PDU session, Ethernet type data connection, Ethernet type bearer, Ethernet type QoS flow, etc.). The MAC address may be associated with a certain PDU session of Ethernet type, which may be established and/or will be established for the wireless device.

The network feature support information may comprise one or more indication fields (e.g., information elements) indicating one or more of: that the core network and/or the wireless device 2920 supports an Ethernet type providing a certain data transmission bit rate (e.g., at least one Ethernet type of 10 Mbps, 100 Mbps, 1 Gbps, etc.); that the core network supports multiple Ethernet addresses; that the core network and/or the wireless device 2920 supports multiple Ethernet types; that the core network and/or the wireless device 2920 operates (and/or is able to operate) as at least one of a terminating node, an originating node, and/or a switch/hub for an Ethernet type session; that the core network and/or the wireless device 2920 supports an Ethernet type of a certain Ethernet standard version; etc.

The network feature support information may comprise one or more indication fields (e.g., information elements) indicating that the core network and/or the wireless device 2920 supports an address resolution protocol (ARP), and/or one or more configuration parameters (e.g., transmission interval, delay information, multicast related information, etc.) associated with the ARP. The network feature support information may comprise one or more indication fields (e.g., information elements) indicating that the core network and/or the wireless device 2920 supports Ethernet Multicast and/or Broadcast, and/or one or more configuration parameters (e.g., mask information, address information, etc.) associated with the Ethernet multicast and/or broadcast. The network feature support information may comprise one or more QoS related information, such as one or more QoS features (e.g., QoS level, supporting bit rate, latency, frame loss rate, transmission delay, transmission periodicity, frame error rate, priority information, etc.) and/or one or more QoS parameters.

The network feature support information may comprise a multicast indication field indicating that the core network and/or the wireless device 2920 supports Ethernet multicast. The multicast indication field may comprise one or more indication values associated with the core network and/or the wireless device 2920, which may be binary. If the multicast indication field comprises "0", it may indicate that multicast support is disabled. If the multicast indication field comprises "1", it may indicate that multicast support is enabled but only on an active slave. If the multicast indication field comprises "2", it may indicate that multicast support is enabled on all slaves.

The network feature support information may comprise a primary indication field indicating that the core network and/or the wireless device 2920 may be a primary device (e.g., interface name: eth0) for Ethernet type connection. The primary device may be the first of bonding interfaces to be used, and/or may not be abandoned unless it fails. This setting of the primary indication field (e.g., wireless device 2920 may be a primary device) may be used when an NIC (e.g., Ethernet-based network interface card) in the bonding interface is faster and/or is able to handle a bigger load.

At step 2902, the wireless device 2920 may send, to the core network entity (e.g., via the base station 2930), a sixth message to request establishment of a second data network connection of Ethernet Type (e.g., Ethernet type data network connection, Ethernet type PDU session, Ethernet type QoS flow, Ethernet type bearer, etc.) based on the second indication field and/or one or more elements of the network feature support information. The wireless device 2920 may send the sixth message to request establishment and/or modification of one or more data network connection of Ethernet type at least based on the second indication field and/or one or more elements of the network feature support information.

The sixth message may be sent via the base station 2930 (e.g., via an RRC message and/or an NG message (N2 message, S1 message)). The sixth message may be an attach request message, a registration request message, a service request message, a PDU session establishment request message, a data network connection request message, etc. The sixth message may comprise at least one of a request indication, GUTI, an identifier of the wireless device 2920 (e.g., TMSI, IMSI, S-TMSI, etc.), last visited tracking area information (e.g., last visited registration identifier, last visited location area identifier, etc.), DRX related information, etc. The sixth message may comprise a MAC address of the wireless device 2920, wherein the MAC address may be associated with the second data network connection of Ethernet type (e.g., Ethernet type data network connection, Ethernet type PDU session, Ethernet type QoS flow, Ethernet type bearer, Ethernet frame transmission flow, etc.).

The core network may determine to create a PDU session based on the sixth message. At step 2903, an AMF 2940 of the core network may send a PDU session creation request message to an SMF 2950. At step 2904, the SMF 2950 may send a PDU session creation and/or modification request message to a UPF 2960. The core network may determine to instantiate the PDU session based on the request message(s). At step 2905, the UPF 2960 may send a PDU session creation and/or modification response to the SMF 2950. At step 2906, the SMF 2950 may send a PDUI session creation response message to the AMF 2940.

At step 2907, the core network entity may send a PDU session configuration request message associated with the wireless device 2920 to the base station 2930. The PDU session configuration request message may comprise one or more configuration information to establish a second PDU session associated with the second data network connection. The second PDU session may be Ethernet type. The PDU session configuration request message may be sent to request, to the base station 2930, establishment of one or more PDU sessions of Ethernet type (e.g., Ethernet type data network connection, Ethernet type PDU session, Ethernet type QoS flow, Ethernet type bearer, Ethernet frame transmission flow, etc.) for the wireless device 2920. The PDU session configuration request message may be sent via a direct interface between the core network entity and the base station (e.g., NG interface, N2 interface, S1 interface, N3 interface, etc.).

The PDU session configuration request message may be an initial context setup request message, a PDU session setup request message, a PDU session modify request message, an E-RAB setup request message, an E-RAB modify request message, etc. The PDU session configuration request message may comprise one or more of a UE identifier of the wireless device 2920, a wireless device aggregate maximum bit rate (UE-AMBR), one or more PDU session identifiers of the one or more PDU sessions of Ethernet type and/or of the second data network connection, one or more QoS information, GTP tunneling information (e.g., tunnel endpoint identifiers), NAS-PDU, PDU session type information (e.g., Ethernet type indication), slice identifiers, network slice selection assistant information (e.g., S-NSSAI, NSSAI, etc.), one or more bearer identifiers, one or more QoS flow identifiers, etc.

The base station 2930 may configure one or more parameters associated with at least one of the second data network connection and/or the one or more PDU sessions of Ethernet type (e.g., based on receiving the PDU session configuration request message). The base station 2930 may establish (e.g., based on receiving the PDU session configuration request message) at least one of the second data network connection and/or the one or more PDU sessions of Ethernet type between the base station 2930 and a user plane core network entity (e.g., UPF, serving gateway, PDN gateway, etc.) for the wireless device 2920.

At step 2908 (e.g., based on receiving the PDU session configuration request message) the base station 2930 may transmit, to the wireless device 2920, a radio resource control (RRC) message via a radio interface. The RRC message may comprise information elements indicating establishment of a first data radio bearer associated with the second data network connection. The base station 2930 may send the RRC message to add or modify one or more radio bearers associated with at least one of the second data network connection and/or the one or more PDU sessions of Ethernet type.

The RRC message may be an RRC connection reconfiguration message (e.g., RRC Connection Reconfiguration), an RRC connection reestablishment message, an RRC connection setup message, an RRC connection resume message, etc. The RRC message may comprise a radio resource config dedicated information element comprising at least one of a list of one or more radio bearers to be added and/or modified, one or more radio resource configuration information for the one or more radio bearers, radio bearer identifiers, radio bearer type information, rlc configuration information, PDU session identifiers, QoS flow identifiers, EPS bearer identifiers, pdcp configuration information, logical channel identifiers associated with the one or more radio bearers, etc. The wireless device 2920 may transmit a response message for the RRC message at step 2909 (e.g., based on receiving the RRC message). At step 2910, the base station may transmit a PDU session request acknowledgement to the core entity based on receiving the response message.

The wireless device 2920 may configure (e.g., based on one or more elements of the RRC message) one or more parameters associated with the first data radio bearer, the one or more radio bearers, the second data network connection, and/or the one or more PDU sessions of Ethernet type. The wireless device 2920 may transmit, to the base station 2930, one or more Ethernet frames 2915 via the first data radio bearer at least based on one or more elements of the RRC message. The base station may forward the one or more Ethernet frames 2915 towards a user plane core network entity (e.g., UPF, serving gateway, PDN gateway, etc.). The one or more Ethernet frames 2915 may comprise a MAC address of the wireless device. The wireless device may compress headers of the one or more Ethernet frames.

A core network entity may receive, from a wireless device, a first message comprising wireless device capability information of the wireless device. The wireless device capability information may comprise a first indication field indicating that the wireless device supports a PDU session of an Ethernet type. The core network entity may determine whether to initiate an Ethernet type data network connection based on the first indication field. The core network entity may send a second message to initiate for the wireless device to request a data network connection of the Ethernet type based on the determination. The core network entity may receive, from the wireless device, a third message configured to request establishment of a first data network connection of the Ethernet type. The wireless device may send the third message in response to the second message. The core network entity may send, to a base station, a fourth message comprising a configuration information to establish a first PDU session associated with the first data network connection. The first PDU session may be the Ethernet type.

The core network entity may receive the first message and the third message via the base station. The core network entity may send the second message to: a base station, wherein the base station may transmit a paging message to the wireless device at least based on the second message; and/or a wireless device via the base station. The first message may be one of: a registration request message; a registration area update request message; a tracking area update request message; and/or an attach request message.

A wireless device may receive, from a core network entity, a fifth message comprising network feature support information of a core network associated with the core network entity. The network feature support information may comprise a second indication field indicating that the core network supports a data network connection of an Ethernet type. The wireless device may send, to the core network entity, a sixth message to request establishment of a second data network connection of the Ethernet type based on the second indication field. The wireless device may receive, from a base station, a radio resource control message comprising information elements indicating establishment of a first data radio bearer associated with the second data network connection. The wireless device may transmit one or more Ethernet frames via the first data radio bearer.

The core network entity may send the fifth message via the base station. The fifth message may be one of: a registration accept message; a registration area update accept message; a tracking area update accept message; and/or an attach accept message.

Figure 30B:
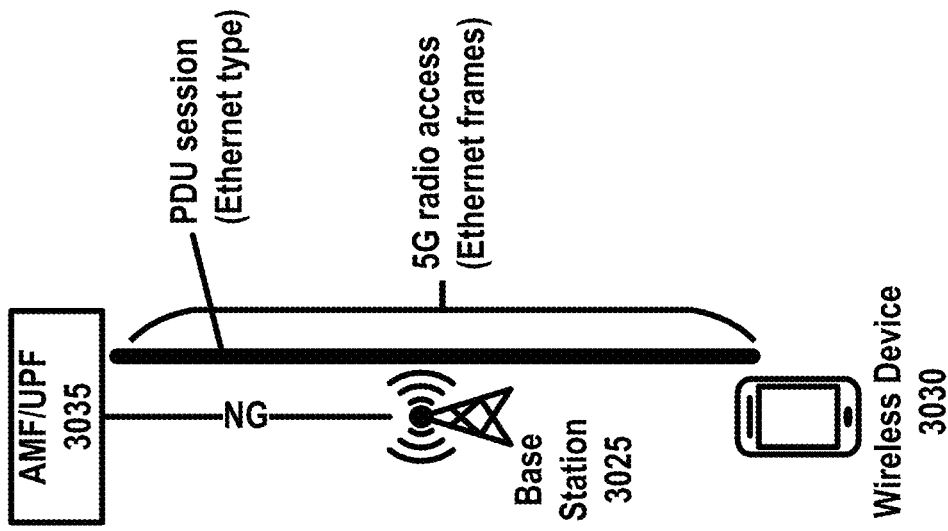
FIG. 30B shows an example configured Ethernet type PDU session.
Figure 30A:
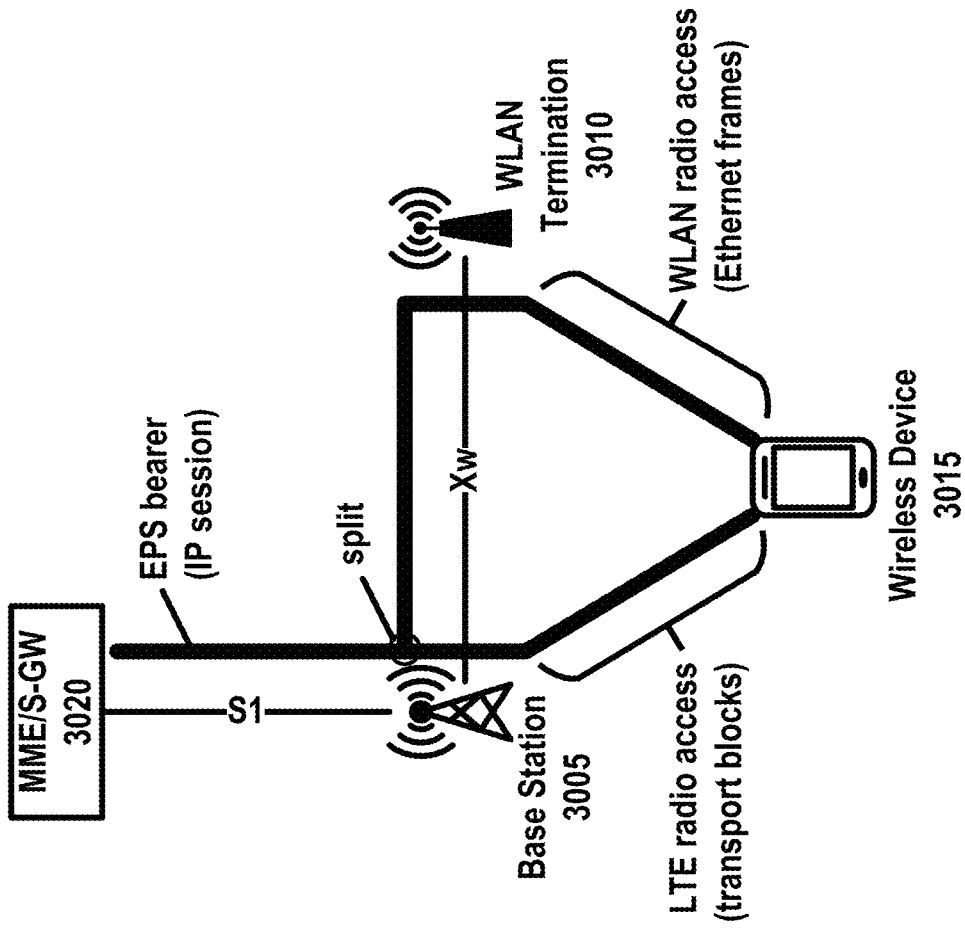
FIG. 30A shows an example interworking architecture.

FIG. 30A shows an example LTE and WLAN (wireless local area network) interworking architecture. A base station 3005 may support LTE-WLAN aggregation (LWA) operation. A UE in RRC_CONNECTED may be configured by the base station 3005 to utilize radio resources of LTE and WLAN. Two scenarios may be supported depending on a backhaul connection between LTE and WLAN: non-collocated LWA scenario for a non-ideal backhaul and a collocated LWA scenario for an ideal/internal backhaul. FIG. 30A shows an example architecture for the non-collocated LWA scenario, where the WLAN termination (WT) node 3010 may terminate the Xw interface for WLAN. In LWA, a radio protocol architecture that a particular bearer uses may depend on an LWA backhaul scenario and/or how the bearer is set up. For example, two bearer types may exist for LWA: split LWA bearer and/or switched LWA bearer.

In downlink communications, for example, packet data units (PDUs) may be sent over WLAN in LWA operation. An LTE-WLAN aggregation adaptation protocol (LWAAP) entity may generate LWAAP PDU containing a DRB identity. A WT may use an LWA ethertype (e.g. 0x9E65) for forwarding data to a wireless device 3015 over WLAN. The wireless device 3015 may use an LWA ethertype to determine that a received PDU belongs to an LWA bearer and may use a DRB identity to determine to which LWA bearer the PDU belongs to. In an uplink, for PDUs sent over WLAN in LWA operation, an LWAAP entity in the wireless device 3015 may generate LWAAP PDU containing a DRB identity and the wireless device 3015 may use an LWA ethertype (e.g. 0x9E65) for sending data over WLAN.

LWA may support split bearer operation where a PDCP sublayer supports in-sequence delivery of upper layer PDUs based on a reordering procedure. A wireless device 3015 supporting LWA may be configured by a base station 3005 to send PDCP status report and/or LWA status report, e.g., in cases where feedback from WT is not available. RLC AM and RLC UM may be configured for an LWA bearer. E-UTRAN may not configure LWA with a dual connectivity, LTE WLAN radio level integration with IPsec tunnel (LWIP), or RAN controlled WLAN interworking (RCLWI) simultaneously for the same UE. If LWA and RAN assisted WLAN interworking are simultaneously configured for the same wireless device 3015, in RRC_CONNECTED, the wireless device 3015 may apply LWA.

For an LWA bearer, if data available for transmission is equal to or exceeds a threshold configured by the base station 3005, the wireless device 3015 may decide which PDCP PDUs are sent over WLAN or LTE. If data available is below a threshold, the wireless device 3015 may transmit PDCP PDUs on LTE or WLAN (e.g., via WT node 3010) as configured by the base station 3005. THE PDCP PDUs may be transmitted to an MME and/or S-GW 3020. For LWA DRB, the base station 3005 may configure IEEE 802.11 AC value to be used for PDCP PDUs that may be sent over WLAN in an uplink. For LWA bearer, for routing of uplink data over WLAN, a WT MAC address may be provided to the wireless device 3015 by the base station 30005 or using other WLAN procedure.

In non-collocated LWA scenario, the base station 3005 may be connected to one or more WTs 3010 via an Xw interface. In a collocated LWA scenario, an interface between LTE and WLAN may be configured and/or implemented in the collocated unit. For LWA, required interfaces to a core network may be S1-U and/or S1-MME (e.g. NG, N2, and/or N3 interfaces) which may be terminated a base station 3005. A core network interface may not be required for a WLAN.

FIG. 30B shows an example configured PDU session of Ethernet type. In an Ethernet type PDU session architecture, a data flow for Ethernet type session may be established between wireless device(s) 3030 and UPF(s) 3035 via one or more base stations 3025. Ethernet frames are transmitted via the Ethernet type PDU session employing 5G radio access interface (e.g. Uu interface, air interface of 5G cell). Ethernet frames may be transmitted to the base station 3025 without passing through a WT 3010 (e.g., differently than as described in FIG. 30A).

Figure 31:
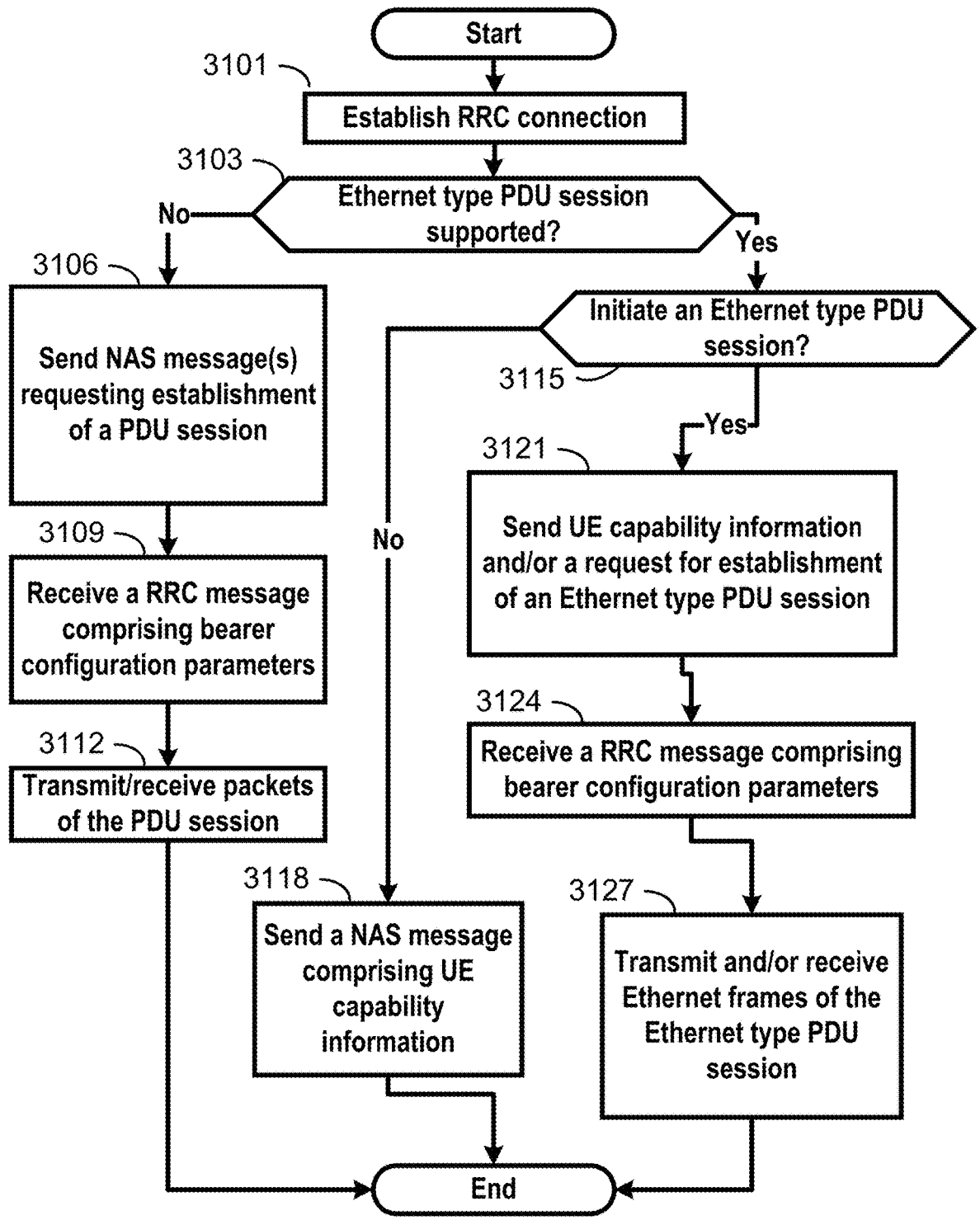
FIG. 31 shows an example method for establishing an Ethernet type PDU session.

FIG. 31 shows an example method for establishing an Ethernet type PDU session. The example process may be performed by a wireless device (e.g., a wireless device 406, a wireless device 2810, a wireless device 2920, or any other wireless device described herein). At step 3101, the wireless device may establish an RRC connection with a base station (e.g., a base station 401, a base station 2820, a base station 2930, or any other base station described herein). At step 3103, the wireless device will determine if it (and/or a connected base station) supports an Ethernet type PDU session. If an Ethernet type PDU session is not supported, the wireless device may proceed with step 3106. If an Ethernet type PDU session is supported, the wireless device may proceed with step 3115. At step 3106, the wireless device may send (e.g., to the base station) NAS message(s) requesting establishment of a PDU session (e.g., IPv4, IPv6, IPv4v6, unstructured type). At step 3109, the wireless device may receive (e.g., from the base station and/or a core network entity) an RRC message comprising bearer configuration parameters for the PDU session. At step 3112, the wireless device may transmit and/or receive packets of the PDU session.

At step 3115, the wireless device may determine if an Ethernet type PDU session is desired. An Ethernet type PDU session may be desired if it promotes efficient communication, or if it is needed for a certain type of communication. If an Ethernet type PDU session is not desired, at step 3118 the wireless device may send a NAS message comprising wireless device capability information indicating that the wireless device supports an Ethernet type PDU session. If an Ethernet type PDU session is desired, at step 3121 the wireless device may send, to the base station, one or more NAS message(s) and/or a request for establishment of an Ethernet type PDU session. The one or more NAS message(s) may comprise wireless device capability information indicating that the wireless device supports an Ethernet type PDU session. At step 3124, the wireless device may receive an RRC message comprising bearer configuration parameters for the Ethernet type PDU session. At step 3127, the wireless device may transmit and/or receive Ethernet frames of the Ethernet type PDU session (e.g. Ethernet frames comprising compressed headers comprising source and/or destination MAC addresses).

Figure 32:
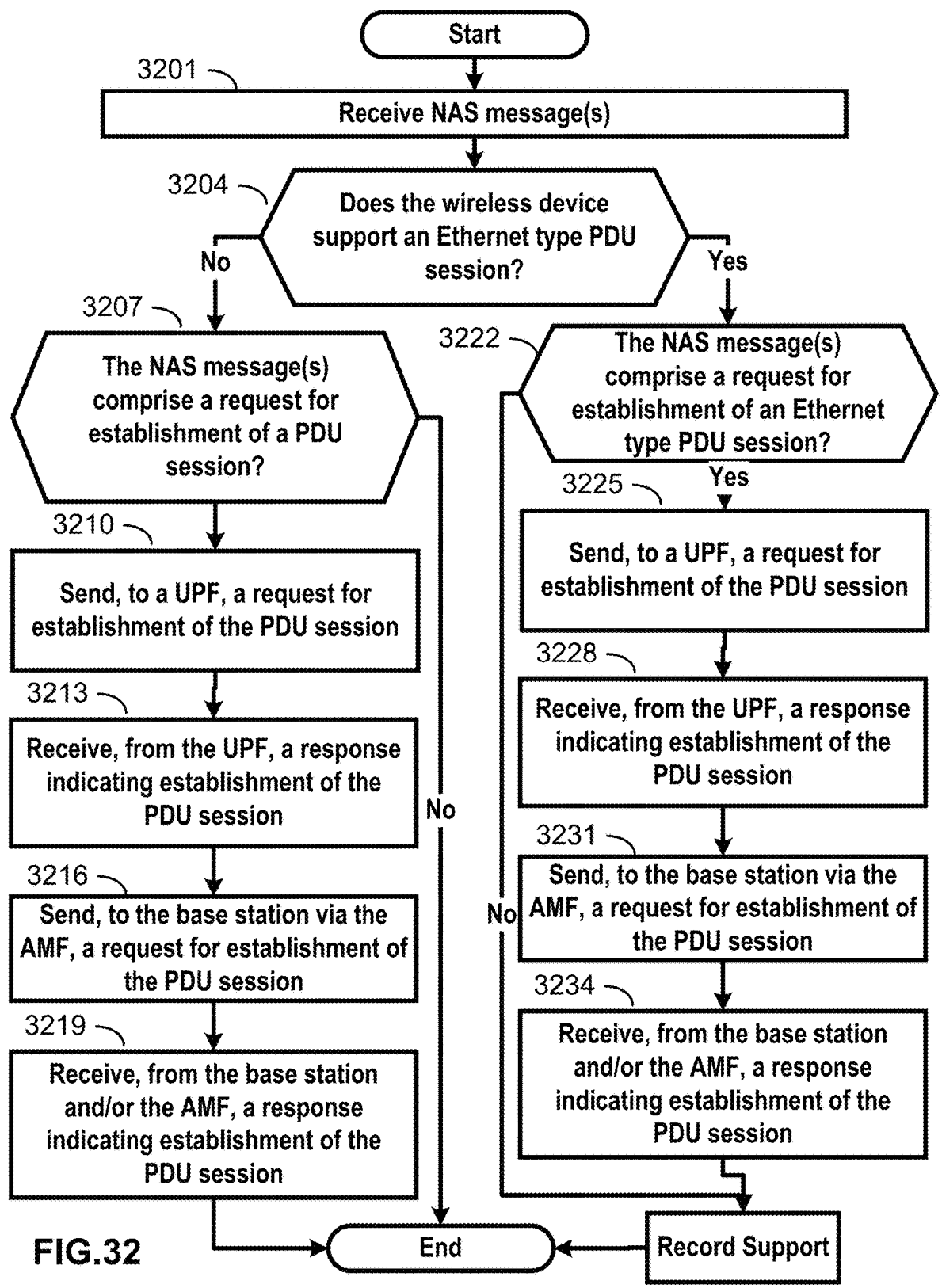
FIG. 32 shows an example method for establishing an Ethernet type PDU session.

FIG. 32 shows an example method for establishing an Ethernet type PDU session. The example process may be performed by an SMF (e.g., an SMF 2820, an SMF 2950, or any other SMF described herein). At step 3201, the SMF may receive one or more NAS messages from a wireless device (e.g., a wireless device 406, a wireless device 2810, a wireless device 2920, or any other wireless device described herein) via a base station (e.g., a base station 401, a base station 2820, a base station 2930, or any other base station described herein) and/or via an AMF (e.g., an AMF 2820, an AMF 2940, or any other AMF described herein). At step 3204, the SMF may determine if the one or more NAS message(s) comprise wireless device capability information indicating that the wireless supports an Ethernet type PDU session. If an Ethernet type PDU session is supported, the SMF may proceed with step 3222. At step 3207, if an Ethernet type PDU session is not supported, the SMF may determine if the NAS message(s) comprise a request for establishment of a PDU session (e.g. IPv4, IPv6, IPv4v6, or unstructured type). At step 3210, the SMF may Send, to a UPF, a request for establishment of the PDU session for the wireless device. At step 3213, the SMF may receive, from the UPF, a response indicating establishment of the PDU session. At step 3216, the SMF may send, to the base station via the AMF, a request for establishment of the PDU session. At step 3219, the SMF may receive, from the base station and/or the AMF, a response indicating establishment of the PDU session.

At step 3222, the SMF may determine if the NAS message(s) comprise a request for establishment of an Ethernet type PDU. At step 3225, the SMF may send, to a UPF, a request for establishment of the Ethernet type PDU session for the wireless device. At step 3228, the SMF may receive, from the UPF, a response indicating establishment of the Ethernet type PDU session. At step 3231, the SMF may send, to the base station via the AMF, a request for establishment of the Ethernet type PDU session. At step 3234, the SMF may receive, from the base station and/or the AMF, a response indicating establishment of the Ethernet type PDU session. At step 3237, the SMF may record an indication that the wireless device supports an Ethernet type PDU session.

Figure 33:
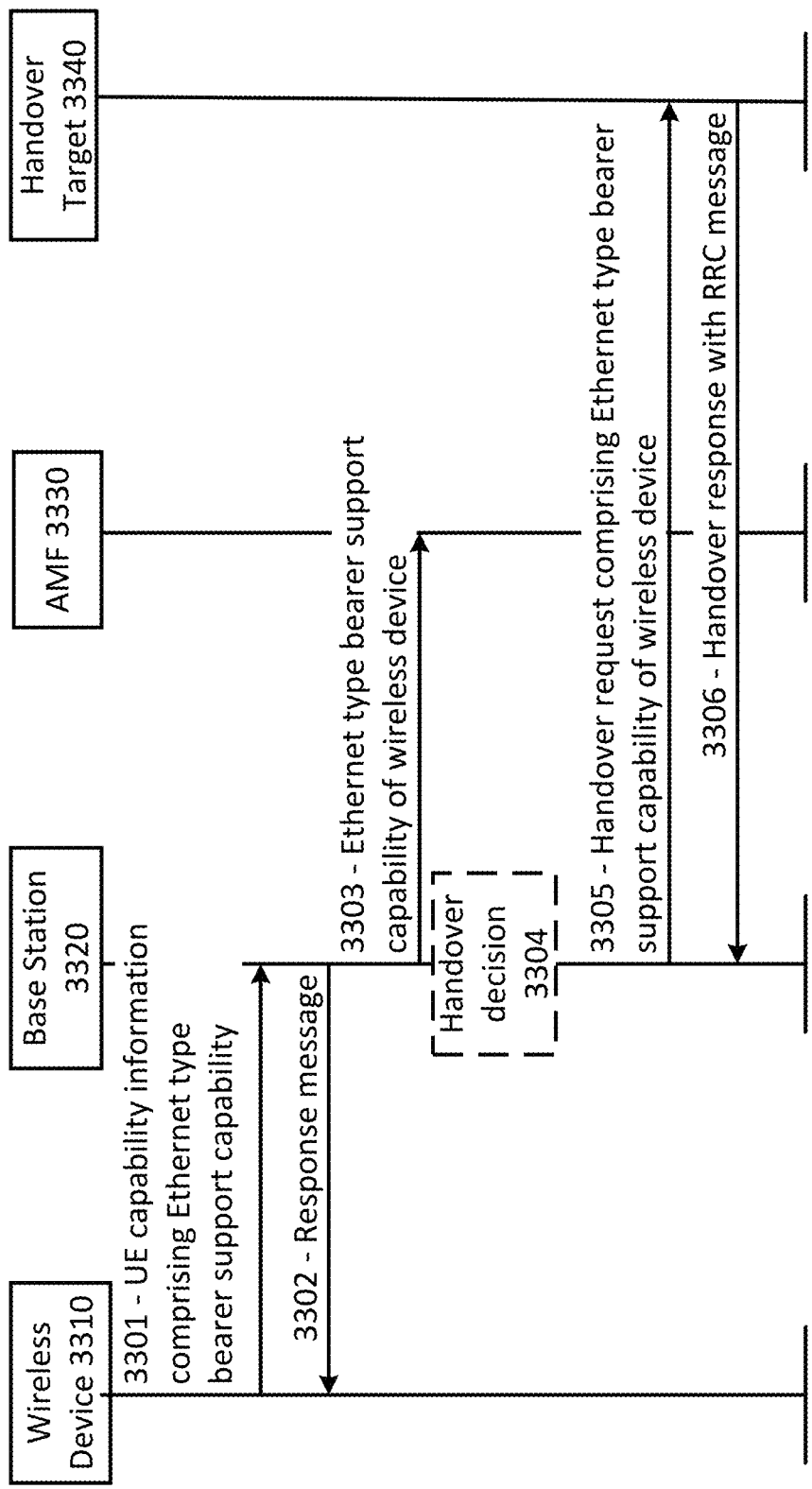
FIG. 33 shows an example message flow for establishing an Ethernet type PDU session with handover.

FIG. 33 shows an example message flow for establishing an Ethernet type PDU session with handover. A wireless device 3310 (which may be a wireless device 406, a wireless device 2810, a wireless device 2920, or any other wireless device described herein) may transmit, to a base station 3320 (which may be a base station 401, a base station 2820, a base station 2930, or any other base station described herein), wireless device capability information comprising one or more indication field indicating that the wireless device 3310 supports an Ethernet type bearer (e.g., session, PDU session, QoS flow). The base station 3320 may configure one or more parameters for the wireless device 3310 and/or establish one or more Ethernet type bearers at least based on the wireless device capability information. The base station may send one or more elements of the wireless device capability information to a handover target base station 3340 (which may be a base station 401) associated with the wireless device 3310. The base station may send one or more elements of the wireless device capability information to a core network entity. The core network entity may employ the information associated with the wireless device capability to configure one or more parameters for the wireless device.

At step 3301, the wireless device 3310 may transmit, to the base station 3320, a wireless device capability (e.g., wireless device network capability information element) of the wireless device 3310. The wireless device capability information may comprise one or more indication fields to inform whether the wireless device supports one or more functions, such as security integration algorithms, encryption algorithms, ProSe related functions, CIoT optimization functions, D2D communication functions, etc.

The wireless device capability information may comprise a first indication field indicating that the wireless device 3310 supports a PDU session of an Ethernet type (e.g., Ethernet type PDU session, Ethernet type data network connection, Ethernet type bearer, Ethernet type QoS flow, etc.). The first indication field may comprise one or more capability indication bits, which may be binary. If the first indication field comprises "0", it may indicate that the wireless device 3310 does not support an Ethernet type data network connection (e.g., Ethernet type PDU session, Ethernet type bearer, Ethernet type QoS flow, etc.). If the first indication field comprises "1", it may indicate that the wireless device 3310 supports an Ethernet type data network connection.

The wireless device capability information may comprise a MAC address of the wireless device 3310 for an Ethernet type service (e.g., Ethernet type PDU session, Ethernet type data connection, Ethernet type bearer, Ethernet type QoS flow, etc.). The MAC address may be associated with a certain PDU session of Ethernet type, which may be established and/or will be established for the wireless device 3310.

The base station 3320 may determine whether to configure an Ethernet type bearer for the wireless device 3310 based on the Ethernet type session capability of the wireless device capability information. The base station 3320 may determine whether to configure an Ethernet type bearer for the wireless device 3310 based on one or more elements of the wireless device capability information and/or one or more UE subscription information of the wireless device 3310. The base station 3320 may determine one or more configurations associated with an Ethernet type bearer (e.g., Ethernet type service, Ethernet type PDU session, Ethernet type QoS flow, Ethernet type data network session, etc.) for the wireless device 3310 based on the Ethernet type session capability of the wireless device capability information and/or one or more elements of the wireless device capability information. The base station 3320 may determine whether it initiates one or more procedures associated with an Ethernet type bearer (e.g., Ethernet type service, Ethernet type PDU session, Ethernet type QoS flow, Ethernet type data network connection, etc.) for the wireless device 3310 based on the Ethernet type session capability and/or one or more elements of the wireless device capability. The base station 3320 may supply a response message to the wireless device 3310 at step 3302. The response message may comprise an indication that the capability information is being received and/or processed.

The base station 3320 (e.g., gNB, eNB) may transmit one or more elements of the wireless device capability information to a handover target base station 3340. The handover target base station 3340 may determine whether to configure an Ethernet type bearer for the wireless device 3310 based on the one or more elements of the wireless device capability information when configuring one or more configuration parameters comprising bearer configurations for the wireless device 3310.

At step 3303, the base station 3320 may forward the Ethernet type session capability of the wireless device 3310 to a core network entity (e.g., AMF 3330, MME, etc.). The Ethernet type session capability information may be employed by the core network entity for configuring one or more parameters for the wireless device 3310 and/or for paging procedure of the wireless device 3310. The Ethernet type session capability information may be sent via a wireless device capability info indication message over an NG/N2/S1 interface between the base station 3320 and the core network entity.

If Ethernet sessions are supported, it may be desirable to enhance downlink and/or uplink radio network protocols and scheduling for the Ethernet sessions (e.g., Ethernet type PDU session, Ethernet type data network connection, Ethernet type QoS flow, Ethernet type bearer, etc.). The base station 3320 (e.g., gNB, eNB, etc.) may consider wireless device capability information in handling Ethernet sessions for configuring one or more RRC parameters for the wireless device (wireless device 3310). A base station (e.g., base station 3320, eNB, gNB) may transmit one or more RRC messages comprising one or more parameters to indicate one or more configuration parameters of PHY, MAC, RLC, PDCP, QoS layer of the wireless device 3310. The base station 3320 may consider UE capability information in handling Ethernet sessions for uplink and/or downlink scheduling and/or other PHY, MAC, RLC, PDCP, QoS layer mechanisms. The wireless device 3310 may be configured by the base station 3320 with a configuration that is compatible with the wireless device capability information. The at least one Ethernet capability may be an optional feature in 5G. The wireless device 3310 may transmit wireless device capability information in handling Ethernet sessions to the base station 3320 via an RRC message, and/or the base station 3320 may consider wireless device capability information in configuring the wireless device 3310.

A potential issue with respect to wireless device capability is how a wireless device configuration may be maintained or updated during a handover. At step 3304, the base station 3320 may determine whether to handover the wireless device 3310 to the target base station 3340. A wireless device may be configured with a first wireless device configuration with a serving base station (e.g., base station 3320, serving eNB, serving gNB) based on wireless device capability information received from the wireless device (e.g., wireless device 3310) and/or from another base station (e.g., a source base station of previous handover). The target base station 3340 (e.g., target eNB) may maintain the same wireless device configuration information, or may update the wireless device configuration at least based on the wireless device capability received from the base station 3320 and/or the wireless device 3310. The target base station 3340 may have a different cell configuration and/or may require a different wireless device configuration. The target base station 3340 may employ cells with the same frequencies as the serving cell and may require maintaining the same wireless device configuration. The target base station 3340 may configure wireless device configuration parameters after the handover is completed, or may configure wireless device configuration during the handover process at least based on the wireless device capability. The configuration may have the advantage of maintaining or updating the wireless device configuration during a handover. LTE, 5G, and/or other technologies may not support Ethernet type session, and/or addressing wireless device configuration and/or wireless device capability associated with Ethernet type session may not be addressed in LTE, 5G, and/or other technologies.

It may be advantageous to develop a signaling flow, wireless device processes, and base station processes to address wireless device configuration and wireless device configuration parameter based on wireless device capability comprising capability information associated with Ethernet type session (e.g., Ethernet type PDU session, Ethernet type QoS flow, Ethernet type bearer, etc.), handling during the handover to reduce the handover overhead and delay, and increase handover efficiency. Furthermore, it may be advantageous to develop handover signaling and handover message parameters to address wireless device configuration and/or wireless device capability information associated with Ethernet type session during a handover process (e.g., Xn based handover, NG based handover, N2 based handover, X2 based handover, S1 based handover, etc.).

A network may control wireless device mobility in RRC_CONNECTED mode. The network may decide when the wireless device 3310 connects to which 5G RAN cell(s) or inter-RAT cell (e.g., LTE cell). For network controlled mobility in RRC_CONNECTED, the PCell may be changed using an RRC connection reconfiguration message including the mobilityControlInfo (handover). The SCell(s) may be changed using the RRC Connection Reconfiguration message either with or without the mobilityControlInfo. The network may trigger the handover procedure, for example, based on radio conditions, load, QoS, wireless device category, etc. To facilitate this, the network may configure the wireless device 3310 to perform measurement reporting (possibly including the configuration of measurement gaps). The network may also initiate handover blindly (e.g., without having received measurement reports from the wireless device 3310). The base station 3320 may prepare one or more target cells (e.g., before sending the handover message to the wireless device 3310). The base station 3320 may select the target PCell. The base station 3320 may also provide the target base station 3340 with a list of best cells on each frequency for which measurement information is available (e.g., in order of decreasing RSRP). The base station 3320 may also include available measurement information for the cells provided in the list. The target base station 3340 may decide which SCells are configured for use after handover, which may include cells other than the ones indicated by the base station 3320.

The target base station 3340 may generate a message used to configure the wireless device 3310 for the handover. The message may include the access stratum configuration to be used in the target cell(s). The base station 3320 may transparently (e.g., without altering values and/or content) forward the handover message and/or information received from the target base station 3340 to the wireless device 3310. The base station 3320 may initiate data forwarding for (a subset of) the dedicated radio bearers. After receiving the handover (command) message, the wireless device 3310 may attempt to access the target PCell at the available RACH occasion according to a random access resource selection. After allocating a dedicated preamble for the random access in the target PCell, 5G (or LTE) RAN may ensure the preamble is available from the first RACH occasion the wireless device 3310 may use. After successful completion of the handover, the wireless device 3310 may send a message used to confirm the handover to the target base station 3340. One or more messages for the handover may be sent via a direct interface (e.g., Xn interface, X2 interface, etc.) between the base station 3320 and the target base station 3340. One or more messages for the handover may be sent via a core network entity (e.g., AMF, MME, etc.) and direct interfaces (e.g., NG interface, S1 interface, N2 interface, etc.) between the base station 3320 and the core network entity and between the core network entity and the target base station 3340.

If the target base station 3340 does not support the release of RRC protocol which the base station 3320 used to configure the wireless device 3310, the target base station 3340 may be unable to comprehend the wireless device configuration provided by the base station 3320. The target base station 3340 may use the full configuration option to reconfigure the wireless device 3310 for handover and/or re-establishment (e.g., if the target base station 3340 is unable to comprehend the wireless device configuration). Full configuration option includes an initialization of the radio configuration, which may make the procedure independent of the configuration used in the source cell(s) with the exception that the security algorithms may be continued for RRC re-establishment.

After the successful completion of handover, PDCP SDUs may be re-transmitted in the target cell(s). Retransmission may apply for dedicated radio bearers using RLC-AM mode and/or for handovers not involving full configuration option. After the successful completion of handover not involving full configuration option, the SN (sequence number) and/or the HFN (hyper frame number) may be reset for some radio bearers. Both SN and HFN may continue (e.g., for the dedicated radio bearers using RLC-AM mode). The PDCP entities may be newly established (SN and HFN may not continue) for dedicated radio bearers irrespective of the RLC mode (e.g., for reconfigurations involving the full configuration option). UE behavior to be performed upon handover may be the same regardless of the handover procedures used within the network (e.g., whether the handover includes X2/Xn or S1/NG/N2 signaling procedures).

The base station 3320 may, for a dynamic or predetermined time, maintain a context to enable the wireless device 3310 to return in case of handover failure. After having detected handover failure, the wireless device 3310 may attempt to resume the RRC connection either in the source PCell or in another cell using the RRC re-establishment procedure. This connection resumption may succeed if the accessed cell is prepared (e.g., if the access cell is a cell of the base station 3320 or of another gNB towards which handover preparation has been performed). The cell in which the re-establishment procedure succeeds may become the PCell while SCells, if configured, may be released.

Normal measurement and mobility procedures may be used to support handover to cells broadcasting a CSG (closed subscriber group) identity. In addition, 5G RAN and/or LTE RAN may configure the wireless device 3310 to report that it is entering or leaving the proximity of cell(s) included in its CSG whitelist. 5G RAN and/or LTE RAN may request the wireless device 3310 to provide additional information broadcast by the handover candidate cell e.g., cell global identity, CSG identity, CSG membership status. 5G RAN and/or LTE RAN may use the proximity report to configure measurements as well as to decide whether or not to request additional information broadcast by the handover candidate cell. The additional information may be used to verify whether or not the wireless device 3310 is authorized to access the target PCell and may also be needed to identify handover candidate cell. This may involve resolving PCI confusion (e.g., if the physical layer identity that is included in the measurement report does not uniquely identify the cell).

The mapping of a serving cell to a wireless device configuration based on the wireless device capability information may be configured by the serving gNB with RRC signaling. The mechanism for wireless device configuration and reconfiguration may be based on RRC signaling. When needed, the configuring SCell based on a wireless device configuration may be reconfigured with RRC signaling. The configuring SCell based on the wireless device configuration may not be reconfigured with RRC while the SCell is configured.

A base station may consider wireless device capability in configuring one or more UE configuration. The wireless device 3310 may be configured with a configuration that is compatible with wireless device capability. Ethernet type session capability may be an optional feature in 5G and/or LTE, and/or Ethernet type session capability may be introduced per bearer, PDU session, QoS flow, and/or combination of them. The wireless device 3310 may transmit its wireless device capability comprise Ethernet type session capability to base station 3320 via an RRC message and the base station 3320 may consider the wireless device capability in configuring wireless device configuration.

The purpose of RRC connection reconfiguration procedure may be to modify an RRC connection, e.g., to establish, modify and/or release RBs (radio bearers), to perform handover, to setup, modify, and/or release measurements, to add, modify, and/or release SCells. As part of the procedure, NAS dedicated information may be transferred from a core network entity to the wireless device 3310 via a base station (e.g., 5G/LTE RAN, eNB, gNB, etc.). If the received RRC connection reconfiguration message includes the sCellToReleaseList, the wireless device 3310 performs SCell release. If the received RRC Connection Reconfiguration message includes the sCellToAddModList, the wireless device 3310 performs SCell additions or modification.

The wireless device context within the base station 3320 may contain information regarding roaming/handover restrictions which may be provided either at connection establishment or at the last TA (tracking area)/registration/RNA (RAN notification area) update process. The base station 3320 may configure the wireless device 3310 measurement procedures employing at least one RRC connection reconfiguration message. The wireless device 3310 may be triggered to send at least one measurement report by the rules set by, for example, system information, RRC configuration, etc. The base station 3320 may make a handover decision based on many parameters (e.g., the measurement reports, RRM information, traffic and load, a combination of the above, etc.). The base station 3320 may initiate the handover procedure by sending a handover request message to one or more potential target base station 3340s directly via an Xn/X2 interface. If the base station 3320 sends the handover request message, the handover request message may trigger a handover preparation timer. Upon reception of the handover request acknowledgement message the base station 3320 may stop the handover preparation timer.

At step 3305, the base station 3320 may initiate the handover procedure by sending a handover request to one or more potential target base stations 3340 indirectly via an NG/N2/S1 interface and a core network entity (e.g., AMF, MME). The base station 3320 may send a handover required message to the core network entity, and the core network entity may send a handover request message comprising one or more elements of the handover required message to the target base station 3340. The base station 3320 may start a handover preparation timer (e.g., if the base station 3320 sends the handover request). After reception of a handover command message from the core network entity, the base station 3320 may stop the handover preparation timer. The handover command message may be sent by the core network entity based on receiving a handover request acknowledgement message.

The base station 3320 may transmit a handover request message (or a handover request via the core network entity) to one or more potential target base station 3340 passing information to prepare the handover at the target side. The handover request message may comprise wireless device configuration information and/or wireless device capability information comprising Ethernet type session capability of the wireless device 3310. The target base station 3340 may employ the wireless device configuration information and/or wireless device capability information of the wireless device 3310 to properly configure wireless device configuration and/or one or more bearer configurations (e.g., PDU session configurations, QoS flow configurations) before the wireless device 3310 connects to the target base station 3340.

The target base station 3340 may configure the wireless device configuration based on the wireless device capability information. If the wireless device 3310 does not support Ethernet type session (e.g., Ethernet type PDU session, Ethernet type QoS flow, Ethernet type bearer, Ethernet type data connection, etc.), the target base station 3340 may not configure the wireless device 3310 with Ethernet type session. If the wireless device 3310 does not support an Ethernet type session, the base station 3320 may consider this limitation in one or more wireless device configurations associated with at least RRC configurations. A wireless device may not support Ethernet type session, and the base station 3320 may consider this in configuring the wireless device 3310 before the wireless device 3310 accesses the target base station 3340. A handover request message (or handover request sent via the handover required message and the handover request message through the core network entity) may further comprise the wireless device configuration of the wireless device 3310 connected to the serving target base station 3340. The handover request message and/or the handover request via the core network entity may comprise the wireless device capability and/or Ethernet type session capability of the wireless device 3310.

During the handover preparation phase, the base station 3320 may transmit the wireless device 3310's capability and/or the wireless device 3310's current configuration in connection with the base station 3320 to one or more potential target base station 3340s. This information may be employed, at least in part, by the potential target base station 3340 to configure the wireless device 3310 (e.g., to configure wireless device configuration parameters).

Handover admission control may be performed by the target base station 3340 dependent on many factors (e.g., QoS required for the wireless device bearers, UE capabilities, UE configuration, target base station 3340 load, a combination of the above, etc.). The target base station 3340 may configure the required resources according to the received information from the serving gNB and may reserve a C-RNTI and/or a RACH preamble. The access stratum configuration to be used in the target cell may be specified independently (e.g., as an establishment) or as a delta compared to the access stratum-configuration used in the source cell (e.g., as a reconfiguration).

At step 3306, the target base station 3340 may prepare handover with L1/L2 and may send the handover request acknowledge message to the base station 3320 (or to the core network entity, the core network entity may forward one or more elements of the handover request acknowledge message to the base station 3320 by sending the handover command message). The handover request acknowledge message may include a transparent container to be sent to the wireless device 3310 as an RRC message to perform the handover. The container may include a new C-RNTI, target base station 3340 security algorithm identifiers for the selected security algorithms, a dedicated RACH preamble, access parameters, SIBs, and/or other configuration parameters. The transparent container may further comprise the wireless device configuration associated with Ethernet type session and/or Ethernet type session capability (e.g., wireless device capability) for connection of the wireless device 3310 to the target base station 3340. The wireless device configuration may modify the Ethernet type session of the wireless device 3310 or may keep the same wireless device configurations for the Ethernet type sessions that the wireless device 3310 has with the serving base station. The target base station 3340 may generate the RRC message to perform the handover (e.g., an RRC connection reconfiguration message including the mobility control information). The RRC message may be sent by the base station 3320 towards the wireless device 3310 (e.g., via an RRC handover command message). The base station 3320 may perform the necessary integrity protection and ciphering of the message. The wireless device 3310 may receive the RRC connection reconfiguration message from the base station 3320 and may start performing the handover. The wireless device 3310 may or may not delay the handover execution for delivering the HARQ/ARQ responses to the base station 3320.

After receiving the RRC connection reconfiguration message including the mobility control information, the wireless device 3310 may perform synchronization to the target base station 3340 and access the target cell via RACH on the primary cell. Wireless device random access procedure may employ a contention-free procedure if a dedicated RACH preamble was indicated in the mobility control information. The wireless device random access procedure may employ a contention-based procedure if no dedicated preamble was indicated. The wireless device 3310 may derive target base station 3340 specific keys and may configure the selected security algorithms to be used in the target cell. The target base station 3340 may respond with uplink allocation and timing advance. After the wireless device 3310 has successfully accessed the target cell, the wireless device 3310 may send an RRC connection reconfiguration complete message (C-RNTI) to confirm the handover and to indicate that the handover procedure is completed for the wireless device 3310. The wireless device 3310 may transmit a MAC uplink buffer status report (BSR) control element (CE) along with the uplink RRC connection reconfiguration complete message or may transmit a MAC uplink BSR CE whenever possible to the target base station 3340. The target base station 3340 verifies the C-RNTI sent in the RRC connection reconfiguration complete message. The target base station 3340 may now begin sending data to the wireless device 3310 and receiving data from the wireless device 3310.

Figure 34:
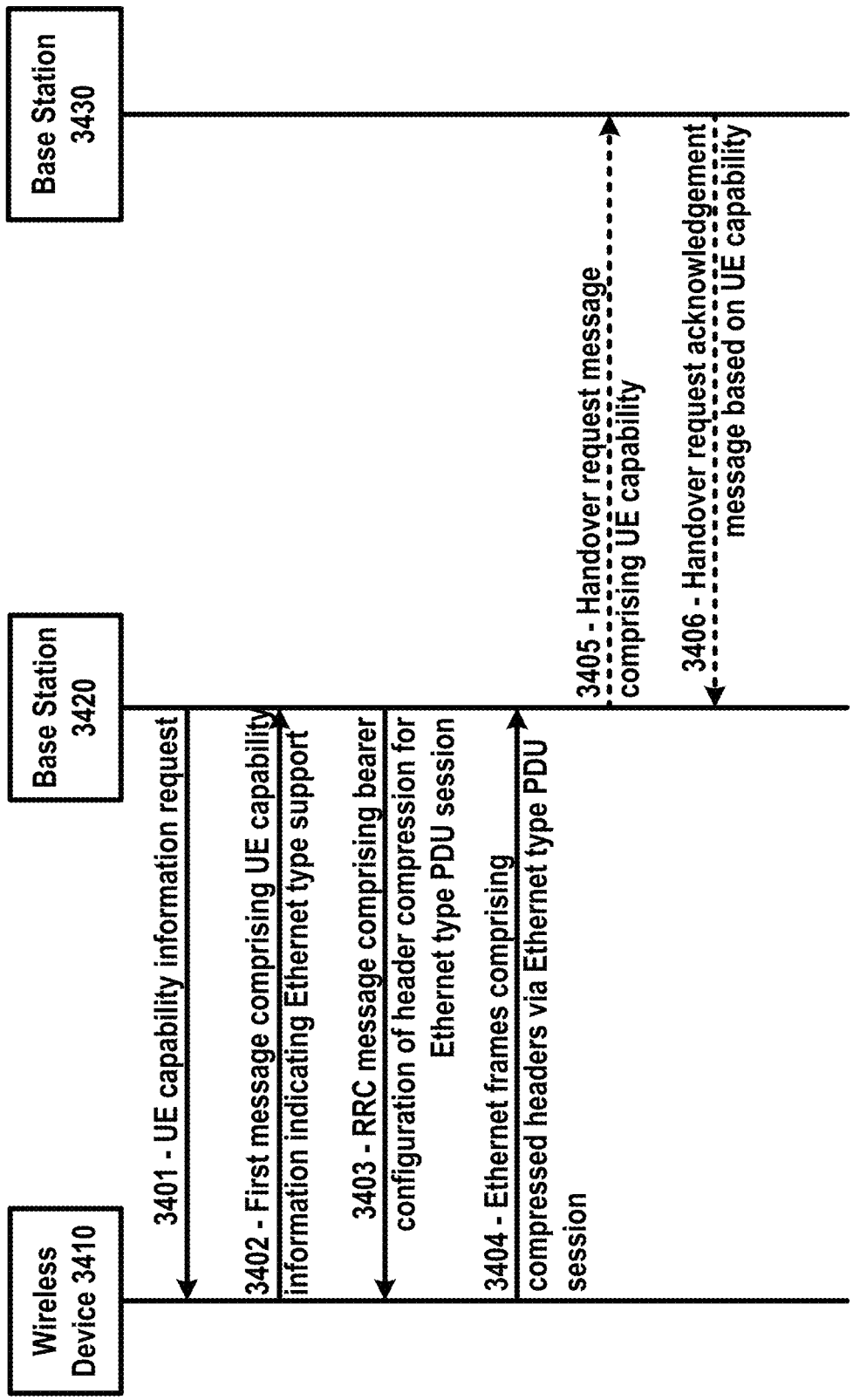
FIG. 34 shows an example message flow for establishing an Ethernet type PDU session with handover.

FIG. 34 shows an example message flow for establishing an Ethernet type PDU session with handover. At step 3401, a first base station 3420 (which may be a base station 401, a base station 2820, a base station 2930, or any other base station described herein) may send a request for UE capability information to a wireless device 3410 (which may be a wireless device 406, a wireless device 2810, a wireless device 2920, or any other wireless device described herein). The request may comprise a first radio resource control (RRC) message configured to enquiry a capability of the wireless device 3410. The first base station 3420 may receive, from the wireless device 3410, a second RRC message comprising wireless device capability information of the wireless device 3410. The wireless device capability information may comprise a first indication field indicating that the wireless device 3420 supports a PDU session of an Ethernet type. The first RRC message may be a wireless device capability enquiry message. The second RRC message may be a wireless device capability information message.

At step 3402, the first base station 3420 (e.g., gNB, eNB) may receive a first message from the wireless device 3410 on a primary cell of a plurality of cells. The first message may be an RRC wireless device capability message. The plurality of cells may comprise the primary cell and at least one secondary cell. The first message may comprise at least one parameter indicating whether the wireless device 3410 supports configuration of Ethernet type session(s). The first base station 3420 may receive a plurality of radio capability parameters from the wireless device 3410. The serving base station may configure one or more configuration parameters associated with Ethernet type session (bearer) for the wireless device 3410. At step 3403, the first base station 3420 may transmit Ethernet type bearer configuration parameters to the wireless device 3410 via an RRC message (e.g., RRC reconfiguration message). The RRC message may comprise one or more of a bearer identifier of the Ethernet type bearer, bearer type information (indicating the Ethernet type bearer is Ethernet type), QoS information, priority information, logical channel information, PDCP configuration parameters, RLC configuration parameters, header compression information, etc. The PDCP configuration parameters may comprise one or more PDCP header compression profile information.

The wireless device 3410 may configure (e.g., based on one or more elements of the RRC message) one or more parameters associated with one or more bearers and/or one or more PDU sessions of an Ethernet type. At step 3404, the wireless device 3410 may transmit, to the base station 3420, one or more Ethernet frames based on one or more elements of the RRC message. The base station may forward the one or more Ethernet frames towards a user plane core network entity (e.g., UPF, serving gateway, PDN gateway, etc.). The one or more Ethernet frames may comprise a MAC address of the wireless device 3410. The wireless device 3410 may compress headers of the one or more Ethernet frames (e.g., based on header compression parameters indicated in the RRC message).

The capability may be received on a first signaling bearer on the primary cell. The plurality of radio capability parameters may comprise a first sequence of one or more radio configuration parameters. A first radio configuration parameter in the first sequence may comprise a first parameter indicating whether Ethernet type session may be supported for a first band and/or first band combination. The index of the first radio configuration parameter in the first sequence may determine the index of the first band combination in the second sequence.

The size of the first sequence may be the same as the size of the second sequence. The index may determine the order of: the first radio configuration parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band.

The Ethernet type session may be unsupported if none of the radio configuration parameters comprise a parameter indicating that Ethernet type session is supported. A wireless device 3410 may transmit an RRC message comprising wireless device capability information. The wireless device capability information may comprise one or more information elements comprising wireless device 3410 radio capability parameters. The wireless device radio capability parameters may comprise a plurality of parameters indicating various capabilities of the wireless device 3410 radio (e.g., an Ethernet type session capability).

The first base station 3420 may selectively transmit a second message to the wireless device 3410 if a parameter indicates support for configuration of Ethernet type session. The second message may configure Ethernet type session in the wireless device 3410. If the parameter does not indicate support for configuration Ethernet type session, the first base station 3420 may not configure Ethernet type session in the wireless device 3410. If the parameter indicates support for configuration of the Ethernet type session, the first base station 3420 may or may not configure Ethernet type session in the wireless device 3410 depending on the required wireless device configuration and many other parameters. Transmission or not transmission (selective transmission) of at least one second message to configure Ethernet type session is determined by the base station based on many criteria described in this specification.

The second control message may be configured to further cause configuration of one or more Ethernet type sessions and/or bearers associated with the wireless device 3410. A cell add-modify information element may comprise a first plurality of dedicated parameters. The first plurality of dedicated parameters may comprise a first cell index for a first secondary cell in the at least one secondary cell. The second control message may further include configuration information for physical channels for the wireless device 3410. The second control message may be configured to further cause the wireless device 3410 to set up or modify at least one radio bearer.

The first base station 3420 may receive a measurement report from the wireless device 3410 in response to the second message. The measurement report may comprise signal quality information of at least one cell of associated with the target base station. The signal quality information may be derived based on employing measurements of at least one OFDM subcarrier. The first base station 3420 may make a handover decision based on the at least one measurement report and/or other parameters (e.g., load, QoS, mobility, etc.). The first base station 3420 may also make a decision depending on base station internal proprietary algorithm.

At step 3405, the first base station may transmit a third message to the target base station 3430. The third message may comprise UE capability information (e.g., indicating whether the wireless device 3410 supports configuration Ethernet type session). The third message may comprise a plurality of parameters of the configuration indicating bearer configuration of Ethernet type session. The configuration may comprise one or more PDCP header compression profile information for the Ethernet type session. The third message may be a handover request message transmitted to the target base station 3430 to prepare the target base station 3430 for the handover of the wireless device 3410. The wireless device capability parameters may be included in the third message. UE dedicated radio parameters comprising UE Ethernet type session configuration may also be included in the handover request message. UE dedicated radio parameters may comprise MACMainconfig information element.

The wireless device capability information (information element) indicating whether the wireless device 3410 supports configuration of Ethernet type session may be the same format as the wireless device capability message transmitted by the wireless device 3410 to the first base station 3420 in the first message as described above. The third message may further comprise a plurality of parameters of the configuration associated with Ethernet type session configurations (e.g., based on UE capability information comprising Ethernet type session capability). The parameters included in the configuration information of Ethernet type session may be the same as the ones included in the at least one second message as described in this specification. The third message may be a handover request message transmitted to the target base station to prepare the target base station for the handover of the wireless device 3410. The wireless device capability parameters (comprising Ethernet type session capability) may be included in the third message. UE dedicated radio parameters comprising UE Ethernet type session configuration may also be included in the handover request message. UE dedicated radio parameters may comprise MACMainconfig information element.

At step 3406, the first base station 3420 may receive a fourth message from the target base station 3430. The fourth message may be a handover request acknowledgement message, which may be based on the wireless device capability information. The fourth message may comprise configuration of a plurality of cells for the wireless device 3410. The plurality of cells may comprise a primary cell and at least one secondary cell. The first base station 3420 may transmit a fifth message to the wireless device 3410. The fifth message may comprise a plurality of parameters of the configuration for Ethernet type session and/or Ethernet type session capability via UE capability. The fifth message may cause the wireless device 3410 to start a synchronization process with the target base station 3430 (with a cell in the target base station).

The first base station 3430 may, before transmission of the fifth message, encrypt the fifth message and protect the fifth message by an integrity header. The fifth message may further comprise configuration information for physical channels for the wireless device 3410. The fifth message may be configured to cause the wireless device 3410 to set up or modify at least one radio bearer. The fifth message may be configured to further cause the wireless device 3410 to configure at least one of a physical layer parameter, a MAC layer parameter, and an RLC layer parameter.

Figure 35:
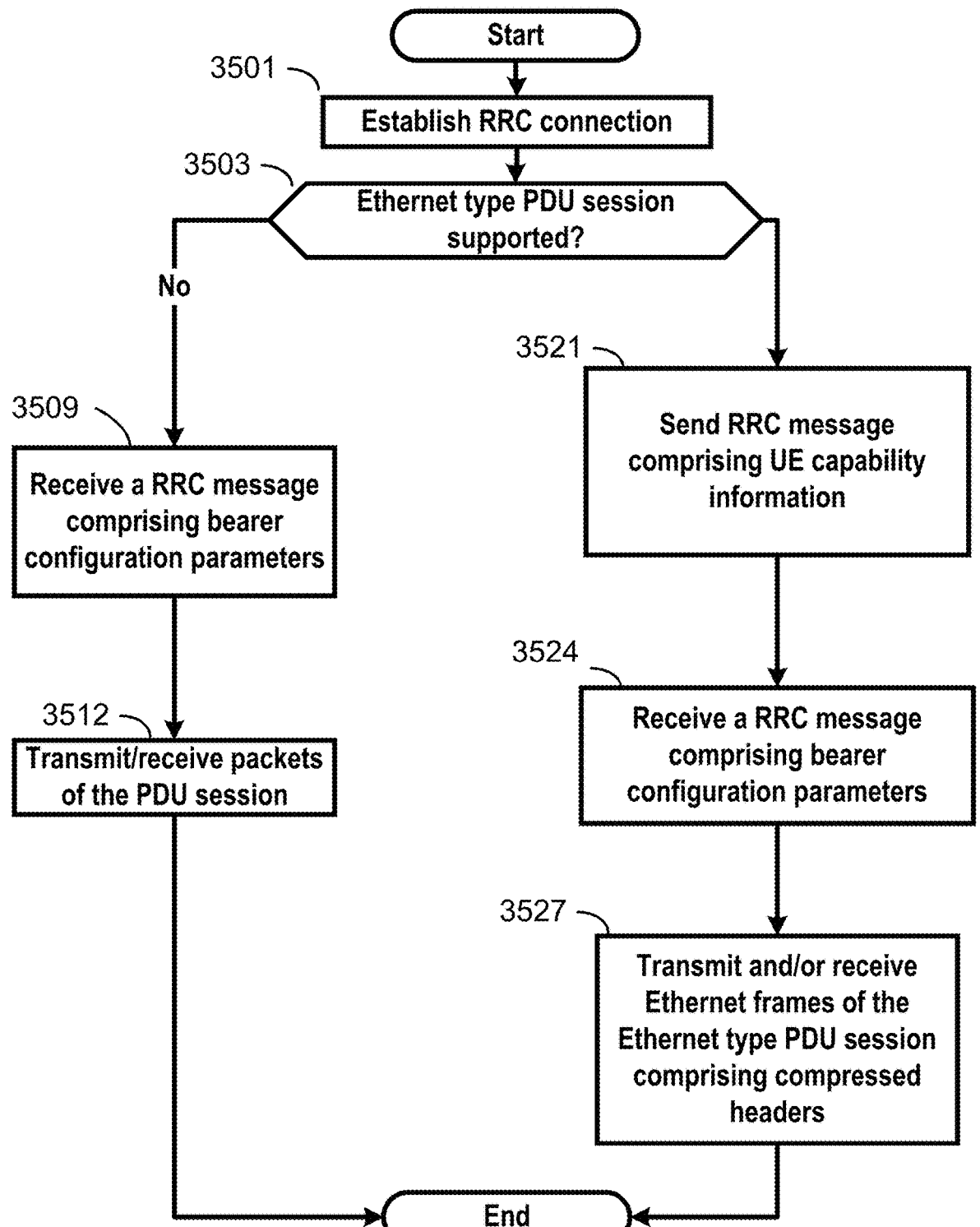
FIG. 35 shows an example method for establishing an Ethernet type PDU session with compressed header parameters.

FIG. 35 shows an example method for establishing an Ethernet type PDU session with compressed header parameters. The example process may be performed by a wireless device (e.g., a wireless device 406, a wireless device 2810, a wireless device 2920, a wireless device 3310, a wireless device 3410, or any other wireless device described herein). At step 3501, the wireless device may establish an RRC connection with a base station (e.g., a base station 401, a base station 2820, a base station 2930, a base station 3320, a base station 3330, or any other base station described herein). At step 3503, the wireless device may determine if it (and/or a connected base station) supports an Ethernet type PDU session. If an Ethernet type PDU session is not supported, the wireless device may proceed with step 3509. If an Ethernet type PDU session is supported, the wireless device may proceed with step 3521. At step 3509, the wireless device may receive (e.g., from the base station and/or a core network entity) an RRC message comprising bearer configuration parameters for the PDU session. At step 3512, the wireless device may transmit and/or receive packets of the PDU session.

At step 3521, the wireless device may send, to the base station, an RRC message, which may comprise UE capability information indicating that the wireless device supports an Ethernet type PDU session. The RRC message may indicate one or more capabilities of the wireless device, such as a data transmission bit rate, multiple Ethernet addresses, operating as a termination node, operating as an originating node, operating as switch/hub of Ethernet session, an address resolution protocol, Ethernet multicast/broadcast, and/or QoS level. At step 3524, the wireless device may receive an RRC message comprising bearer configuration parameters for the Ethernet type PDU session. At step 3527, the wireless device may transmit and/or receive Ethernet frames of the Ethernet type PDU session (e.g. Ethernet frames comprising compressed headers comprising source and/or destination MAC addresses).

Figure 36:
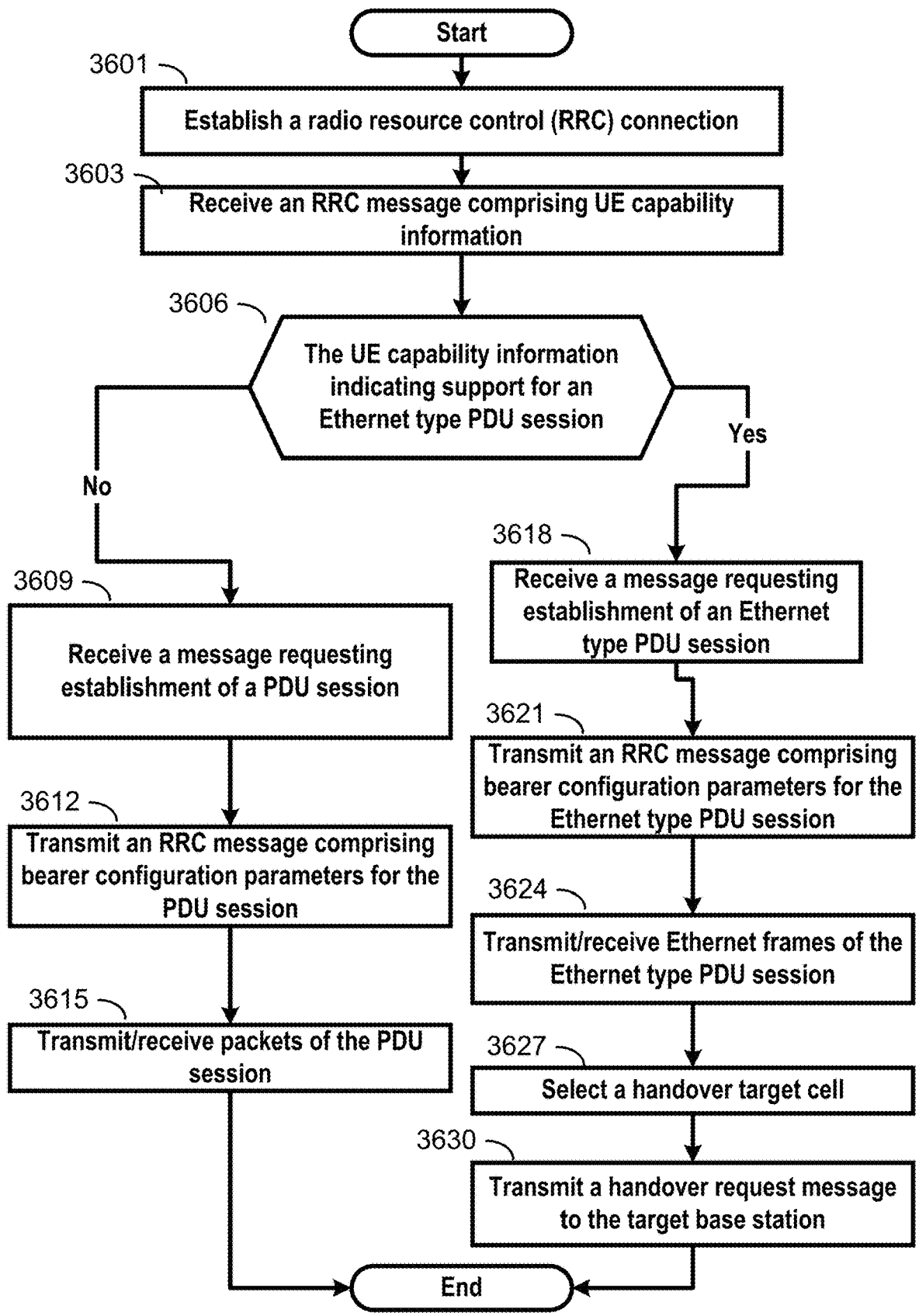
FIG. 36 shows an example method for establishing an Ethernet type PDU session with compressed header parameters.

FIG. 36 shows an example method for establishing an Ethernet type PDU session with compressed header parameters. The example process may be performed by a base station (e.g., a base station 401, a base station 2820, a base station 2930, a base station 3320, a base station 3330, or any other base station described herein). At step 3601, the base station may establish an RRC connection with a wireless device (e.g., a wireless device 406, a wireless device 2810, a wireless device 2920, a wireless device 3310, a wireless device 3410, or any other wireless device described herein). At step 3603, the base station may receive, from the wireless device, an RRC message comprising wireless device capability information. The wireless device capability information may indicate one or more capabilities of the wireless device, such as a data transmission bit rate, multiple Ethernet addresses, operating as a termination node, operating as an originating node, operating as switch/hub of Ethernet session, an address resolution protocol, Ethernet multicast/ broadcast, or QoS level.

At step 3606, the base station may determine if the wireless device capability information indicates that the wireless device supports an Ethernet type PDU session. If the wireless device capability information indicates that the wireless device does not support an Ethernet type PDU session, the base station may proceed to step 3609. If the wireless device capability information indicates that the wireless device supports an Ethernet type PDU session, the base station may proceed to step 3618.

At step 3609, the base station may receive (e.g., from an AMF and/or an SMF), a message requesting establishment of a PDU session (e.g., IPv4, IPv6, IPv4v6, unstructured type). The AMF may be an AMF 2820, an AMF 2940, an AMF 3330, or any other AMF described herein. The SMF may be an SMF 2820, an SMF 2950, or any other SMF described herein. At step 3612, the base station may transmit an RRC message comprising bearer configuration parameters for the PDU session. At step 3615, the base station may transmit and/or receive packets of the PDU session.

At step 3618, the base station may receive (e.g., from an AMF and/or an SMF), a message requesting establishment of an Ethernet type PDU session. At step 3621, the base station may transmit an RRC message comprising bearer configuration parameters for the Ethernet type PDU session. At step 3624, the base station may transmit and/or receive (e.g., from the wireless device) Ethernet frames of the Ethernet type PDU session. The Ethernet frames may comprise compressed headers comprising source and/or destination MAC addresses. At step 3627, the base station may select a handover cell (and/or target base station) for the wireless device. The target base station may be a base station 401, a target base station 3340, a target base station 3430, or any other base station described herein. The selection may be based on the cell and/or target base station supporting an Ethernet type PDU session. At step 3630, the base station may transmit a handover request message to the target base station.

Figure 37:
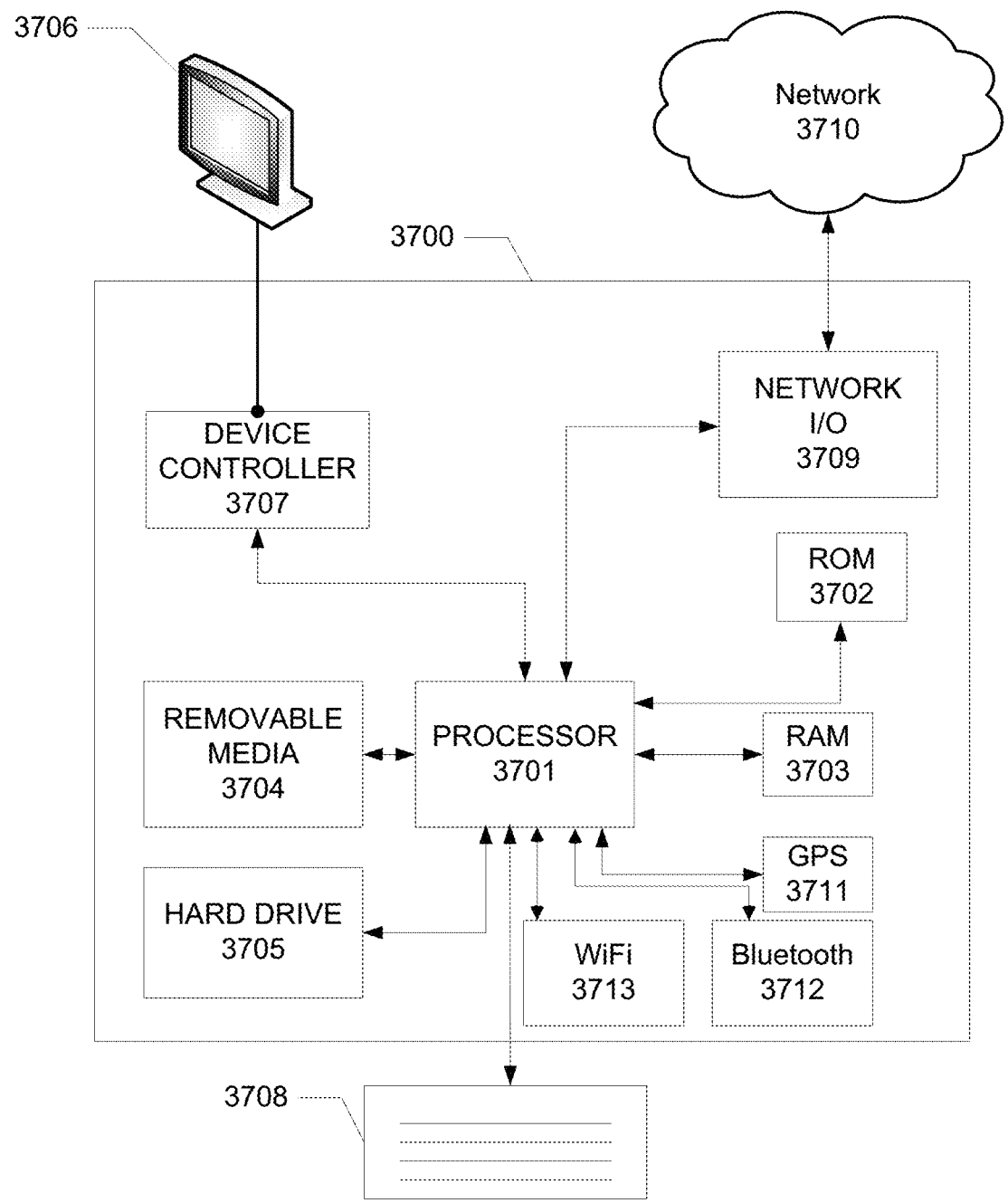
FIG. 37 shows general hardware elements that may be used to implement any of the various computing devices discussed herein.
Figure 21A:
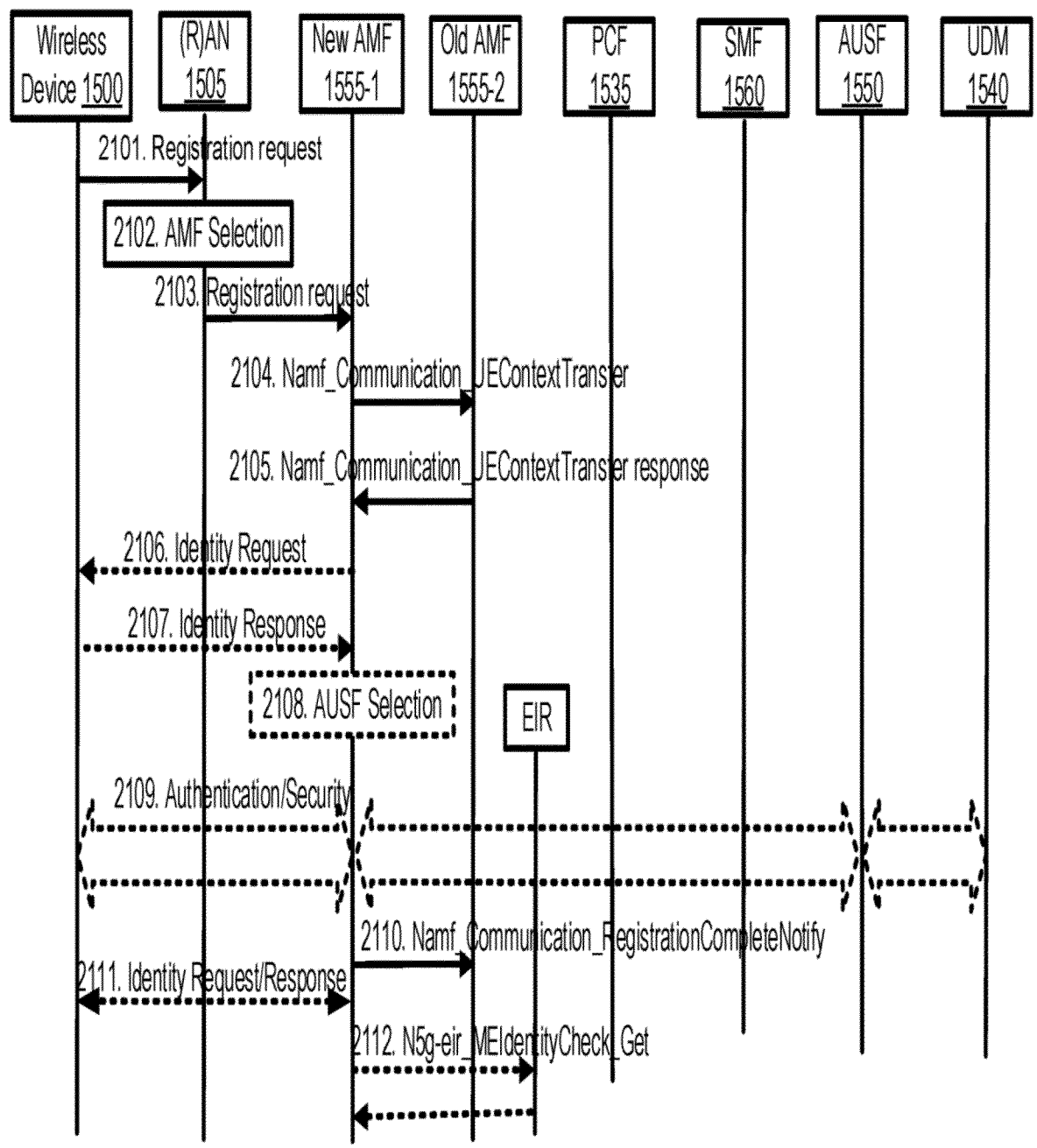

FIG. 37 shows general hardware elements that may be used to implement any of the various computing devices discussed herein, including, e.g., the base station 401, the wireless device 406, or any other base station, wireless device, or computing device described herein. The computing device 3700 may include one or more processors 3701, which may execute instructions stored in the random access memory (RAM) 3703, the removable media 3704 (such as a Universal Serial Bus (USB) drive, compact disk (CD) or digital versatile disk (DVD), or floppy disk drive), or any other desired storage medium. Instructions may also be stored in an attached (or internal) hard drive 3705. The computing device 3700 may also include a security processor (not shown), which may execute instructions of one or more computer programs to monitor the processes executing on the processor 3701 and any process that requests access to any hardware and/or software components of the computing device 3700 (e.g., ROM 3702, RAM 3703, the removable media 3704, the hard drive 3705, the device controller 3707, a network interface 3709, a GPS 3711, a Bluetooth interface 3712, a Wi-Fi interface 3713, etc.). The computing device 3700 may include one or more output devices, such as the display 3706 (e.g., a screen, a display device, a monitor, a television, etc.), and may include one or more output device controllers 3707, such as a video processor. There may also be one or more user input devices 3708, such as a remote control, keyboard, mouse, touch screen, microphone, etc. The computing device 3700 may also include one or more network interfaces, such as a network interface 3709, which may be a wired interface, a wireless interface, or a combination of the two. The network interface 3709 may provide an interface for the computing device 3700 to communicate with a network 3710 (e.g., a RAN, or any other network). The network interface 3709 may include a modem (e.g., a cable modem), and the external network 3710 may include communication links, an external network, an in-home network, a provider's wireless, coaxial, fiber, or hybrid fiber/coaxial distribution system (e.g., a DOCSIS network), or any other desired network. Additionally, the computing device 3700 may include a location-detecting device, such as a global positioning system (GPS) microprocessor 3711, which may be configured to receive and process global positioning signals and determine, with possible assistance from an external server and antenna, a geographic position of the computing device 3700.

The example in FIG. 37 is a hardware configuration, although the components shown may be implemented as software as well. Modifications may be made to add, remove, combine, divide, etc. components of the computing device 3700 as desired. Additionally, the components may be implemented using basic computing devices and components, and the same components (e.g., processor 3701, ROM storage 3702, display 3706, etc.) may be used to implement any of the other computing devices and components described herein. For example, the various components described herein may be implemented using computing devices having components such as a processor executing computer-executable instructions stored on a computer-readable medium, as shown in FIG. 37. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, etc. Other examples may comprise communication networks comprising devices such as base stations, wireless devices or user equipment (UE), servers, switches, antennas, etc. A network may comprise any wireless technology, including but not limited to, cellular, wireless, Wi-Fi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
sending, by a wireless device to an access and mobility management function (AMF) device via a base station, a wireless device capability parameter indicating whether the wireless device supports an Ethernet packet data unit (PDU) session type between the wireless device and a core network user plane function device;
receiving, by the wireless device from the base station, a message comprising one or more configuration parameters for a PDU session of the Ethernet PDU session type; and
sending, by the wireless device to the base station, at least one Ethernet frame associated with the PDU session of the Ethernet PDU session type.

2. The method of claim 1, wherein the wireless device capability parameter comprises a binary parameter, and wherein the wireless device capability parameter is set to a first value based on the wireless device supporting the Ethernet PDU session type.

3. The method of claim 1, wherein the wireless device capability parameter comprises at least one indication field indicating at least one of:
a transmission bit rate,
multiple Ethernet addresses for the wireless device, or
an Ethernet standard version.

4. The method of claim 1, wherein the one or more configuration parameters comprise at least one bearer configuration parameter of a bearer for the PDU session of the Ethernet PDU session type,
wherein the at least one bearer configuration parameter comprises an Ethernet header compression parameter, and
wherein the method further comprises compressing, by the wireless device and based on the Ethernet header compression parameter, an Ethernet header of the at least one Ethernet frame.

5. The method of claim 4, wherein the sending the at least one Ethernet frame comprises sending, by the wireless device to the base station via at least one resource block of at least one cell of the base station, the at least one Ethernet frame comprising the compressed Ethernet header.

6. The method of claim 1, wherein the wireless device capability parameter further indicates a medium access control (MAC) address of the wireless device.

7. The method of claim 1, wherein the sending the wireless device capability parameter comprises sending, to the AMF device via the base station, at least one non-access stratum parameter comprising the wireless device capability parameter.

8. The method of claim 7, wherein the non-access stratum parameter further comprises a PDU session type parameter indicating a type of a requested PDU session.

9. The method of claim 1, wherein the message comprises a radio resource control (RRC) message indicating addition of a bearer for the PDU session of the Ethernet PDU session type, and wherein the at least one Ethernet frame is further associated with the bearer.

10. A method comprising:
receiving, by a base station from a wireless device, a wireless device capability parameter indicating whether the wireless device supports an Ethernet packet data unit (PDU) session type between the wireless device and a core network user plane function device;
sending, by the base station to the wireless device, a message comprising one or more configuration parameters for a PDU session of the Ethernet PDU session type; and
receiving, by the base station from the wireless device, at least one Ethernet frame associated with the PDU session of the Ethernet PDU session type.

11. The method of claim 10, further comprising sending, by the base station to an access and mobility management function (AMF) device, the wireless device capability parameter.

12. The method of claim 10, wherein the wireless device capability parameter comprises a binary parameter, and wherein the wireless device capability parameter is set to a first value based on the wireless device supporting the Ethernet PDU session type.

13. The method of claim 10, wherein the wireless device capability parameter comprises at least one indication field indicating at least one of:
a transmission bit rate,
multiple Ethernet addresses for the wireless device, or
an Ethernet standard version.

14. The method of claim 10, wherein the one or more configuration parameters comprise at least one bearer configuration parameter of a bearer for the PDU session of the Ethernet PDU session type,
wherein the at least one bearer configuration parameter comprises an Ethernet header compression parameter, and
wherein an Ethernet header of the at least one Ethernet frame is compressed based on the Ethernet header compression parameter.

15. The method of claim 10, wherein the wireless device capability parameter further indicates a medium access control (MAC) address of the wireless device.

16. The method of claim 10, wherein the receiving the wireless device capability parameter comprises receiving, by the base station from the wireless device, at least one non-access stratum parameter comprising the wireless device capability parameter.

17. The method of claim 16, wherein the non-access stratum parameter further comprises a PDU session type parameter indicating a type of a requested PDU session.

18. The method of claim 10, wherein the message comprises a radio resource control (RRC) message indicating addition of a bearer for the PDU session of the Ethernet PDU session type, and wherein the at least one Ethernet frame is further associated with the bearer.

19. A wireless device comprising:
one or more processors; and
memory storing instructions that, when executed by the one or more processors, cause the wireless device to:
send, to an access and mobility management function (AMF) device via a base station, a wireless device capability parameter indicating whether the wireless device supports an Ethernet packet data unit (PDU) session type between the wireless device and a core network user plane function device;
receive, from the base station, a message comprising one or more configuration parameters for a PDU session of the Ethernet PDU session type; and
send, to the base station, at least one Ethernet frame associated with the PDU session of the Ethernet PDU session type.

20. The wireless device of claim 19, wherein the wireless device capability parameter comprises a binary parameter, and wherein the wireless device capability parameter is set to a first value based on the wireless device supporting the Ethernet PDU session type.

21. The wireless device of claim 19, wherein the wireless device capability parameter comprises at least one indication field indicating at least one of:
a transmission bit rate,
multiple Ethernet addresses for the wireless device, or
an Ethernet standard version.

22. The wireless device of claim 19, wherein the one or more configuration parameters comprise at least one bearer configuration parameter of a bearer for the PDU session of the Ethernet PDU session type,
wherein the at least one bearer configuration parameter comprises an Ethernet header compression parameter, and
wherein the instructions, when executed by the one or more processors, further cause the wireless device to compress, based on the Ethernet header compression parameter, an Ethernet header of the at least one Ethernet frame.

23. The wireless device of claim 22, wherein the instructions, when executed by the one or more processors, cause the wireless device to send the at least one Ethernet frame by sending, to the base station via at least one resource block of at least one cell of the base station, the at least one Ethernet frame comprising the compressed Ethernet header.

24. The wireless device of claim 19, wherein the wireless device capability parameter further indicates a medium access control (MAC) address of the wireless device.

25. The wireless device of claim 19, wherein the instructions, when executed by the one or more processors, cause the wireless device to send the wireless device capability parameter by sending, to the AMF device via the base station, at least one non-access stratum parameter comprising the wireless device capability parameter.

26. The wireless device of claim 25, wherein the non-access stratum parameter further comprises a PDU session type parameter indicating a type of a requested PDU session.

27. The wireless device of claim 19, wherein the message comprises a radio resource control (RRC) message indicating addition of a bearer for the PDU session of the Ethernet PDU session type, and wherein the at least one Ethernet frame is further associated with the bearer.

28. A base station comprising:
one or more processors; and
memory storing instructions that, when executed by the one or more processors, cause the base station to:
receive, from a wireless device, a wireless device capability parameter indicating whether the wireless device supports an Ethernet packet data unit (PDU) session type between the wireless device and a core network user plane function device;
send, to the wireless device, a message comprising one or more configuration parameters for a PDU session of the Ethernet PDU session type; and receive, from the wireless device, at least one Ethernet frame associated with the PDU session of the Ethernet PDU session type.

29. The base station of claim 28, wherein the instructions, when executed by the one or more processors, further cause the base station to send, to an access and mobility management function (AMF) device, the wireless device capability parameter.

30. The base station of claim 28, wherein the wireless device capability parameter comprises a binary parameter, and wherein the wireless device capability parameter is set to a first value based on the wireless device supporting the Ethernet PDU session type.

31. The base station of claim 28, wherein the wireless device capability parameter comprises at least one indication field indicating at least one of:
a transmission bit rate,
multiple Ethernet addresses for the wireless device, or
an Ethernet standard version.

32. The base station of claim 28, wherein the one or more configuration parameters comprise at least one bearer configuration parameter of a bearer for the PDU session of the Ethernet PDU session type,
wherein the at least one bearer configuration parameter comprises an Ethernet header compression parameter, and
wherein an Ethernet header of the at least one Ethernet frame is compressed based on the Ethernet header compression parameter.

33. The base station of claim 28, wherein the wireless device capability parameter further indicates a medium access control (MAC) address of the wireless device.

34. The base station of claim 28, wherein the instructions, when executed by the one or more processors, cause the base station to receive the wireless device capability parameter by receiving, from the wireless device, at least one non-access stratum parameter comprising the wireless device capability parameter.

35. The base station of claim 34, wherein the non-access stratum parameter further comprises a PDU session type parameter indicating a type of a requested PDU session.

36. The base station of claim 28, wherein the message comprises a radio resource control (RRC) message indicating addition of a bearer for the PDU session of the Ethernet PDU session type, and wherein the at least one Ethernet frame is further associated with the bearer.

* * * * *

UNITED STATES PATENT AND TRADEMARK OFFICE
CERTIFICATE OF CORRECTION

PATENT NO. : 11,582,330 B2
APPLICATION NO. : 17/107132
DATED : February 14, 2023
INVENTOR(S) : Park et al.

It is certified that error appears in the above-identified patent and that said Letters Patent is hereby corrected as shown below:

On the Title Page

Page 3, Column 1, item (56) Other Publications, Line 49:
Delete "Remaing" and insert --Remaining-- therefor Page 3, Column 2, item (56) Other Publications, Line 45:
Delete "suppod" and insert --support-- therefor In the Drawings Sheet 7 of 38, Fig. 7, Reference Numeral 723, Lines 1-4:
Delete "DL-SCH of SCH" and insert --DL-SCH of SCG-- therefor Sheet 7 of 38, Fig. 7, Reference Numeral 724, Lines 1-3:
Delete "UL-SCH of SCH" and insert --UL-SCH of SCG-- therefor Sheet 17 of 38, Fig. 17, Reference Numeral 328, Line 1:
Delete "328" and insert --1728-- therefor Sheet 21 of 38, Fig. 21A:
Insert --2101. Registration request-- as shown in replacement sheet, attached.

In the Specification

Column 4, Detailed Description, Line 6:
Delete "multiplexing" and insert --duplexing-- therefor Column 13, Detailed Description, Line 53:
Delete "534" and insert --535-- therefor Signed and Sealed this
Twentieth Day of May, 2025

Coke Morgan Stewart
*Acting Director of the United States Patent and Trademark Office*

Column 13, Detailed Description, Line 56:
Delete "535A and 535B" and insert --536A and 536B-- therefor Column 13, Detailed Description, Line 59:
Delete "536A and 536B" and insert --537A and 537B-- therefor Column 14, Detailed Description, Line 33:
Delete "621" and insert --620-- therefor Column 15, Detailed Description, Line 14:
After "bearer", insert --.-- therefor Column 16, Detailed Description, Line 66:
Delete "PDDCH" and insert --PDCCH-- therefor Column 17, Detailed Description, Line 3:
Delete "PDDCH" and insert --PDCCH-- therefor Column 17, Detailed Description, Line 32:
Delete "NTA" and insert --$N_{TA}$-- therefor Column 17, Detailed Description, Line 35:
Delete "NTA=0." and insert --$N_{TA}$=0.-- therefor Column 22, Detailed Description, Line 13:
Delete "1312, 1312," and insert --1312, 1313,-- therefor Column 22, Detailed Description, Line 40:
Delete "LOW" and insert --Low-- therefor Column 28, Detailed Description, Line 47:
Delete "155)" and insert --1555)-- therefor Column 28, Detailed Description, Line 62:
Delete "125)" and insert --1525)-- therefor Column 32, Detailed Description, Line 63:
Delete "1855:" and insert --1555:-- therefor Column 32, Detailed Description, Line 66:
Delete "620" and insert --1920-- therefor Column 36, Detailed Description, Line 61:
Delete "Old" and insert --New-- therefor

CERTIFICATE OF CORRECTION (continued)
U.S. Pat. No. 11,582,330 B2

Column 39, Detailed Description, Line 7:
Delete "100)." and insert --1500).-- therefor Column 39, Detailed Description, Line 9:
Delete "160)" and insert --1560)-- therefor Column 39, Detailed Description, Line 9:
Delete "160)," and insert --1560),-- therefor Column 55, Detailed Description, Line 34:
Delete "nwork" and insert --network-- therefor Column 57, Detailed Description, Line 33:
Delete "400," and insert --401,-- therefor Column 63, Detailed Description, Line 66:
Delete "PDUI" and insert --PDU-- therefor Column 66, Detailed Description, Line 60:
Delete "30005" and insert --3005-- therefor Column 67, Detailed Description, Line 20:
Delete "2820," and insert --2815,-- therefor Column 67, Detailed Description, Line 65:
Delete "2820," and insert --2815,-- therefor Column 68, Detailed Description, Line 37:
Delete "2820," and insert --2815,-- therefor Column 73, Detailed Description, Line 35:
Delete "station 3340*s*" and insert --stations 3340-- therefor Column 74, Detailed Description, Line 28:
Delete "device 3310's" and insert --device's 3310-- therefor Column 74, Detailed Description, Line 29:
Delete "device 3310's" and insert --device's 3310-- therefor Column 74, Detailed Description, Line 31:
Delete "station 3340*s*." and insert --stations 3340.-- therefor Column 75, Detailed Description, Line 44:
Delete "2820," and insert --2815,-- therefor

CERTIFICATE OF CORRECTION (continued)
U.S. Pat. No. 11,582,330 B2

Column 75, Detailed Description, Line 56:
Delete "3420" and insert --3410-- therefor Column 78, Detailed Description, Line 41:
Delete "2820," and insert --2815,-- therefor Column 78, Detailed Description, Line 42:
Delete "3330," and insert --3420,-- therefor Column 79, Detailed Description, Line 6:
Delete "2820," and insert --2815,-- therefor Column 79, Detailed Description, Line 7:
Delete "3330," and insert --3420,-- therefor Column 81, Detailed Description, Line 23:
Delete "Lab VIEWMathScript." and insert --LabVIEW MathScript.-- therefor